(12) United States Patent
Sundararaman et al.

(10) Patent No.: US 9,946,607 B2
(45) Date of Patent: Apr. 17, 2018

(54) SYSTEMS AND METHODS FOR STORAGE ERROR MANAGEMENT

(71) Applicant: SanDisk Technologies LLC, Plano, TX (US)

(72) Inventors: Swaminathan Sundararaman, San Jose, CA (US); Nisha Talagala, Livermore, CA (US); Eivind Sarto, Oakland, CA (US); Shaohua Li, Shanghai (CN)

(73) Assignee: SANDISK TECHNOLOGIES LLC, Plano, TX (US)

(*) Notice: Subject to any disclaimer, the term of this patent is extended or adjusted under 35 U.S.C. 154(b) by 0 days.

(21) Appl. No.: 14/878,635

(22) Filed: Oct. 8, 2015

(65) Prior Publication Data
US 2016/0259693 A1 Sep. 8, 2016

Related U.S. Application Data

(60) Provisional application No. 62/128,456, filed on Mar. 4, 2015.

(51) Int. Cl.
G06F 11/00 (2006.01)
G06F 11/14 (2006.01)
(Continued)

(52) U.S. Cl.
CPC ...... G06F 11/1458 (2013.01); G06F 11/1088 (2013.01); G06F 17/30371 (2013.01); G06F 2201/805 (2013.01)

(58) Field of Classification Search
CPC ............. G06F 11/1458; G06F 11/1088; G06F 11/1076; G06F 17/30371
See application file for complete search history.

(56) References Cited

U.S. PATENT DOCUMENTS 4,571,674 A 2/1986 Hartung
5,193,184 A 3/1993 Belsan et al.
(Continued)

FOREIGN PATENT DOCUMENTS

CN 1771495 5/2006
EP 1418502 5/2004
(Continued)

OTHER PUBLICATIONS

Tal, "NAND vs. NOR Flash Technology," M-Systems, www2.electronicproducts.com/PrintArticle.aspx?ArticleURL=FEBMSY1.feb2002.html, visited Nov. 22, 2010.
(Continued)

Primary Examiner — Philip Guyton
(74) Attorney, Agent, or Firm — Kunzler, PC

(57) ABSTRACT

A storage layer stores integrity data corresponding to data groups being written to a storage array. The storage layer validates stored data groups by use of the integrity data, independent of recovery information managed by the storage array. The storage layer preempts crash recovery operations of the storage array by validating a subset of the data groups. The storage layer identifies data groups to validate based on a location of a log append point within a storage address space of the storage array. The storage layer may be further configured to mitigate write hole conditions by, inter alia, reconstructing invalid data of a data group and/or retaining valid portions of the data group.

21 Claims, 17 Drawing Sheets

(51) Int. Cl.
*G06F 17/30* (2006.01)
*G06F 11/10* (2006.01)

(56) References Cited

U.S. PATENT DOCUMENTS

| | | |
|---|---|---|
| 5,261,068 A | 11/1993 | Gaskins et al. |
| 5,307,497 A | 4/1994 | Feigenbaum et al. |
| 5,325,509 A | 6/1994 | Lautzenheiser |
| 5,392,427 A | 2/1995 | Barrett et al. |
| 5,404,485 A | 4/1995 | Ban |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,533,190 A * | 7/1996 | Binford ............... G06F 11/1084 714/20 |
| 5,535,399 A | 7/1996 | Blitz et al. |
| 5,553,261 A | 9/1996 | Hasbun et al. |
| 5,586,291 A | 12/1996 | Lasker |
| 5,594,883 A | 1/1997 | Pricer |
| 5,596,736 A | 1/1997 | Kerns |
| 5,598,370 A | 1/1997 | Nijima et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,794,253 A | 8/1998 | Norin et al. |
| 5,802,602 A | 9/1998 | Rahman et al. |
| 5,809,527 A | 9/1998 | Cooper et al. |
| 5,809,543 A | 9/1998 | Byers |
| 5,819,109 A * | 10/1998 | Davis ............... G06F 11/1008 710/15 |
| 5,845,329 A | 12/1998 | Onishi et al. |
| 5,930,815 A | 7/1999 | Estakhri et al. |
| 5,957,158 A | 9/1999 | Volz et al. |
| 5,960,462 A | 9/1999 | Solomon et al. |
| 6,000,019 A | 12/1999 | Dykstal et al. |
| 6,014,724 A | 1/2000 | Jennett |
| 6,073,232 A | 6/2000 | Kroeker et al. |
| 6,101,601 A | 8/2000 | Matthews |
| 6,170,039 B1 | 1/2001 | Kishida |
| 6,170,047 B1 | 1/2001 | Dye |
| 6,173,381 B1 | 2/2001 | Dye |
| 6,185,654 B1 | 2/2001 | Van Doren |
| 6,209,088 B1 | 3/2001 | Reneris |
| 6,236,593 B1 | 5/2001 | Hong et al. |
| 6,256,642 B1 | 7/2001 | Krueger et al. |
| 6,279,069 B1 | 8/2001 | Robinson |
| 6,289,413 B1 | 9/2001 | Rogers et al. |
| 6,330,642 B1 | 12/2001 | Brown |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,523,087 B2 | 2/2003 | Busser |
| 6,523,102 B1 | 2/2003 | Dye et al. |
| 6,564,285 B1 | 5/2003 | Mills et al. |
| 6,587,915 B1 | 7/2003 | Kim |
| 6,601,211 B1 | 7/2003 | Norman |
| 6,625,684 B1 | 9/2003 | Cho et al. |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,715,027 B2 | 3/2004 | Kim et al. |
| 6,742,081 B2 | 5/2004 | Talagala et al. |
| 6,751,155 B2 | 6/2004 | Gorobets |
| 6,754,774 B2 | 6/2004 | Gruner et al. |
| 6,775,185 B2 | 8/2004 | Fujisawa et al. |
| 6,779,088 B1 | 8/2004 | Benveniste et al. |
| 6,785,776 B2 | 8/2004 | Arimilli et al. |
| 6,785,785 B2 | 8/2004 | Piccirillo et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,035,974 B2 | 4/2006 | Shang |
| 7,017,107 B2 | 5/2006 | Talagala et al. |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,062,704 B2 | 6/2006 | Talagala et al. |
| 7,076,599 B2 | 7/2006 | Aasheim et al. |
| 7,082,495 B2 | 7/2006 | DeWhitt et al. |
| 7,085,512 B2 | 8/2006 | Fan et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,130,956 B2 | 10/2006 | Rao |
| 7,130,957 B2 | 10/2006 | Rao |
| 7,167,953 B2 | 1/2007 | Megiddo et al. |
| 7,171,536 B2 | 1/2007 | Chang et al. |
| 7,173,852 B2 | 2/2007 | Gorobets |
| 7,181,572 B2 | 2/2007 | Walmsley |
| 7,194,577 B2 | 3/2007 | Johnson et al. |
| 7,194,740 B1 | 3/2007 | Frank et al. |
| 7,203,815 B2 | 4/2007 | Haswell |
| 7,215,580 B2 | 5/2007 | Gorobets |
| 7,219,238 B2 | 5/2007 | Saito et al. |
| 7,243,203 B2 | 7/2007 | Scheuerlein |
| 7,246,179 B2 | 7/2007 | Camara et al. |
| 7,254,686 B2 | 8/2007 | Islam |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voight et al. |
| 7,328,307 B2 | 2/2008 | Hoogterp |
| 7,340,558 B2 | 3/2008 | Lee et al. |
| 7,340,566 B2 | 3/2008 | Voth et al. |
| 7,356,651 B2 | 4/2008 | Liu |
| 7,360,015 B2 | 4/2008 | Matthews et al. |
| 7,366,808 B2 | 4/2008 | Kano et al. |
| 7,395,384 B2 | 7/2008 | Sinclair |
| 7,398,348 B2 | 7/2008 | Moore et al. |
| 7,437,510 B2 | 10/2008 | Rosenbluth et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansal et al. |
| 7,516,267 B2 | 4/2009 | Coulson et al. |
| 7,526,614 B2 | 4/2009 | Van Riel |
| 7,529,905 B2 | 5/2009 | Sinclair |
| 7,536,491 B2 | 5/2009 | Kano et al. |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,620,773 B2 | 11/2009 | Nicholson et al. |
| 7,640,390 B2 | 12/2009 | Iwamura |
| 7,644,239 B2 | 1/2010 | Ergan et al. |
| 7,664,239 B2 | 1/2010 | Groff et al. |
| 7,660,911 B2 | 2/2010 | McDaniel |

(56) References Cited

U.S. PATENT DOCUMENTS

| | | |
|---|---|---|
| 7,660,941 B2 | 2/2010 | Lee et al. |
| 7,669,019 B2 | 2/2010 | Fujibayashi et al. |
| 7,676,628 B1 | 3/2010 | Compton et al. |
| 7,702,873 B2 | 4/2010 | Griess et al. |
| 7,721,059 B2 | 5/2010 | Mylly et al. |
| 7,725,628 B1 | 5/2010 | Phan et al. |
| 7,831,783 B2 | 11/2010 | Pandit et al. |
| 7,853,772 B2 | 12/2010 | Chang et al. |
| 7,873,782 B2 | 1/2011 | Terry |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,127,103 B2 | 2/2012 | Kano et al. |
| 8,135,900 B2 | 3/2012 | Kunimatsu et al. |
| 8,135,907 B2 | 3/2012 | Moore |
| 8,151,082 B2 | 4/2012 | Flynn et al. |
| 8,171,204 B2 | 5/2012 | Chow et al. |
| 8,214,583 B2 | 7/2012 | Sinclair |
| 8,392,428 B1 | 3/2013 | Bonwick et al. |
| 8,539,362 B2 | 11/2013 | Braam et al. |
| 8,627,005 B1 | 1/2014 | Bradford et al. |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2003/0061296 A1 | 3/2003 | Craddock et al. |
| 2003/0120863 A1 | 6/2003 | Lee |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0003002 A1 | 1/2004 | Adelmann |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0186946 A1 | 9/2004 | Lee |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0066124 A1 * | 3/2005 | Horn ............... G06F 11/1076 711/114 |
| 2005/0120177 A1 | 6/2005 | Black |
| 2005/0141313 A1 | 6/2005 | Gorobets |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0240713 A1 | 10/2005 | Wu et al. |
| 2005/0246510 A1 | 11/2005 | Retnamma et al. |
| 2005/0257017 A1 | 11/2005 | Yagi |
| 2005/0268359 A1 | 12/2005 | Mach et al. |
| 2005/0273476 A1 | 12/2005 | Wertheimer et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0129778 A1 | 6/2006 | Clark et al. |
| 2006/0136657 A1 | 6/2006 | Rudelic et al. |
| 2006/0143396 A1 | 6/2006 | Cabot |
| 2006/0149893 A1 | 7/2006 | Barfuss et al. |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2007/0016699 A1 | 1/2007 | Minami |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Zweighaft |
| 2007/0069318 A1 | 3/2007 | Chow et al. |
| 2007/0088666 A1 | 4/2007 | Saito |
| 2007/0106925 A1 | 5/2007 | Moore |
| 2007/0118676 A1 | 5/2007 | Kano et al. |
| 2007/0118713 A1 | 5/2007 | Guterman |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143561 A1 | 6/2007 | Gorobets |
| 2007/0143566 A1 | 6/2007 | Gorobets |
| 2007/0143567 A1 | 6/2007 | Gorobets et al. |
| 2007/0150689 A1 | 6/2007 | Pandit et al. |
| 2007/0156998 A1 | 7/2007 | Gorobets |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0233937 A1 | 10/2007 | Coulson et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0274150 A1 | 11/2007 | Gorobets |
| 2007/0300008 A1 | 12/2007 | Rogers et al. |
| 2008/0010395 A1 | 1/2008 | Mylly et al. |
| 2008/0052377 A1 | 2/2008 | Light |
| 2008/0052477 A1 | 2/2008 | Lee |
| 2008/0091876 A1 | 4/2008 | Fujibayashi et al. |
| 2008/0109090 A1 | 5/2008 | Esmaili et al. |
| 2008/0109543 A1 | 5/2008 | Abanami et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0140737 A1 | 6/2008 | Garst et al. |
| 2008/0155169 A1 | 6/2008 | Hiltgen et al. |
| 2008/0209090 A1 | 8/2008 | Kano et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0276040 A1 | 11/2008 | Moritoki |
| 2008/0294847 A1 | 11/2008 | Maruyama |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089483 A1 | 4/2009 | Tanaka et al. |
| 2009/0089485 A1 | 4/2009 | Yeh |
| 2009/0125650 A1 | 5/2009 | Sebire |
| 2009/0125669 A1 | 5/2009 | Gupta |
| 2009/0125700 A1 | 5/2009 | Kisel |
| 2009/0150599 A1 | 6/2009 | Bennett |
| 2009/0150605 A1 | 6/2009 | Flynn et al. |
| 2009/0150641 A1 | 6/2009 | Flynn et al. |
| 2009/0172257 A1 | 7/2009 | Prins et al. |
| 2009/0228637 A1 | 9/2009 | Moon |
| 2009/0248763 A1 | 10/2009 | Rajan |
| 2009/0249001 A1 | 10/2009 | Narayanan et al. |
| 2009/0276588 A1 | 11/2009 | Murase |
| 2009/0276654 A1 | 11/2009 | Butterworth |
| 2009/0287887 A1 | 11/2009 | Matsuki |
| 2009/0292861 A1 | 11/2009 | Kanevsky et al. |
| 2009/0294847 A1 | 12/2009 | Mori |
| 2009/0300277 A1 | 12/2009 | Jeddeloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005228 A1 | 1/2010 | Fukutomi |
| 2010/0017556 A1 | 1/2010 | Chin |

(56) References Cited

U.S. PATENT DOCUMENTS

| | | | |
|---|---|---|---|
| 2010/0023674 A1 | 1/2010 | Aviles | |
| 2010/0023676 A1 | 1/2010 | Moon | |
| 2010/0023682 A1 | 1/2010 | Lee | |
| 2010/0030946 A1 | 2/2010 | Kano et al. | |
| 2010/0076936 A1 | 3/2010 | Rajan | |
| 2010/0095059 A1 | 4/2010 | Kisley et al. | |
| 2010/0153617 A1 | 6/2010 | Miroschnichenko et al. | |
| 2010/0169542 A1 | 7/2010 | Sinclair | |
| 2010/0205231 A1 | 8/2010 | Cousins | |
| 2010/0211737 A1 | 8/2010 | Flynn et al. | |
| 2010/0235597 A1 | 9/2010 | Arakawa | |
| 2010/0262738 A1 | 10/2010 | Swing et al. | |
| 2010/0262740 A1 | 10/2010 | Borchers et al. | |
| 2010/0262757 A1 | 10/2010 | Sprinkle et al. | |
| 2010/0262758 A1 | 10/2010 | Swing et al. | |
| 2010/0262759 A1 | 10/2010 | Borchers et al. | |
| 2010/0262760 A1 | 10/2010 | Swing et al. | |
| 2010/0262761 A1 | 10/2010 | Borchers et al. | |
| 2010/0262762 A1 | 10/2010 | Borchers et al. | |
| 2010/0262766 A1 | 10/2010 | Sprinkle et al. | |
| 2010/0262767 A1 | 10/2010 | Borchers et al. | |
| 2010/0262773 A1 | 10/2010 | Borchers et al. | |
| 2010/0262894 A1 | 10/2010 | Swing et al. | |
| 2010/0262979 A1 | 10/2010 | Borchers et al. | |
| 2010/0263894 A1 | 10/2010 | Swing et al. | |
| 2011/0022819 A1 | 1/2011 | Post et al. | |
| 2011/0314218 A1* | 12/2011 | Bert | G06F 11/108 711/114 |
| 2013/0067179 A1* | 3/2013 | Paleologu | G06F 11/1076 711/159 |
| 2013/0166855 A1 | 6/2013 | Batwara | |
| 2013/0246707 A1* | 9/2013 | Bourbonnais | G06F 11/1076 711/114 |
| 2013/0311990 A1 | 11/2013 | Chuanbin et al. | |
| 2014/0108855 A1* | 4/2014 | Gopakumar | G06F 11/1076 714/6.2 |
| 2014/0380130 A1 | 12/2014 | Thatcher | |
| 2016/0170850 A1* | 6/2016 | Williams | G06F 11/2069 714/6.23 |

FOREIGN PATENT DOCUMENTS

| | | |
|---|---|---|
| EP | 1814039 | 3/2009 |
| GB | 0123416 | 9/2001 |
| JP | 4242848 | 8/1992 |
| JP | 8153014 | 6/1996 |
| JP | 2000259525 | 9/2000 |
| JP | 2009122850 | 6/2009 |
| WO | WO1994019746 | 9/1994 |
| WO | WO1995018407 | 7/1995 |
| WO | WO199612225 | 4/1996 |
| WO | WO200201365 | 1/2002 |
| WO | WO2004099989 | 11/2004 |
| WO | WO2005103878 | 11/2005 |
| WO | WO2006062511 | 6/2006 |
| WO | WO2006065626 | 6/2006 |
| WO | WO2008130799 | 3/2008 |
| WO | WO2008070173 | 6/2008 |
| WO | WO2008073421 | 6/2008 |
| WO | WO2011106394 | 9/2011 |

OTHER PUBLICATIONS

Terry et al., U.S. Appl. No. 60/797,127, "Filesystem-aware Block Storage System, Apparatus, and Method," filed May 3, 2006.
Van Hensbergen, "Dynamic Policy Disk Caching for Storage Networking," IBM Research Division, RC24123 (W0611-189), Nov. 2006.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wikipedia, "Object Storage Device," http://en.wikipedia.org/wiki/Object-storage-device, last visited Apr. 29, 2010, 42 pgs.
Wright, "Extending Acid Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yerrick, "Block Device," http://www.pineight.com/ds/block, last visited Mar. 1, 2010.
Zhang et al., "De-indirection for Flash-based SSDs with Nameless Writes," Usenix InFast 2012 (Feb. 14, 2012).
"Couchbase Server Manual 1.8," Couchbase, pp. 157, Feb. 13, 2012.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Agigatech, "Bulletproof Memory for RAID Servers, Part 1," http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com number: IPCOM000042269D, 2005.
Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.
Arpaci-Dusseau, "Nameless Writes," HotStorage '10, Boston, MA, Jun. 2010.
Asine, "ASPMC-660 Rugged IDE Flash Drive PMC Module", http://www.asinegroup.com/products/aspmc660.html, copyright 2002, visited Nov. 8, 2009.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.
Bonnet et al., "Flash Device Support for Database Management," published at the 5th Biennial Conference on Innovative Data Systems Research (CIDR '11), held in Asilomar, California, on Jan. 9-12, 2011.
Brandon, Jr., "Sparse Matrices in CS Education," Journal of Computing Sciences in Colleges, vol. 24 Issue 5, May 2009, pp. 93-98.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Dan et al., "Implementing MLC NAND Flash for Cost-Effective, High-Capacity Memory," M-Systems, White Paper, 91-SR-014-02-8L, Rev 1.1, Sep. 2003.
EEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.

(56) References Cited

OTHER PUBLICATIONS

Gutmann, "Secure Deletion of Data from Magnetic and Solid-State Memory", USENIX, 14 pages, San Jose, CA, published Jul. 1, 1996.
Van Hensbergen, IBM Research Report, "Dynamic Policy Disk Caching for Storage Networking," IBM Research Division, Computer Science, RC24123 (W0611-189), Nov. 28, 2006.
Huffman, "Non-Volatile Memory Host Controller Interface, (NVMHC1) 1.0," Intel, Apr. 14, 2008, 65 pgs.
Hynix Semiconductor, Intel Corporation, Micron Technology, Inc. Phison Electronics Corp., Sony Corporation, Spansion, STMicroelectronics, "Open NAND Flash Interface Specification," Revision 2.0, Feb. 27, 2008.
Hystor: "Making SSDs the Survival of the Fittest in High-Performance Storage Systems," ics10-Paper 102, Feb. 2010.
IBM, "Method to Improve Reliability of SSD Arrays," Nov. 2009.
Information Technology, "SCSI Object-Based Storage Device Commands," 2 (OSD-2), Project T10/1729-D, Revision 4, published Jul. 30, 2004, printed Jul. 24, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Mesnier, "Object-Based Storage," IEEE Communications Magazine, Aug. 2003, pp. 84-90.
Micron Technology, Inc., "NAND Flash 101: An Introduction to NAND Flash and How to Design It in to Your Next Product (TN-29-19)," http://www.micron.com/~/media/Documents/Products/Technical%20Note/NAND%20Flash/145tn2919_nand_101.pdf, 2006, visited May 10, 2010.
Micron, TN-29-08: Technical Note, "Hamming Codes for NAND Flash Memory Devices," Mar. 10, 2010.
Micron, "TN-29-17: NAND Flash Design and Use Considerations," Mar. 10, 2010.
Micron, "TN-29-42: Wear-Leveling Techniques in NAND Flash Devices," Mar. 10, 2010.
Microsoft, "How NTFS Works," Apr. 9, 2010.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Novell, "File System Primer", http://wiki.novell.com/index.php/File_System_Primer, 2006, visited Oct. 18, 2006.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u-tokyo.ac.jp/edu/training/ss/lecture/new-documents/Lectures/15-CacheManager/CacheManager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/Uploaded-Documents/docs2008/e07154r6-Data_Set_Management_Proposal_for_ATA-ACS2.pdf, printed Apr. 5, 2010.
Spansion, "Data Management Software (DMS) for AMD Simultaneous Read/Write Flash Memory Devices", published Jul. 7, 2003.
Spillane "Enabling Transactional File Access via Lightweight Kernel EXtensions", Stony Brook University, IBM T. J. Watson Research Center, published Feb. 25, 2009.
Non-Final Office Action for U.S. Appl. No. 14/253,645, filed Apr. 15, 2014, and dated Oct. 6, 2015, 18 pgs.
International Search Report and Written Opinion dated Mar. 14, 2016 for international application PCT/US2015/062473.

* cited by examiner

SYSTEMS AND METHODS FOR STORAGE ERROR MANAGEMENT

TECHNICAL FIELD

This disclosure relates to systems and methods for managing storage and, in particular, to systems, methods, apparatus, and interfaces for managing storage error conditions.

BACKGROUND

A storage array may comprise a set of two or more storage devices, and may be used to increase the capacity, performance, and reliability of storage services. A controller of the storage array may be configured to write data on two or more storage devices of the array with redundant, reconstruction metadata, such as parity information. If one or more of the write operations fails, the data stored on the array may be incomplete and/or not correspond to the reconstruction metadata (e.g., may result in a "write hole"). The storage array controller may not be capable of detecting and/or correcting such errors by use of the reconstruction metadata. Moreover, use of the reconstruction metadata on the array to correct such errors may result in further data corruption. Therefore, what are needed are systems, methods, apparatus, and/or interfaces for storage error management.

DETAILED DESCRIPTION

Figure 1A:
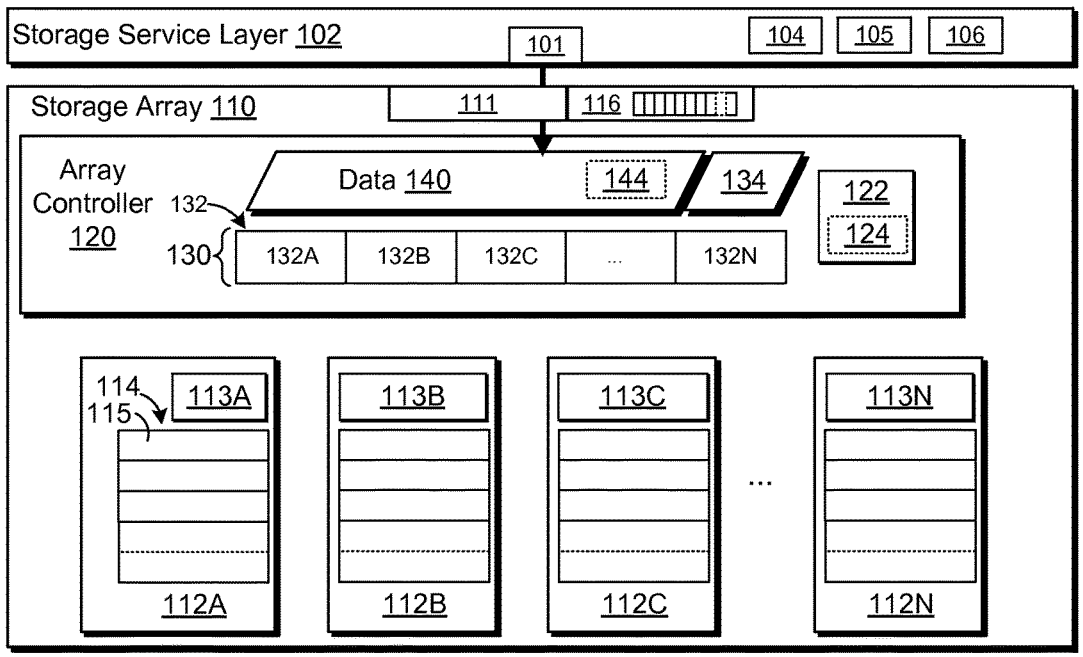
FIG. 1A is a schematic block diagram of one embodiment of a system configured to manage storage errors.

A data services layer and/or module may be configured to provide storage services to one or more clients by use of one or more lower-level storage resources. The data services layer may be configured to, inter alia, manage the storage and retrieval of data units on the lower-level storage resources. As used herein, storage resource refers to any device, service, module, and/or layer capable of servicing I/O and/or storage requests. Accordingly, a storage resource may include, but is not limited to: a hard drive (e.g., magnetic storage medium), battery-backed Random Access Memory (RAM), solid-state storage medium, disk array (e.g., a redundant array of inexpensive disks (RAID)), Storage Area Network (SAN), logical unit (e.g., a Small Computer System Interface (SCSI) compliant storage resource), virtual logical unit, software-defined storage resources, and/or the like. A storage resource may comprise physical storage media. A data unit refers to any quantum of data. Accordingly, a data unit may include, but is not limited to: a block, a sector, a segment, a page, a packet, a division, and/or the like.

In some embodiments, the data services layer manages storage and retrieval of data units on a storage array comprising a plurality of storage elements. As used herein, a storage array refers to a storage resource that comprises two or more storage elements. A storage array may include, but is not limited to: a RAID, a hybrid RAID, a nested RAID, a Just a Bunch of Disks (JBOD) storage system, a SPAN storage system, a BIG storage system, a Massive Array of Idle Drives (MAID), and/or the like. As used herein, a storage element of a storage array may comprise any suitable storage resource including, but not limited to: a storage medium, a plane, a die, a channel, a bank, a storage device, a disk, and/or the like. The storage elements of a storage array may be managed by an array controller, which may include, but is not limited to: a controller, a storage controller, a storage array controller, a software array controller, a hardware array controller, a storage engine, a RAID controller, a RAID storage engine, a RAID storage system, a software RAID controller, a hardware RAID controller, and/or the like. The array controller may be configured to store "data groups" on storage elements of the storage array. As used herein, a "data group" refers to a collection of two or more data units configured for storage on different respective storage elements of a storage array. In some embodiments, the data units of a storage array may differ from data units of an upper-level storage client (e.g., the data units of the storage array may correspond to a storage granularity of the underlying storage elements of the storage array). The data units of a storage array data group may, therefore, correspond to storage element blocks, pages, sectors, packets, segments, and/or other storage locations of the storage elements of the storage array.

In some embodiments, the array controller is configured to store data groups on two or more different storage elements of the storage array. The controller may be further configured to store data groups redundantly by, inter alia, mirroring data groups on two or more different storage elements. Alternatively or in addition, the array controller may be further configured to manage array metadata pertaining to data groups being written to the storage array. As used herein, "array metadata" refers to any metadata pertaining to a data group being written to the storage array and may include, but is not limited to: data configured for validating the integrity of data stored on the storage array (and/or read from the storage elements), such as a hash value, parity data, a digest, a signature, a checksum, and/or the like; error detection metadata for identifying error(s) in stored data groups; error correction metadata for correcting error(s) in stored data groups (e.g., error-correcting code (ECC) metadata, such as an ECC encoding, ECC symbol data, and/or the like); reconstruction data for reconstructing portions of stored data groups (e.g., parity reconstruction data); and/or the like. Accordingly, writing a data group to the storage array may comprise a) generating array metadata for the data group and b) performing a plurality of write operations on different storage elements of the storage array. An error in one or more of the write operations may result in storage of an "incomplete" or "corrupt" data group on the storage array. As used herein, an "incomplete data group" refers to a data group that is partially, but not completely, written to the storage array. An incomplete data group may refer to writing only a portion of a data group to the storage array, such that other portions of the data group are not written to the storage array. Writing an incomplete data group may comprise writing a subset of the data units of a data group to the storage array (e.g., writing one or more data units of the data group without writing one or more other data units of the data group to the storage array). Alternatively, or in addition, an incomplete data group may refer to writing the data units of a data group without writing the corresponding array metadata. Accordingly, an "incomplete" data group may be referred to as a data group that comprises a "write hole." As disclosed above, a write hole may result from an "invalid shutdown" condition. As used herein, an "invalid shutdown" condition refers to any failure and/or interruption to a storage operation of the storage array and can include, but is not limited to: power loss, power interruption, power aberration, a crash condition an error condition, an interrupt, a crash, a fault, a hardware fault, a software fault, and/or any other condition other than a clean shutdown of the storage array and/or a component thereof. An invalid shutdown condition may correspond to an invalid shutdown condition of the storage array (e.g., the storage array controller), an invalid shutdown of a storage element, an invalid shutdown of communication infrastructure of the storage array, an invalid shutdown of an upper-level storage client, an invalid shutdown of a computing system comprising the storage array, a storage element and/or upper-level storage client, and/or the like.

A storage service layer may be configured to identify write holes by, inter alia, storing integrity data pertaining to storage operations performed on the storage array. The integrity data may be separate from and/or independent of array metadata managed by the storage array. As used herein, "integrity data" may refer to any information, data, and/or datum configured for verifying the integrity of data written to a storage array (and/or read from the storage array) and may include, but is not limited to: a hash value, a digest value, a signature, a checksum, and/or the like. The integrity data may be configured to validate the integrity of a set of data units and/or data segments being written to the storage array as a data group. In some embodiments, the integrity data is configured to provide for validating respective data units and/or data segments of the data group. As disclosed in further detail herein, a storage service layer may use integrity data corresponding to stored data groups to identify write holes within the data groups. The storage service layer may be configured to replace, override, and/or preempt existing recovery operations of the storage array.

Disclosed herein are embodiments of an apparatus for managing storage errors, such as write holes in data groups stored on a storage array. The apparatus may comprise a storage service layer configured to generate integrity metadata corresponding to data being stored within respective data groups by a storage engine. The storage engine may be configured to store the data groups with reconstruction metadata on a storage array. The apparatus may further include a validation manager of the storage service layer that is configured to recover from an invalid shutdown of the storage array by use of the integrity metadata, wherein the storage service layer is configured to replace a recovery operation of the storage engine by use of the validation manager. In some embodiments, the storage engine is configured to write data groups to a plurality of different storage devices of the storage array, and the recovery operation of the storage engine is configured to determine whether the invalid shutdown resulted in partial storage of a data group on the storage array, and wherein the validation manager is configured to replace the recovery operation of the storage engine by determining whether the invalid shutdown resulted in incomplete storage of a data group on the storage array by use of the integrity metadata. The validation manager may be configured to identify an incomplete data group stored on the storage array in response to a mismatch between integrity metadata generated for the data group and integrity metadata derived from data read from the storage array.

The apparatus may further comprise a recovery module configured to invalidate at least a portion of an incomplete data group identified by the validation manager. The recovery operation of the storage engine may comprise validating a set of stored data groups by use of the reconstruction metadata stored with the respective data groups on the storage array. The validation manager may be configured to replace the recovery operation of the storage engine by validating a subset of the data groups stored on the storage array. In some embodiments, the apparatus comprises a log storage module configured to write data to an append point of a storage log on the storage array by use of the storage engine. The verification module may be configured to validate a data group corresponding to the append point of the storage log in response to the invalid shutdown.

In some embodiments, the apparatus comprises a coordination module configured to direct the storage engine to delegate recovery from the invalid shutdown of the storage array to the storage layer. The coordination module may be configured to prevent the storage engine from implementing a resynchronization operation in response to the invalid shutdown, wherein the resynchronization operation comprises the storage engine validating data groups stored on the storage array by use of the reconstruction metadata stored with the data groups by the storage engine.

Disclosed herein are embodiments of a system for managing storage errors. The disclosed system may comprise a storage layer that stores integrity data corresponding to data being stored within respective data stripes of a RAID storage system, wherein the stored data stripes comprise parity reconstruction data generated by the RAID storage system, a crash recovery module of the storage layer that validates data stripes of the RAID storage system by use of the stored integrity data in response to an invalid shutdown of the RAID storage system, and a storage coordination module of the storage layer configured to perform crash recovery pertaining to the invalid shutdown in place of the RAID storage system.

The storage coordination module may be configured to block performance of a crash recovery operation by the RAID storage system in response to the invalid shutdown. In some embodiments, the storage coordination module is configured to notify the RAID storage system that the storage layer is configured to identify data stripe write errors, wherein the crash recovery module is configured to identify a data stripe write error by comparing stored integrity data of the data stripe to integrity data generated from the stored data stripe read from the RAID storage system. The RAID storage system may be configured to implement a resynchronization operation in response to the invalid shutdown and the storage coordination module may be configured to transmit a message to the RAID storage system in response to the invalid shutdown to prevent the RAID storage system from implementing the resynchronization operation.

The integrity data of a stored data stripe may comprise an integrity datum corresponding to each of a plurality of data units within the stored data stripe. The crash recovery module may be configured to invalidate a particular one of the data units in response to a mismatch between the stored integrity datum of the particular data unit and an integrity datum derived from the particular data unit within the stored data stripe, and to rewrite one or more other data units within the stored data stripe in response to validating the stored integrity data of the one or more other data units.

Disclosed herein are embodiments of a method for managing storage errors. The disclosed method may comprise appending data groups to a storage log maintained on a storage array by use of a storage array controller, wherein the storage array controller is configured to store the data groups within respective data stripes on the storage array, the data stripes comprising reconstruction metadata generated by the storage array controller, storing checksum values corresponding to the data groups stored within the respective data stripes on the storage array, and preempting a crash recovery operation of the storage array controller in response to an invalid shutdown of the storage array, wherein preempting the crash recovery operation comprises validating a data stripe at the head of the storage log on the storage array by use of the stored checksum values corresponding to the data groups stored within the respective data stripes on the storage array.

Embodiments of the disclosed method may further comprise identifying the data stripe at the head of the storage log in response to the invalid shutdown, and comparing a checksum value derived from the identified data stripe to the stored checksum value corresponding to the identified data stripe. In some embodiments, the method further includes invalidating the stored data stripe in response to a mismatch between the checksum value derived from the identified data stripe and the stored checksum value. The data stripe at the head of the storage log may comprise a plurality of data blocks mapped to respective addresses of a logical address space. The method may further comprise invalidating associations between the data stripe and the respective addresses in response to a mismatch between the checksum value derived from the identified data stripe and the stored checksum value.

Storing the checksum values may comprise appending mapping entries comprising the checksum values to a metadata log maintained on a storage device that is independent of the storage array, wherein the mapping entries associate data blocks within the respective data stripes with respective logical addresses of a logical address space. Alternatively, storing the checksum value of a data stripe may comprise including the checksum value in the data group stored within the data stripe on the storage array. The stored checksum values of the data stripes may comprise respective checksum values for each of a plurality of data segments within the respective data stripes. Validating the identified data stripe may comprise validating the respective checksum values of the data segments within the identified data stripe. The method may further include invalidating a first data segment within the identified data stripe in response to a checksum mismatch pertaining to the first data segment, and rewriting a second data segment within the identified data stripe to a different data stripe on the storage array in response to validating the second data segment by use of the stored checksum value of the second data segment.

FIG. 1A is a schematic block diagram of one embodiment of a system 100A comprising a storage array 110. The storage array 110 comprises a plurality of storage elements 112A-N. The array controller 120 may be configured to manage storage operations pertaining to the storage array 110, which may comprise managing data storage and/or retrieval operations on the respective storage elements 112A-N. In one embodiment, the storage array 110 comprises a RAID storage system. The array controller 120 may, therefore, comprise a software RAID controller, a hardware RAID controller, a RAID storage engine, a RAID storage driver, a RAID storage service, and/or the like.

As disclosed above, the storage elements 112A-N may include respective storage devices, disks, storage channels, storage media, respective storage planes and/or die of a storage medium, storage channels, storage banks, and/or the like. The storage elements 112A-N may comprise respective storage media 114, comprising storage locations 115 capable of storing respective data units, as disclosed herein. In some embodiments, the storage elements 112A-N comprise respective storage element controllers 113A-N configured to, inter alia, manage data storage and/or retrieval operations on the storage locations 115.

In some embodiments, the storage array 110 is configured to provide storage services through, inter alia, an interface 111. The interface 111 of the storage array 110 may include, but is not limited to: a storage interface, a block storage interface, a block storage device interface, a storage system interface, a RAID storage interface, a RAID storage engine, an object storage interface, a direct file interface, a database storage interface, a key-value storage interface, a storage engine, a network storage protocol interface, a custom interface, a driver, a library, an Application Programming Interface (API), and/or the like. The storage array 110 may comprise a storage address space 116 configured to, inter alia, provide for referencing storage resources of the storage array 110. The storage address space 116 may comprise storage addresses corresponding to respective storage locations 115 of the respective storage elements 112A-N. Alternatively, or in addition, the storage address space 116 may comprise storage addresses configured to reference data groups 130 (and/or offsets within data groups 130) stored on storage array 110, as disclosed in further detail herein.

The system 100A may further comprise a storage service layer 102 configured to perform data storage and/or retrieval operations on the storage array 110 (by use of a coordination module 101). The storage service layer 102 (and/or the components thereof) may be embodied as hardware components of a computing device, such as a circuit, an integrated circuit, an Application-Specific Integrated Circuit (ASIC), programmable hardware, a Programmable Logic Array (PLA), a Field Programmable Gate Array (FPGA), controller hardware, storage controller hardware, and/or the like. Accordingly, in some embodiments, the storage array 102 may be referred to as a storage circuit, a storage service circuit, storage hardware, and/or the like. Alternatively, or in addition, portions of the storage service layer 102 (and/or the components thereof) may be embodied as instructions stored on a machine-readable storage medium, such as a magnetic hard disk, solid-state storage device, non-volatile storage medium, volatile storage medium, optical storage device, and/or the like. In some embodiments, portions of the storage service layer 102 are embodied as instructions configured for execution by specific types of hardware, such as firmware, an FPGA, an FPGA bitstream, PLA configuration data, and/or the like. Accordingly, in some embodiments, portions of the storage service layer 102 (and/or components thereof) comprise read only data stored on a particular hardware device (e.g., stored on a Read Only Memory (ROM), an Erasable Programmable Read Only Memory (EPROM), and/or the like). The instructions of the storage service layer 102 may be executed and/or interpreted by a machine to implement functionality disclosed herein. Portions of the storage service layer 102 (and/or the components thereof) may comprise: a kernel-level module, a user-space module, a driver-level module, a driver, an I/O controller, an I/O manager, an I/O layer, an I/O service, a storage driver, a storage manager, a storage layer, a software-defined storage layer, a SCSI module, a library, a shared library, a loadable library, a dynamic-link library (DLL) library, a device driver, a device driver interface (DDI) module, a logical device driver (LDD) module, a physical device driver (PDD) module, a windows driver foundation (WFD) module, a user-mode driver framework (UMDF) module, a kernel-mode driver framework (KMDF) module, an I/O Kit module, a uniform driver interface (UDI) module, storage device interface (SDI) module, a software development kit (SDK), and/or the like.

The storage service layer 102 may comprise a logical address space 104 comprising a plurality of logical addresses. As disclosed in further detail herein, the storage service layer 102 may perform storage operations pertaining to the logical address space 104 by use of one or more storage resources, such as the storage array 110. The storage service layer 102 may issue requests pertaining to data of the logical address space through, inter alia, the interface 111 of the storage array 110. The storage service layer 102 may be configured to service storage requests pertaining to logical addresses of the logical address space 104 by use of the storage array 110. The storage service layer 102 may be further comprise a translation layer 105 configured to associate logical addresses of the logical address space 104 with storage locations, such as storage addresses of the storage address space 116. The translation layer 105 may be configured to map data of a particular logical address to a storage address on the storage array 110. Accordingly, the translation layer 105 of the storage service layer 102 may maintain contextual metadata pertaining to data stored on the storage array 110.

The array controller 120 may be configured to service write requests directed to the storage array 110 by, inter alia, writing data of the requests (data 140) on the storage elements 112A-N. The array controller 120 may be configured to store data in respective data groups 130, on the storage array 110. As used herein, a "data group" 130 refers to a collection of two or more data units 132, configured for storage on different respective storage elements 112A-N. The data units 132 may be configured for storage within respective storage locations 115 of the storage elements 112A-N (e.g., the data units 132 may be sized in accordance with the underlying storage blocks, pages, and/or segments of the storage elements 112A-N). Accordingly, writing a data group 130 to the storage array 110 may comprise a plurality of separate write operations on different respective storage elements 112A-N. As illustrated in FIG. 1A, the array controller 120 may be configured to write data groups 130 comprising N data units 132 (e.g., data units 132A-N), such that each data unit 132A-N is written to a different respective storage element 112A-N. The array controller 120 may write data unit 132A to storage element 112A, write data unit 132B to storage element 112B, and so on (e.g., write data unit 132N to storage element 112N). The array controller 120 may be further configured to store data groups 130 redundantly by, inter alia, writing multiple copies of the data group 130 (and/or particular data unit 132 thereof) to different storage elements 112A-N and/or different storage resources (not shown). Although particular embodiments of data groups 130 are described herein, the disclosure is not limited in this regard, and could be adapted for use with data groups 130 comprising any number of data unit(s) 132 configured for storage in any suitable arrangement on the storage elements 112A-N of the storage array 110.

In some embodiments, the array controller 120 is configured to manage array metadata 134 pertaining to the data groups 130 stored on the storage array 110. As disclosed above, array metadata 134 refers to any metadata pertaining to a data group 130 being written to the storage array 110 and may include, but is not limited to: data configured for validating the integrity of data stored on the storage array (and/or read from the storage elements), such as a hash value, a digest, a signature, a checksum, and/or the like; error detection metadata for identifying error(s) in a stored data group 130; error correction metadata for correcting error(s) in a stored data group 130; reconstruction data for reconstructing portions of a stored data group 130 (e.g., parity reconstruction data); and/or the like. The array controller 120 may be configured to store array metadata 134 of a data group 130 within the data group 130 itself (e.g., as a data unit 132 of the data group 130). Alternatively, the array controller 120 may write array metadata 134 of a data group 130 to a separate storage location within the storage array 110 and/or to another storage resource.

In the FIG. 1A embodiment, the array controller 120 is configured to write array metadata 134 as a data unit 132N within the data group 130. Accordingly, a data group 130 may comprise data units 132A-N−1 used to store data of a write request (data 140), and other data units to store array metadata 134 (e.g., data unit 132N). In some embodiments, the array metadata 134 comprises parity reconstruction data derived from the contents of the other N−1 data units 132 of the data group 130 (e.g., the array metadata 134 may comprise parity reconstruction data derived from the contents of data units 132A-132N−1). The array metadata 134 of data unit 132N may be calculated by an XOR operation on the contents of data units 132A-N−1 (e.g., the array metadata 134 may be generated as the product of: data unit 132AXOR data unit 132BXOR data unit 132C . . . XOR data unit 132N−1). The disclosure is not limited in this regard, however, and may be adapted for use with a storage array 110 configured to store data groups 130 and/or array metadata 134 in any suitable storage location and/or arrangement. In some embodiments, the array controller 120 may be configured to generate array metadata 134 for storage in a plurality of the data units 132 of a data group 130 (e.g., two or more data units 132 of the data group 130 may be used to store SAI data 134 of the data group). Alternatively, or in addition, the array controller 120 may be configured to store SAI data 134 in different data units 132A-N of a data group 130 (e.g., rotate the location of the SAI data 134 in respective data groups 130), store SAI data 134 in a separate storage location and/or storage resource, and/or the like. Accordingly, the storage array 110 may be configured to implement any suitable RAID level comprising any suitable type of redundancy and/or mirrored storage configuration. Accordingly, in some embodiments, the data groups 130 may comprise RAID data stripes and the array metadata 134 of the data groups 130 may comprise RAID reconstruction data.

The array controller 120 may write data groups 130 to the storage array 110 by, inter alia, issuing a plurality of write requests to respective storage elements 112A-N. As illustrated in the schematic block diagram 100B of FIG. 1B, the storage controller 120 writes a data group 130 comprising data units 132A-N by issuing a write request 133A to storage element 112A (to write data unit 132A on storage location 115A); a write request 133B to storage element 112B (to write data unit 132B on storage location 115B); a write request 133C to storage element 112C (to write data unit 132C on storage location 115C), and so on (write request 133N to storage element 112N to write the array metadata 134 of data unit 132N on storage location 115N).

The array controller 120 may be configured to manage the integrity of data groups 130 stored on the storage array 110 by use of a recovery module 122. The recovery module 122 may be configured to implement one or more crash recovery and/or data validation operations, which may include, but are not limited to: resynchronization operations to resynchronize array metadata 134 of one or more stored data groups 130, rebuild operations to reconstruct the contents of one or more data units 132 of a stored data group 130 by use of other data unit 132 of the stored data group 130 and/or the array metadata 134 of the stored data group 130, and the like.

The recovery module 122 may be configured to validate a stored data group 130 by a) accessing data of the stored data group 130 (e.g., data unit 132A-N) and/or stored array metadata 134, and comparing the accessed data to the array metadata 134 of the data group 130. In the FIG. 1C embodiment, the data unit 132N of the data group 130 may comprise array metadata 134 derived from the contents of other data units 132A-N−1 (e.g., by use of a XOR operation on data units 132A-N−1, as disclosed herein). The recovery module 122 may validate the stored data group 130 by a) accessing the data unit 132A-N of the data group 130 (including the array metadata 134 of data group 130), b) calculating validation data 136 by use of the data units 132A-N−1 (e.g., by an XOR calculation on the accessed data units 132A-N−1, such that validation data 136=data unit 132AXOR data unit 132BXOR data unit 132C . . . XOR data unit 132N−1), and c) comparing the validation data 136 to the accessed array metadata 134. The validation failure may not indicate the nature of the error, such as which data unit(s) 132 comprise invalid data 131. Moreover, since the storage array 110 does not have access to contextual information pertaining to the data group 130, such as the logical addresses associated with data units 132 of the data group 130, the storage array 110 may be unable to adequately handle the write hole.

Figure 1B:
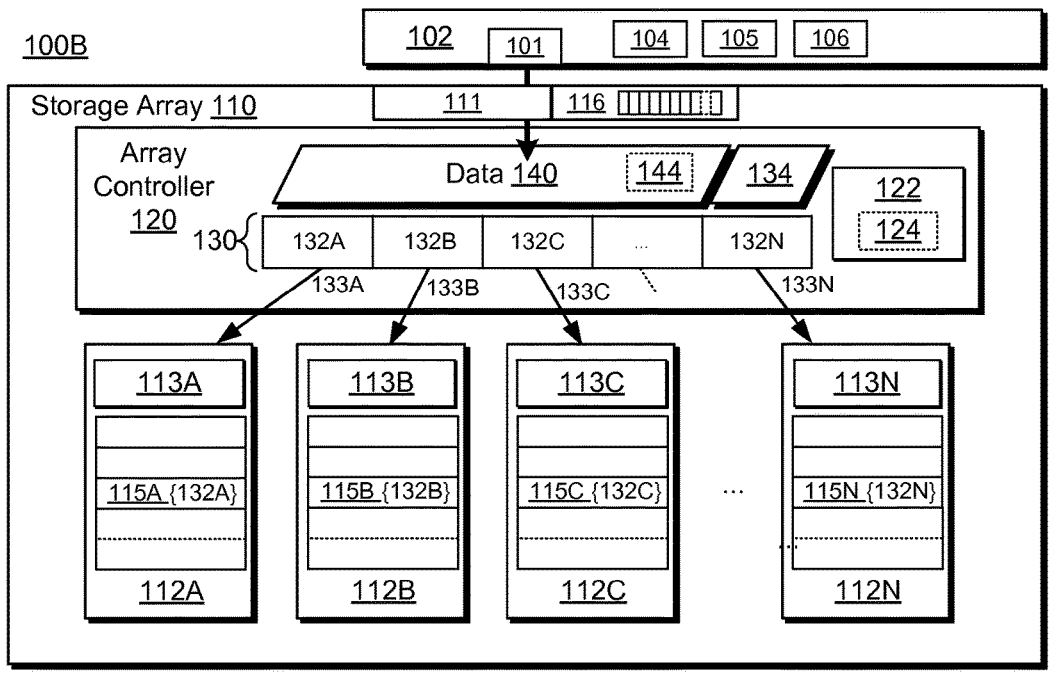
FIG. 1B is a schematic block diagram of one embodiment of an operation to write a data group to a storage array.
Figure 1C:
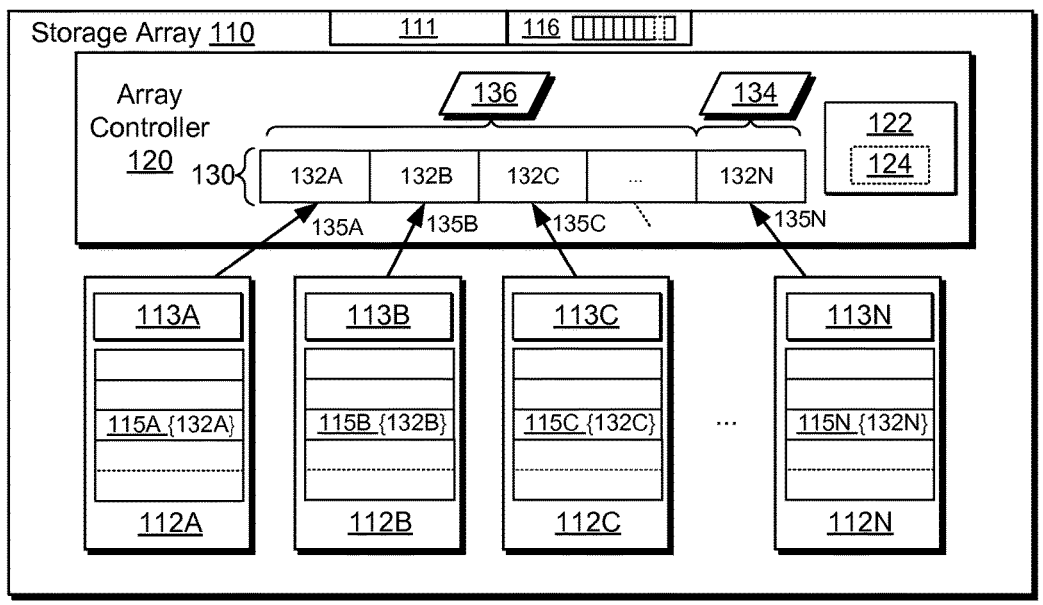
FIG. 1C is a schematic block diagram of one embodiment of an operation to validate a data group stored on a storage array.
Figure 1D:
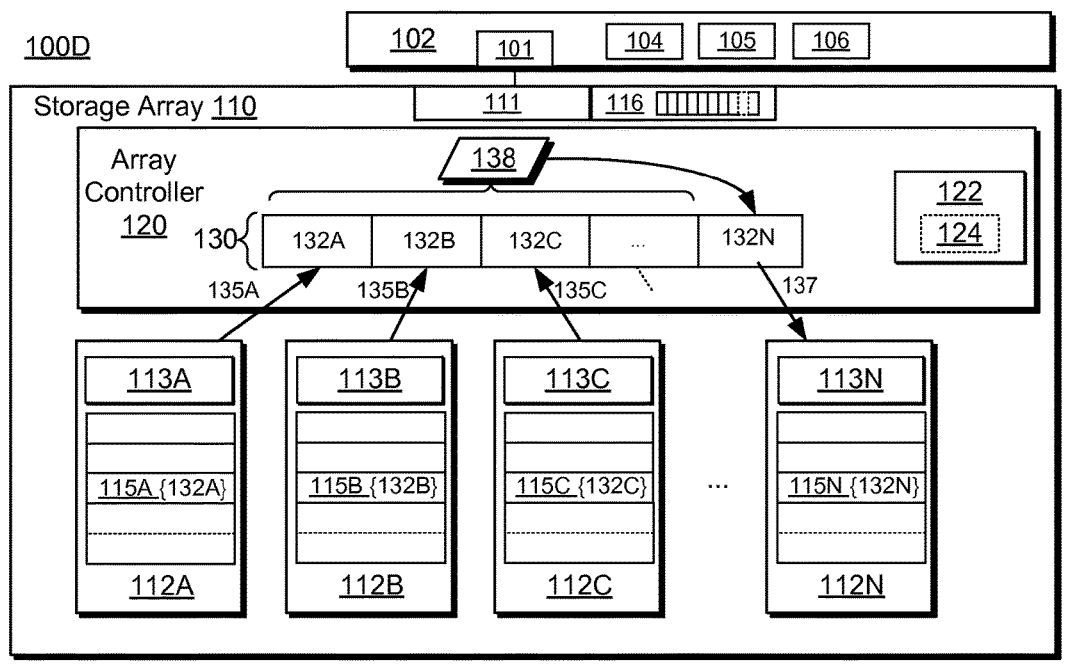
FIG. 1D is a schematic block diagram of one embodiment of an operation to resynchronize a data group stored on a storage array.
Figure 1E:
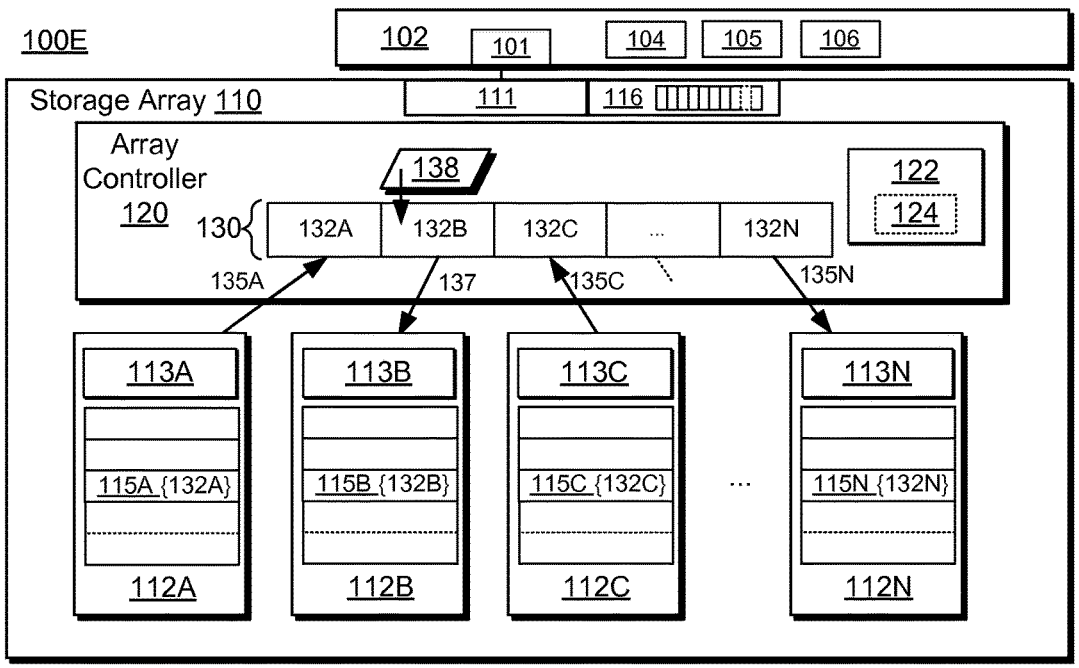
FIG. 1E is a schematic block diagram of one embodiment of an operation to recover a portion of a data group stored on a storage array.

Referring to the schematic block diagram 100D of FIG. 1D, the array controller 120 may be configured to resynchronize a stored data group 130 (using the recovery module 122) by a) accessing data unit 132A-N−1 of the stored data group 130, b) deriving replacement array metadata 138 from the contents of the accessed data, and c) writing the replacement array metadata 138 to the storage array 110, which may comprise issuing a write request 137 to write the replacement array metadata 138 to one or more storage elements 112A-N. The write request 137 may be configured to replace and/or overwrite the array metadata 134 originally stored with the data group 130. Accordingly, in the FIG. 1D embodiment, the replacement array metadata 138 may be configured to overwrite the contents of storage location 115N. Alternatively, the replacement array metadata 138 may be written to a different storage location, and the array controller 120 may remap the array metadata 134 of the stored data group 130 to the different storage location. Referring to the schematic block diagram 100E of FIG. 1E, the array controller 120 may be configured to reconstruct the contents of one of the data unit 132 of a stored data group 130 by use of other data unit 132 of the stored data group 130 and/or the array metadata 134. In the FIG. 1E embodiment, the recovery module 122 reconstructs the contents of a data unit 132B by a) accessing other data units 132A and 132C-N of the stored data group 130 (including array metadata 134 of data unit 132N) by use of respective read requests 135A, 135C-N, b) generating the replacement data 138 for the data unit 132B by use of the accessed data (by an XOR calculation, wherein replacement data 138 of data unit 132B=data unit 132A XOR data unit 132C ... XOR data unit 132N). The recovery module 122 may be further configured to write the replacement data 138 to the storage array 110 (by issuing a write request 137, as disclosed herein). The write request 137 may be configured to overwrite the original contents of data unit 132B (at storage location 115B). Alternatively, the write request 137 may be configured to write the replacement data 138 to a different storage location, as disclosed herein). Although FIGS. 1C-1D depict particular embodiments of recovery operations of the storage array 110, the disclosure is not limited in this regard and could be adapted for use with a storage array 110 configured to implement any suitable type of crash recovery operation pertaining to data groups 130 stored in any suitable configuration (and/or with any type and/or configuration of array metadata 134).

Referring back to FIG. 1B, writing a data group 130 to the storage array 110 may comprise issuing a plurality of write requests 133A-N to different respective storage elements 112A-N (through respective storage element controllers 113A-N). An error in completing one or more of the write requests 133A-N may result in storage of an incomplete and/or corrupt data group 130. As used herein, an incomplete data group 130 refers to a data group 130 in which one or more of the data units 132A-N were not correctly written to a storage element 112A-N (and/or in which separate array metadata 134 was not correctly stored). Accordingly, an incomplete data group 130 may refer to a data group 130 that comprises a "write hole." A write hole may result from an error in a lower level of the storage array 110, such as a "silent" error that occurs in one or more of the storage elements 112A-N (and/or is not reported to the array controller 120). Alternatively, or in addition, a write hole may result from an invalid shutdown condition. As used herein, an invalid shutdown may include, but is not limited to: an invalid shutdown of the storage array 110, a crash of the storage array 110, an invalid shutdown of one or more of the storage elements 112A-N, a crash of one or more of the storage elements 112A-N, an invalid shutdown of the array controller 120, a crash of the array controller 120, and/or the like.

In the FIG. 1B embodiment, an invalid shutdown during execution of the write operation 133B (and after completion of other write operations 133A and 133C-N) may result in a write hole in the stored data group 130. The array controller 120 may not be capable of detecting and/or correcting write hole conditions. Read operations pertaining to a stored data group 130 comprising a write hole may result in returning invalid and/or corrupt data. Moreover, array recovery operations 124 implemented by the array controller 120 may not only fail to identify write holes, but could propagate corrupt data within the storage array 110. Resynchronizing a stored data group 130 comprising a write hole may result in writing invalid replacement array metadata 138 to the data group 130. Similarly, reconstructing data of a stored data group 130 comprising a write hole may result in additional data corruption within the stored data group 130.

Figure 1F:
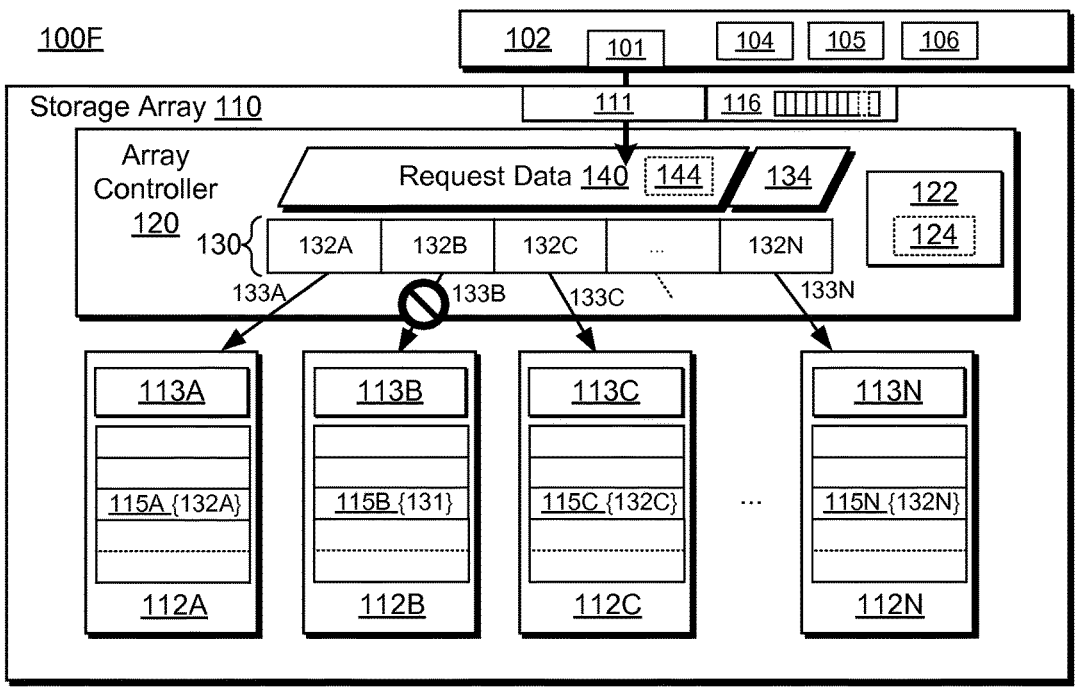
FIG. 1F is a schematic block diagram of one embodiment of a write hole in a storage array.

FIG. 1F is a schematic block diagram of one embodiment of a system 100F comprising a storage service layer configured to manage storage operations of a storage array 110. In the FIG. 1F embodiment, an invalid shutdown (or other error condition) occurs while writing data unit 132B to storage element 112B. Accordingly, the storage location 115B comprises invalid data 131 rather than the contents of data unit 132B. Other write requests 133A and 133C-N may complete successfully with the storage of data unit 132A and 132C-N to respective storage elements 112A and 112C-N.

The storage array 110 may detect the invalid shutdown condition that resulted in the write hole and, in response, may execute one or more array recovery operations 124, which may include, but are not limited to: resynchronizing one or more stored data groups 130, recovering data of one or more data groups 130, and/or the like. The array recovery operations 124 may consume substantial I/O resources, and may result in propagating data corruption within the storage array 110. In some embodiments, the array recovery operations 124 comprise resynchronizing all of the stored data groups 130 on the storage array 110. Storage services of the storage array 110 may be unavailable while the array recovery operations 124 are implemented. In embodiments comprising large capacity storage elements 112A-N, resynchronizing the storage array 110 may take a considerable amount of time and/or consume a large amount of I/O resources. As disclosed above, resynchronizing a stored data group 130 may comprise a) accessing stored data of the data group 130, including the invalid data 131 on storage location 115B, b) calculating replacement array metadata 138, and c) writing the replacement array metadata 138 to the storage array 110. Accordingly, the replacement array metadata 138 may incorporate the invalid data 131 of data unit 132B (replacing the valid array metadata 134). Similarly, an operation to read and/or reconstruct one of the other data unit 132A and/or 132C-N-1 may result in reconstructing invalid data due to, inter alia, use of the corrupt data 131 of data unit 132B.

Referring back to FIG. 1A, the system 100A may further comprise a storage service layer 102 configured to access the storage array 110 through an interface 111 of the storage array 110, and by use of a coordination module 101. The interface 111 of the storage array 110 may include, but is not limited to: a storage interface, a block storage interface, a block storage device interface, a storage system interface, a RAID storage interface, a RAID storage engine, an object storage interface, a direct file interface, a database storage interface, a key-value storage interface, a storage engine, a network storage protocol interface, a custom interface, a driver, a library, an Application Programming Interface (API), and/or the like. The storage service layer 102 may be configured to perform data storage and/or retrieval operations on the storage array 110 through the interface 111 by, inter alia, issuing requests to write data to the storage array 110, such as the data 140, issuing requests to read data from the storage array 110, and so on.

The storage layer 102 may further comprise a validation manager 106 configured to validate data 140 written to the storage array 110 (e.g., validate data units 132A-N-1 stored within a data group 130). The validation manager 106 may be configured to validate stored data groups 130 independent of the array metadata 134 (and/or other reconstruction information) managed by the storage array 110. In some embodiments, the validation manager 106 is configured to generate integrity data 144 corresponding to data 140 being written to the storage array 110. The storage service layer 102 may include the integrity data 144 in the data 140 being written to the storage array 110, such that the integrity data 144 is stored with the data 140 in a data group 130. Alternatively, the storage layer 102 may be configured to write the integrity data 144 to a separate storage resource (not shown). In some embodiments, the integrity data 144 comprises validation information derived from the data 140, such as a hash value, a signature, a checksum, and/or the like. As disclosed in further detail herein, the validation manager 106 may use the integrity data 144 to identify write holes due to, inter alia, invalid shutdown conditions, which may include, but are not limited to: invalid shutdown of the storage service layer 102, crash of the storage service layer 102, invalid shutdown of the storage array 110, crash of the storage array 110, invalid shutdown of one or more of the storage elements 112A-N, crash of one or more of the storage elements 112A-N, invalid shutdown of the array controller 120, crash of the array controller 120, and/or the like, as disclosed herein.

In response to detecting an invalid shutdown, the validation manager 106 may be configured to implement one or more recovery operations pertaining to the storage array 110. The validation manager 106 may be configured to identify write holes in data groups 130 stored on the storage array 110 more efficiently than the array controller 120 and/or may prevent corrupt data from being propagated within the storage array 110. The recovery operations implemented by the validation manager 106 may be configured to replace and/or preempt one or more crash recovery operations of the storage array 110 (e.g., replace and/or preempt one or more of the array recovery operations 124, disclosed herein, and/or other crash recovery operations of the storage array 110). In some embodiments, the storage service layer 102 is configured to prevent the storage array 110 from implementing the array recovery operations 124 and/or configuring the storage array 110 to delegate crash recovery to the storage service layer 102 (by use of a coordination module 101). The coordination module 101 may be configured to prevent the storage array 110 from implementing selected array recovery operations 124 after detection of an invalid shutdown condition. The coordination module 101 may configure the storage array 110 to delegate crash recovery to the storage service layer 102 through and/or by use of the interface 111 of the storage array 110, which may include, but is not limited to: configuring the storage array 110 to delegate crash recovery to the storage service layer 102 through the interface 111, issuing one or more configuration commands to the storage array 110 through the interface 111, setting configuration parameters of the storage array 110 through the interface 111 (and/or another configuration interface of the storage array 110), transmitting a message to the storage array 110 through the interface 111 and/or another communication channel, sending a directive and/or command to the storage array 110 through the interface 111 and/or another communication channel, and/or the like.

Figure 1G:
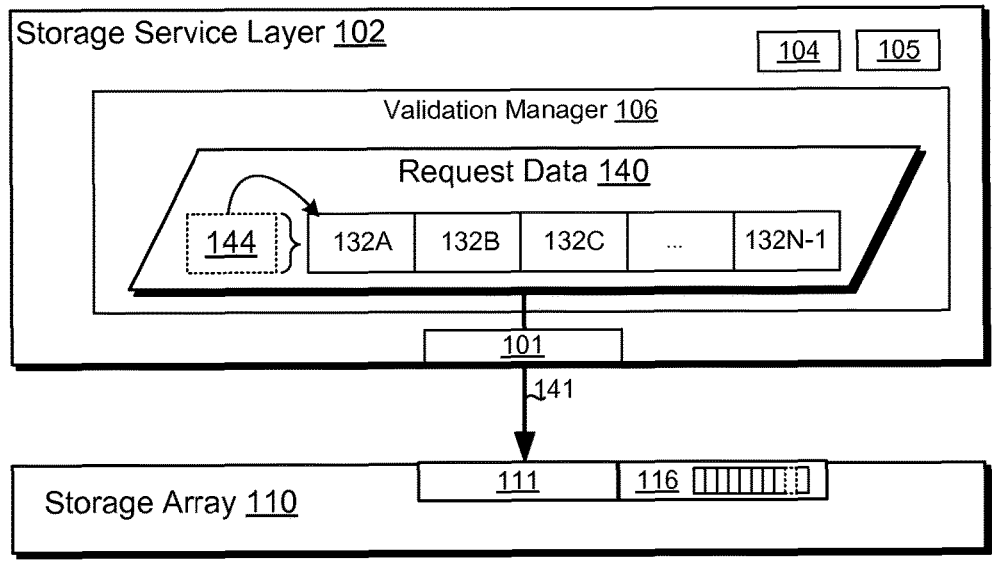
FIG. 1G is a schematic block diagram of one embodiment of a storage layer configured to write integrity data pertaining to data groups.

As disclosed above, the validation manager 106 may be configured to identify and manage write hole conditions on the storage array 110 by use of integrity data 144 corresponding to the data groups 130. As illustrated in FIG. 1G, the validation manager 106 may be configured to generate integrity data 144 corresponding to data 140 that is being written to the storage array 110. The integrity data 144 may comprise a hash code, signature, checksum, digest, and/or other data corresponding to the contents of the data 140 (e.g., contents of data units 132A-N-1). In some embodiments, the integrity data 144 is included in one or more of the data blocks 132A-N-1. In the FIG. 1G embodiment, the validation manager 106 stores the integrity data 144 in data unit 132A. The integrity data 144 may be stored as a separate data unit 132 and/or may be included with other contents of the data unit 132 (e.g., may be embedded in another data unit). Alternatively, the integrity data 144 may be stored in a separate storage location, such as a metadata log, as disclosed in further detail herein. In the FIG. 1G embodiment, the integrity data 144 may be included in data unit 132A. The data 140, including the integrity data 144, may be written as a data group 130 on the storage array 110, as disclosed herein (e.g., in response to a write request 141 from the storage service layer 102).

In some embodiments, the integrity data 144 corresponds to contents of the data units 132A-N-1. Accordingly, the integrity data 144 may indicate if any one of the data units 132A-N-1 comprises invalid data (e.g., invalid data 131). Alternatively, the integrity data 144 may comprise a plurality of integrity datum corresponding to respective data units 132A-N-1. The integrity data 144 may include an integrity datum corresponding to data unit 132A (e.g., a checksum of data unit 132A), an integrity datum corresponding to data unit 132B, and so on. As disclosed in further in conjunction with FIG. 1I, the validation manager 106 may use the respective integrity datum to determine whether particular data units 132A-N-1 comprise valid data, identify the specific location of a write hole within a data group 130, and/or reconstruct one or more of the data units 132A-N.

Figure 1H:
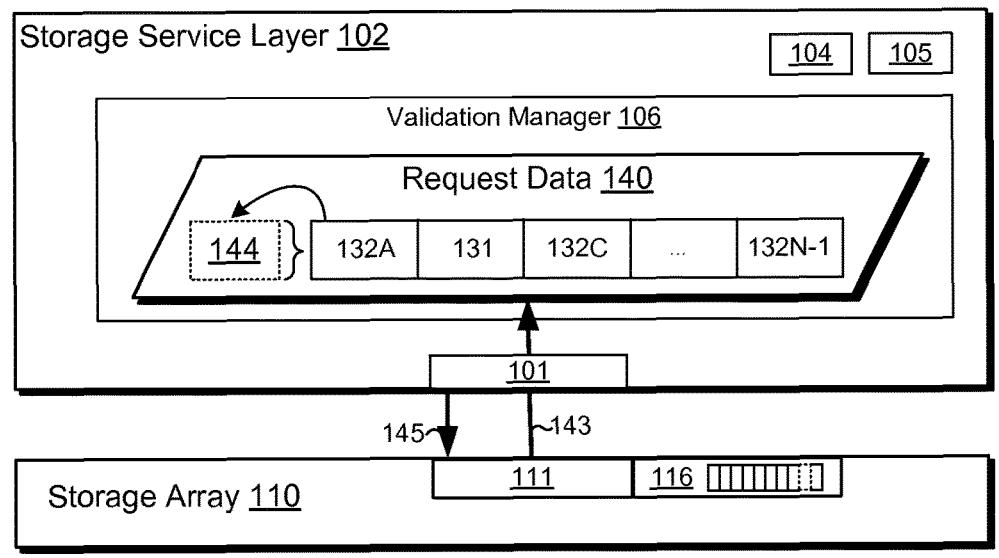
FIG. 1H is a schematic block diagram of one embodiment of a storage layer configured to validate stored data groups by use of integrity data.

The validation manager 106 may be configured to validate the data 140 written to the storage array 110 in response to detecting an invalid shutdown condition pertaining to the storage array 110. As illustrated in FIG. 1H, validating a stored data group 130 may comprise a) accessing the data of the stored data group 130 by, inter alia, issuing a read request 143 to the storage array 110 (through the interface 111 and by use of the coordination module 101), and b) comparing the integrity data 144 corresponding to the stored data group 130 to the accessed data (e.g., contents of data units 132A-132N-1). The invalid shutdown condition may have resulted in a write hole in the stored data group 130, such that the contents of data unit 132B were not written to the storage array 110 (and/or were corrupted during the write operation). Accordingly, the stored data group 130 accessed from the storage array 110 may comprise invalid data 131 in place of the original contents of data unit 132B. Therefore, the integrity data 144 extracted from data unit 132A will not correspond to the accessed data, and the validation manager 106 may determine that the stored data group 130 comprises a write hole.

The validation manager 106 may be further configured to implement one or more mitigation operations (write hole recovery operations) in response to detecting a write hole, which may include, but are not limited to operations to: notify the storage array 110 of the detected write hole, invalidate the stored data group 130, invalidate portions of the stored data group 130, recover and/or reconstruct the stored data group 130, request replacement data pertaining to the stored data group 130, and so on. The validation manager 106 may be configured to notify the storage array 110 of identified write hole conditions through the interface 111 (and/or by use of the coordination module 101). In some embodiments, the validation manager 106 is configured to invalidate the stored data group 130 by, inter alia, issuing a TRIM message pertaining to the logical addresses mapped to the data units 132A-N-1 of the stored data group 130. The TRIM message may be issued within the storage service layer 102 (e.g., issued to the translation layer 105), may be issued to one or more clients, may be issued to the storage array 110, and so on. The validation manager 106 may be configured to notify the storage array 110 of write hole conditions (through the interface 111) and, in response, the storage array 110 may be configured to remove and/or invalidate the stored data group 130. In some embodiments, the validation manager 106 invalidates the stored data group 130 by, inter alia, removing mappings pertaining to the stored data group 130 from the translation layer 105 (e.g., by invalidating associations between logical addresses and storage addresses of the data units 132A-N-1 within the stored data group 130). In some embodiments, the validation manager 106 identifies the particular data units 132A-N-1 corresponding to the write hole and invalidates the identified data units 132A-N−1, while retaining other data units 132A-N−1 of the stored data group 130. Alternatively, or in addition, the validation manager 106 may implement one or more recovery operations to reconstruct the data group 130 (e.g., rewrite portions of the stored data group 130), reconstruct invalid data by use of the storage array 110, and/or the like. In some embodiments, the storage service layer 102 is configured to request replacement data of the stored data group 130 from one or more clients, alternative storage locations (e.g., journal storage, as disclosed in further detail herein), and/or the like.

In some embodiments, the validation manager 106 may be configured to identify particular data units 132 comprising invalid data 131 by use of the integrity data 144. As disclosed above, and illustrated in FIG. 1I, the integrity data 144 may comprise respective integrity datum corresponding to the data units 132A-N−1 within the stored data group 130 (integrity datum 144A-144N−1). The validation manager 106 may validate the stored data group 130 by a) accessing the data units 132A-N of the data group 130, and b) comparing the data units 132A-N to the respective integrity datum 144A-N−1. In the FIG. 1I embodiment, the integrity datum 144A and 144C-N−1 may correspond to the respective data units 132A and 132C-N−1. The integrity datum 144B may not correspond to the invalid data 131 of data unit 132B. Therefore, the validation manager 106 may determine that the stored data group 130 comprises a write hole. The validation manager 106 may also determine that the write hole pertains to data unit 132B and that the other data units 132A and 132C-N−1 comprise valid data. In response, the validation manager 106 may implement write hole recovery operations, which may include, but are not limited to operations to: a) notify the storage array 110 and/or client(s) of the write hole, b) invalidate the data unit 132B (e.g., invalidate mapping(s) between the logical address space 104 and the storage address of data unit 132B) and/or c) retain the other, valid data units 132A and 132C-N−1 (e.g., retain mappings to the valid data units 132A and 132C-N−1 and/or rewrite the contents of the data units 132A and 132C-N−1 on the storage array 110 and/or to another storage resource); d) recovering the contents of the data unit 132B; e) accessing replacement data for the data unit 132B; and/or the like.

Figure 1I:
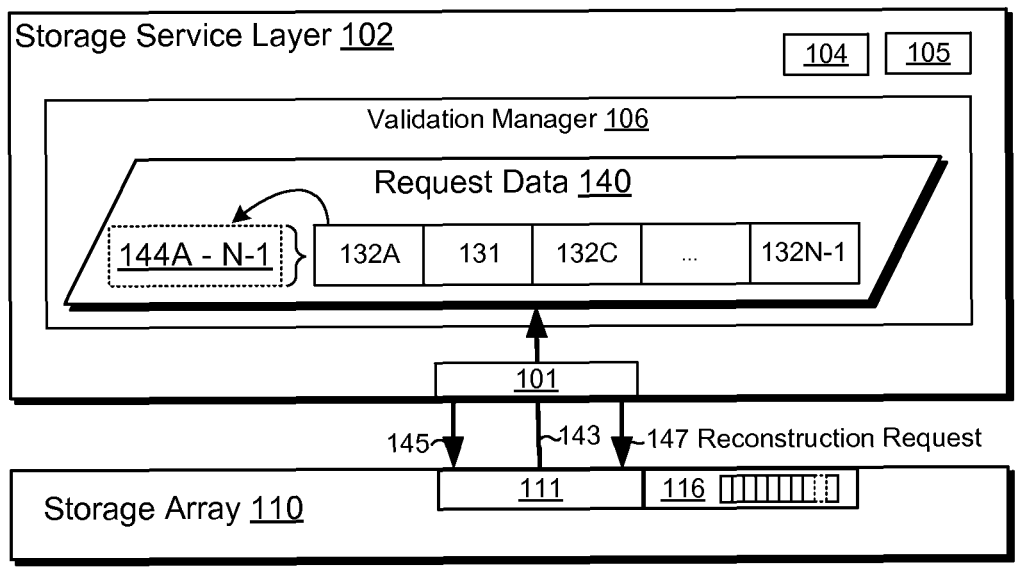
FIG. 1I is a schematic block diagram of another embodiment of a storage layer configured to validate stored data groups by use of integrity data.
Figure 1J:
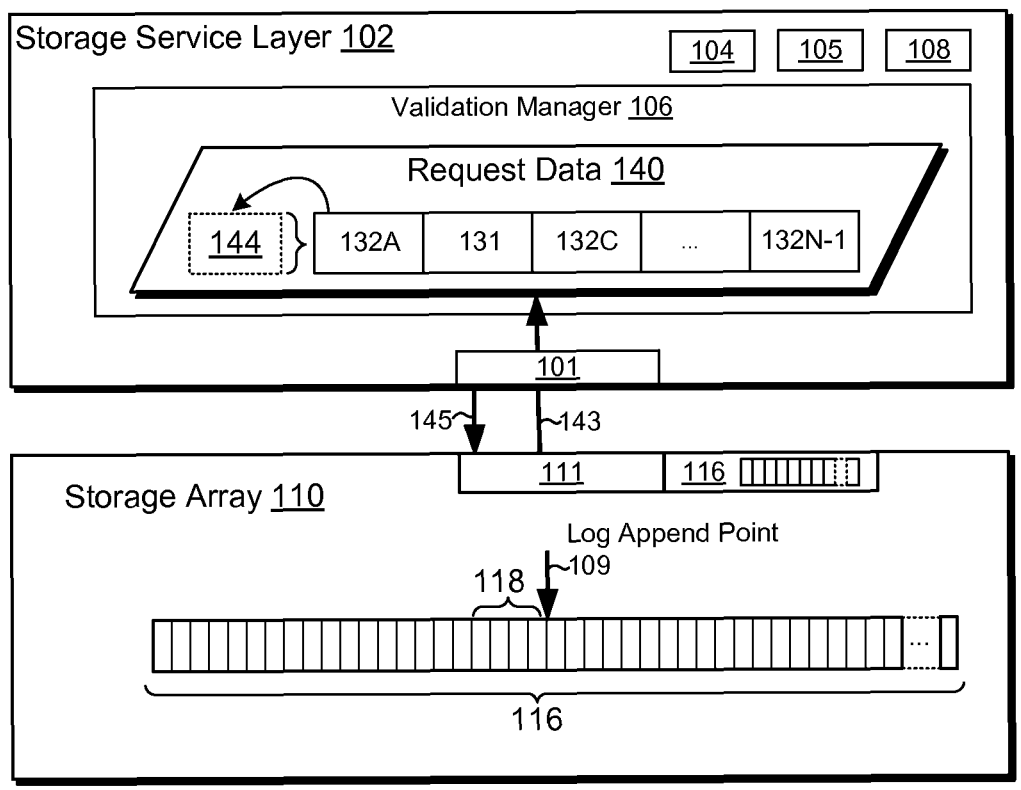
FIG. 1J is a schematic block diagram of one embodiment of a storage layer configured to validate data groups in a storage log maintained on a storage array.

As disclosed above, in the FIG. 1I embodiment, the validation manager 106 may be further configured to mitigate the write hole at data unit 132B by, inter alia, retaining other valid data units 132A and 132C-N−1 of the stored data group 130, reconstructing data unit 132B by use of the other data units 132A and 132C-N−1 (and the array metadata 134 managed by the storage array 110), and/or the like. The validation manager 106 may be configured to retain the valid data units 132A and 132C-N−1 by a) retaining mappings pertaining to the stored data units 132A and 132C-N−1 in the translation layer 105 (while removing mappings pertaining to data unit 132B), b) rewriting valid data of the data units 132A and 132C-N−1 to other storage resources and/or within another data group 130, and/or the like. Alternatively, or in addition, the validation manager 106 may be configured to reconstruct the data unit 132B by use of the storage array 110. As disclosed herein, the storage array 110 may be configured to store data groups 130 with array metadata 134, which may include, inter alia, parity reconstruction data. The storage array 110 may, therefore, be capable of reconstructing the contents of data unit 132B by use of the array metadata 134 of the stored data group 130 and the contents of the other data units 132A and 132C-N−1. In one embodiment, in response to determining that the data unit 132B comprises invalid data 131, the validation manager 106 issues a reconstruction request 147 to the storage array 110 that identifies the invalid data unit 132 in the stored data group 130 (e.g., identifies data unit 132), and requests reconstruction of the identified data unit 132 by the storage array 110. The reconstruction request 147 may comprise an explicit request to reconstruct the contents of data unit 132B within the stored data group 130. Alternatively, the reconstruction request 147 may comprise an error message indicating that the data unit 132B comprises invalid data 131 (e.g., a read error signal), and/or other notification, signal, and/or directive. In response, storage array 110 may reconstruct the data unit 132B using reconstruction data corresponding to the stored data group 130 (e.g., array metadata 134, such as parity reconstruction data). In one embodiment, the storage array 110 reconstructs the data unit 132B in an XOR operation (using parity reconstruction data), in which data unit 132B is reconstructed such that: data unit 132B=data unit 132A XOR data unit 132C . . . XOR data unit 132N−1 XOR data unit 132N (parity reconstruction data). The storage array 110 may be further configured to rewrite the reconstructed data unit 132B to the storage array 110 (e.g., overwrite the invalid data 131 on storage location 115B with the reconstructed data unit 132B). The validation manager 106 may validate the reconstructed data unit 132B by use of the integrity data 144 (e.g., integrity datum 144B), as disclosed herein. The reconstructed data unit 132B may be revalidated to ensure that the parity reconstruction data (e.g., array metadata 134) of the stored data group 130 is valid (e.g., does not correspond to another write hole in the stored data group 130). If the array metadata 134 is invalid (was not correctly written due to, inter alia, the invalid shutdown condition), the reconstructed data unit 132B will not correspond to the integrity datum 144B.

The validation manager 106 may be configured to reconstruct any number of invalid data units 132 within a stored data group 130, in accordance with the capabilities of the storage array 110 (e.g., the "strength" of the array metadata 134). As used herein, the "strength" of reconstruction information of the storage array 110 refers to the number of data unit errors the reconstruction information is capable of detecting and/or correcting. In embodiments in which a single data unit 132 is used to store array metadata 134 of a data group 130, the storage array 110 may be capable of reconstructing only a single, invalid data unit 132. Accordingly, a stored data group 130 comprising two or more invalid data units 132 may not be capable of being reconstructed by use of the array metadata 134. In another embodiment, the storage array 110 may be configured to dedicate multiple data units 132 to the storage of reconstruction information and, as such, may be capable of reconstructing multiple data units 132 of a stored data group 130. The storage array 110 may, for example, be configured to encode the data units in an error-correcting code (ECC) and/or other technique. In the FIG. 1I embodiment, the validation manager 106 may determine the number of data units 132 that the storage array 110 is capable of correcting (by querying the interface 111 and/or the like), and may request correction of stored data groups 130 that are capable of being corrected by use of the reconstruction data maintained by the storage array 110.

In some instances, a write hole may occur within the data unit 132 that comprises the integrity data 144 of the stored data group 130. In such instances, the validation manager 106 may determine that integrity data 144 for the stored data group 130 is invalid and, as such, the stored data group 130 comprises a write hole. The validation manager 106 may not, however, be capable of determining if other data units 132B-N−1 of the stored data group 130 are invalid. In such embodiments, the validation manager 106 may be configured to attempt to recover from the write hole condition by use of the reconstruction data maintained by the storage array 110. The validation manager 106 may request reconstruction of data unit 132A, as disclosed above. The validation manager 106 may then determine if the reconstructed data unit 132A comprises integrity data 144 (e.g., integrity datum 144A-N−1) and/or whether the integrity data 144 corresponds to the data units 132A-N−1. If so, the validation manager 106 may clear the write hole condition, and retain the contents of the stored data group 130 (with the reconstructed data unit 132A).

Referring back to FIG. 1H, the validation manager 106 of FIG. 1H may be configured to determine whether one or more of the data units 132 comprises a write hole, but may be incapable of identifying the particular data unit(s) 132A-N−1 that comprise invalid data 131. The validation manager 106 may be configured to attempt to reconstruct invalid data units 132 of the stored data group 130 through, inter alia, iterative reconstruction operation. In an iterative reconstruction operation, the validation manager 106 is configured to request reconstruction of a respective one of the data units 132A-N−1. The validation manager 106 may then attempt to validate the stored data group 130 (with the reconstructed data unit 132A-N−1) using the integrity data 144. If a valid data unit 132 is reconstructed (e.g., data unit 132A), the reconstructed data unit 132 will be corrupted by the invalid data of the other data unit(s) (e.g., invalid data 131 of data unit 132B) and, as such, the resulting data group 130 will fail to validate against the integrity data 144. Reconstructing data unit 132B may result in reconstructing valid contents of data unit 132B (e.g., through parity reconstruction, as disclosed herein) and, as such, the resulting data group, including the reconstructed data unit 132B, will validate against the integrity data 144. In response, the verification module 106 may clear the write hole condition and continue validating other stored data groups 130, as disclosed herein. If a stored data group 130 comprises more invalid data units 132 than can be corrected by the storage array 110 (and/or in a combination not iterated by the validation manager 106), the validation manager 106 may determine that the stored data group 130 comprises a write hole that cannot be corrected, and may implement one or more write hole recovery operations, as disclosed herein.

In some embodiments, the validation manager 106 is configured to identify the particular data units 132 affected by the write hole in the data group 130. Referring to FIG. 1G, the validation manager 106 may be configured to generate integrity data 144 comprising an integrity datum pertaining to the respective data units 132A-N−1. The validation manager 106 may be further configured to include the integrity data 144 in one or more of the data units 132A-N−1 being written within a data group 130 on the storage array 110. The validation manager 106 may be configured to embed the integrity data 144 in one or more of the data units 132A-N−1 (as a header of a data unit 132A-N−1 and/or the like). Alternatively, or in addition, the integrity data 144 may be stored as a log entry and/or metadata within one or more of the data units 132A-N−1. In some embodiments, the data 140 includes persistent mapping metadata (e.g., a mapping log entry) that associates the data units 132A-N−1 with respective logical addresses (and/or other identifiers), and the integrity data 144 is included with the persistent mapping metadata of the data units 132A-N−1.

The validation manager 106 may be further configured to inform the storage array 110 of the detected write hole. The validation manager 106 may issue a message and/or directive through the interface 111 of the storage array 110 (by use of the coordination module 101) that identifies the stored data group 130 (by storage address) and indicates that the stored data group 130 comprises a write hole. Alternatively, or in addition, the validation manager 106 may inform the storage array 110 of the write hole condition by, inter alia, issuing TRIM and/or delete messages to the storage array 110 configured to invalidate and/or delete the stored data group 130 from the storage array 110.

As disclosed above, the storage service layer 102 may be configured to prevent the storage array 110 from implementing array recovery operations 124 in response to invalid shutdown conditions. In some embodiments, the storage service layer 102 is configured to issue one or more messages and/or directives 145 to the storage array 110 that are configured to prevent the storage array 110 from executing particular crash recovery operations (e.g., block execution of certain array recovery operations 124 of the array controller 120). The messages and/or directives 145 may be issued through the interface 111 of the storage array 110. Alternatively, the messages and/or directives 145 may be communicated through a configuration interface of the storage array 110, may be communicated by modifying a configuration parameter and/or file of the storage array 110, and/or the like. The disclosure is not limited in this regard, and could be adapted to prevent the storage array 110 from implementing array recovery operations 124 using any suitable mechanism, including, but not limited to: setting configuration flags pertaining to the storage array 110, setting storage parameters pertaining to the storage array 110 (e.g., IOCTRL parameters, fadvise parameters, and/or the like), and so on.

The storage array 110 may comprise storage elements 112A-N capable of storing a large number of data groups 130. Accordingly, and as illustrated in FIG. 1I, the storage address space 116 of the storage array 110 may be capable of storing a large number of data groups 130. For example, the storage array 110 may comprise a storage capacity of 16 terabytes (16 TB) and, as such, may be capable of storing 400,000,000 data groups 130, wherein each data group 130 comprises five 4 KB data units 132. Validating all of the data groups 130 stored on the storage array 110 may consume a significant amount of computing resources and require a substantial amount of time, during which storage services of the storage array 110 (and/or storage service layer 102) may be unavailable.

In some embodiments, the storage service layer 102 comprises a log module 108 configured to maintain an ordered storage log on the storage array 110. In response to detecting an invalid shutdown, the validation manager 106 may be configured to validate data groups 130 at the head of the storage log, as opposed to validating all of the stored data groups 130 on the storage array 110. Accordingly, the validation manager 106 may leverage the storage log maintained by the storage service layer 102 to reduce the number of stored data groups 130 that must be validated in response to an invalid shutdown pertaining to the storage array 110. By contrast, array recovery operations 124 of the storage array 110 may be required to operate on substantially all of the stored data groups 130 on the storage array 110.

As disclosed in further detail herein, the log module 108 may be configured to append data to the storage log at an append point 109 within the storage address space 116 of the storage array 110. The log module 108 may be further configured to maintain persistent metadata that, inter alia, defines the log order of data (and/or corresponding data groups 130) written to the storage log. The log module 108 may, therefore, be configured to determine the temporal order of certain storage operations performed on the storage array 110. The validation manager 106 may determine the storage location(s) of the data groups 130 written to the storage array 110 at the time an invalid shutdown occurred and may limit validation operations to the determined storage location(s).

In some embodiments, the validation manager 106 determines the storage address of the log append point 109 by use of, inter alia, the log module 108. The validation manager 106 may be configured to validate data groups 130 at the head of the storage log (e.g., data groups 130 written at the append point 109) as opposed to validating all of the data groups 130 stored on the storage array 110. In some embodiments, the validation manager 106 is configured to validate a data group 130 at the head of the storage log (e.g., data group 130 at the log append point 109). Alternatively, or in addition, the validation manager 106 may be configured to validate data group(s) 130 within a particular region of the storage address space 116 (validation region 118). The validation region 118 may comprise data groups 130 written to the storage array 110 at the time of the invalid shutdown (based on the determined storage address of the log append point 109 and/or log order of stored data groups 130 on the storage array 110). Accordingly, the validation region 118 may comprise stored data groups 130 that could have been affected by the invalid shutdown (e.g., stored data groups that may comprise a write hole). Although the validation region 118 is depicted as a continuous region in the storage address space 116, the disclosure is not limited in this regard and could be adapted to append data groups according to any suitable pattern within the storage address space 116).

As disclosed above, the storage array 110 may be unavailable while array recovery operations 124 are implemented. In the FIG. 1I embodiment, the storage service layer 102 may be configured to instruct the storage array 110 that designated array recovery operations 124 are not to be performed. The storage service layer 102 may be further configured to instruct the storage array 110 to provide access to storage services after the invalid shutdown (and without completing the designated array recovery operations 124). The storage service layer 102 may prevent access to the storage array 110 (by other clients) while the validation manager 106 validates stored data groups 130, as disclosed herein.

In some embodiments, the storage service layer 102 may prevent access to particular regions of the storage array 110, and allow access to other regions. As disclosed above, the validation manager 106 may be configured to determine the storage address(es) corresponding to the head of the storage log at the time of an invalid shutdown (e.g., validation region 118). The validation manager 106 may prevent access to the determined storage address(es), and may allow access to other regions of the storage address space 116 of the storage array 110. Accordingly, storage requests pertaining to regions of the storage address space 116 that were not affected by a write hole condition may be serviced after the invalid shutdown, and while the validation manager 106 validates data groups 130 stored within other regions of the storage address space 116 (e.g., the validation region 118).

Figure 2:
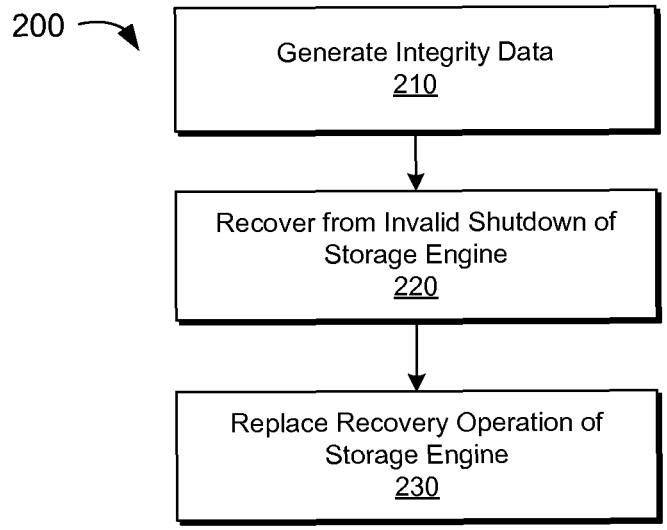
FIG. 2 is a flow diagram of one embodiment of a method for storage error management.

FIG. 2 is a flow diagram of one embodiment of a method 200 for storage error management. Step 210 comprises generating integrity metadata 144 corresponding to data being stored by a storage engine, such as the storage array 110. The storage engine may be configured to store the data within respective data groups 130, and with reconstruction data (e.g., array metadata 134), as disclosed herein.

Step 220 comprises recovering from an invalid shutdown pertaining to the storage engine. Step 220 may comprise detecting an invalid shutdown condition corresponding to one or more of power loss, power interruption, power aberration, a crash condition, an error condition, an interrupt, a crash, a fault, a hardware fault, a software fault, and/or any other condition other than a clean shutdown of the storage array and/or a component thereof. An invalid shutdown condition may correspond to an invalid shutdown condition of the storage array (e.g., the storage array controller), an invalid shutdown of a storage element, an invalid shutdown of communication infrastructure of the storage array, an invalid shutdown of an upper-level storage client, an invalid shutdown of a computing system comprising the storage array, a storage element, and/or upper-level storage client, and/or the like. The invalid shutdown condition may be detected by a storage layer 102, a coordination module 101, and/or a validation manager 106, as disclosed herein.

Step 220 may further comprise recovering from the invalid shutdown by use of the integrity metadata of step 210. Step 220 may comprise validating data groups 130 stored on the storage array 110 by use of the integrity metadata 144 of step 210. Step 220 may, therefore, comprise accessing data of the stored data groups 130 and comparing the accessed data to corresponding integrity data 144. Step 220 may further comprise extracting the integrity data 144 of a stored data group 130 from one or more data units 132 of the stored data group 130. Alternatively, or in addition, step 220 may comprise accessing integrity data 144 of the data group 130 from a separate storage element 112A-N and/or separate storage resource. In some embodiments, step 220 comprises determining that a stored data group comprises a write hole in response to determining that the integrity data does not correspond to the accessed data of the stored data group 130. Step 220 may further include mitigating the write hole by, inter alia, invalidating the stored data group 130, rewriting portions of the stored data group 130, notifying the storage engine of the write hole (through the interface 111 of the storage array 110), and/or the like, as disclosed herein.

In some embodiments, the integrity data 144 of a stored data group 130 comprises an integrity datum corresponding to each of a plurality of data units 132 within the data group 130. Step 220 may, therefore, comprise validating individual data units 132 of the stored data group 130 by use of a respective integrity datum. Step 220 may further comprise determining whether any of the data units 132 comprise invalid data (e.g., whether the stored data group 130 is incomplete and/or comprises a write hole). Step 220 may further comprise determining the particular data unit(s) 132 within the stored data group 130 that comprise the write hole. Step 220 may further include mitigating detected write holes, as disclosed herein and/or recovering data of a write hole by use of other, valid data of the stored data group 130, as disclosed herein.

Step 220 may further include validating a subset of the data groups 130 stored on the storage array 110 (as opposed to all data groups 130 stored on the storage array 110). The subset may be identified based on a temporal order of the data groups 130 as defined by, inter alia, a storage log. Step 220 may comprise identifying an append point 109 within a storage address space 116 of the storage array 110 and/or determining a validation region 118 within the storage address space 116 corresponding the append point 109 and/or head of the storage log. Step 220 may comprise validating stored data groups 130 at the head of the storage log and/or within a designated validation region 118. Step 220 may further comprise preventing access to stored data groups in the validation region 118 until the stored data groups 130 therein have been validated. Step 220 may further include allowing access to data groups 130 stored in other region(s) of the storage address space 116.

Step 230 comprises replacing a recovery operation of the storage engine. Step 230 may comprise preventing the storage engine from implementing one or more array recovery operations 124, as disclosed herein. Step 230 may further include configuring the storage engine to allow access to the storage array 110 after the invalid shutdown and without implementing the one or more array recovery operations 124.

Figure 3:
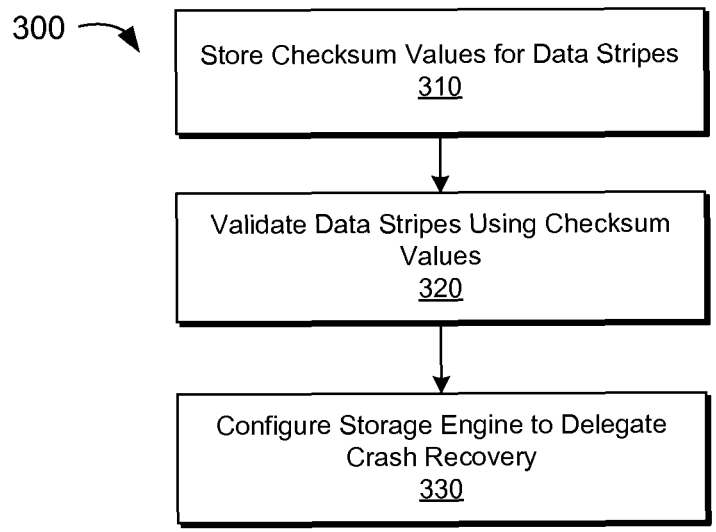
FIG. 3 is a flow diagram of another embodiment of a method for storage error management.

FIG. 3 is a flow diagram of another embodiment of a method 300 for storage error management. Step 310 may comprise storing checksum data corresponding to data being written within respective data stripes of a RAID storage system, such as the storage array 110, disclosed herein. The checksum data of step 310 may comprise integrity data 144 generated by the validation manager 106 of the storage service layer 102. The data stripes written to the RAID storage system may comprise parity reconstruction data (array metadata 134).

Step 320 comprises validating data stripes written to the RAID storage system in response to an invalid shutdown. Step 320 may comprise validating the data stripes by use of the checksum data of step 310 (e.g., integrity data 144), independent of the parity reconstruction data (e.g., array metadata 134) of the RAID storage system. Step 320 may comprise validating data stripes by a) reading data units 132 of the data stripes, b) calculating a checksum of the read data units 132, and c) comparing the calculated checksum to the checksum of step 310 (stored with the data stripes and/or in a separate storage location). Step 320 may further comprise mitigating detected write hole conditions, as disclosed herein. In some embodiments, step 320 further includes determining whether particular data units 132 of a data stripe comprise invalid data (by use of checksum datum pertaining to the respective data units 132), reconstructing the particular data units (if possible), and so on. Step 320 may further include validating a subset of the stored data stripes based on, inter alia, a log order of the data stripes within a storage address space 116 of the RAID storage system.

Step 330 may comprise validating the data stripes at a storage layer 102 in place of a crash recovery operation of the RAID storage system (e.g., in place of one or more array recovery operations 124). Step 330 may comprise configuring the RAID storage system to delegate crash recovery operations, as disclosed herein. Step 330 may further include configuring the RAID storage system to allow access to the storage array 110 after the invalid shutdown, and without implementing the crash recovery operations of the RAID storage system.

Figure 4:
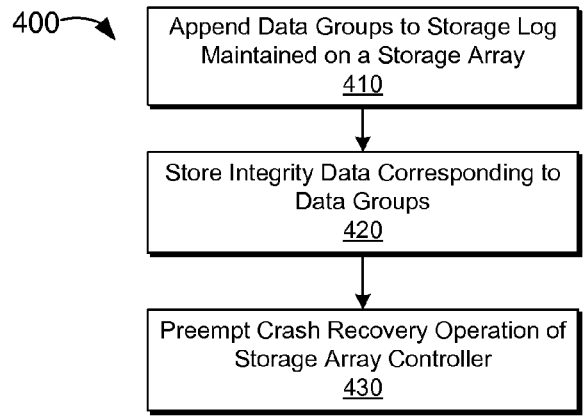
FIG. 4 is a flow diagram of another embodiment of a method for storage error management.

FIG. 4 is a flow diagram of one embodiment of a method 400 for storage error management. Step 410 comprises appending data groups 130 to a storage log maintained on a storage array 110 by use of a storage array controller 120, wherein the storage array controller 120 is configured to store the data groups 130 within respective data stripes on the storage array 110 with corresponding array metadata 134, such as RAID parity reconstruction data.

Step 420 comprises storing integrity data 144 corresponding to the data group 130 stored within the respective data stripes on the storage array 110. The integrity data 144 may comprise a checksum of the data units 132 of the data group 130. Alternatively, or in addition, the integrity data 144 may comprise a checksum datum of each of a plurality of data units 132 of the data group 130. The integrity data 144 may be stored within the data group 130 on the storage array 110 and/or may be stored in a separate storage location and/or storage resource.

Step 430 comprises preempting a crash recovery operation of the storage array controller 120 in response to an invalid shutdown of the storage array 110. Step 430 may comprise preventing the array controller 120 from executing one or more array recovery operations 124, as disclosed herein. Step 430 may further comprise validating one or more stored data stripes on the storage array 110. In some embodiments, step 430 comprises validating a data stripe at the head of the storage log on the storage array 110 by use of integrity data 144 stored with the data stripe. Step 430 may comprise determining an append point 109 of the storage log within a storage address space 116 of the storage array 110, and identifying a data stripe stored at and/or before the determined append point 109 in the storage log.

Figure 5A:
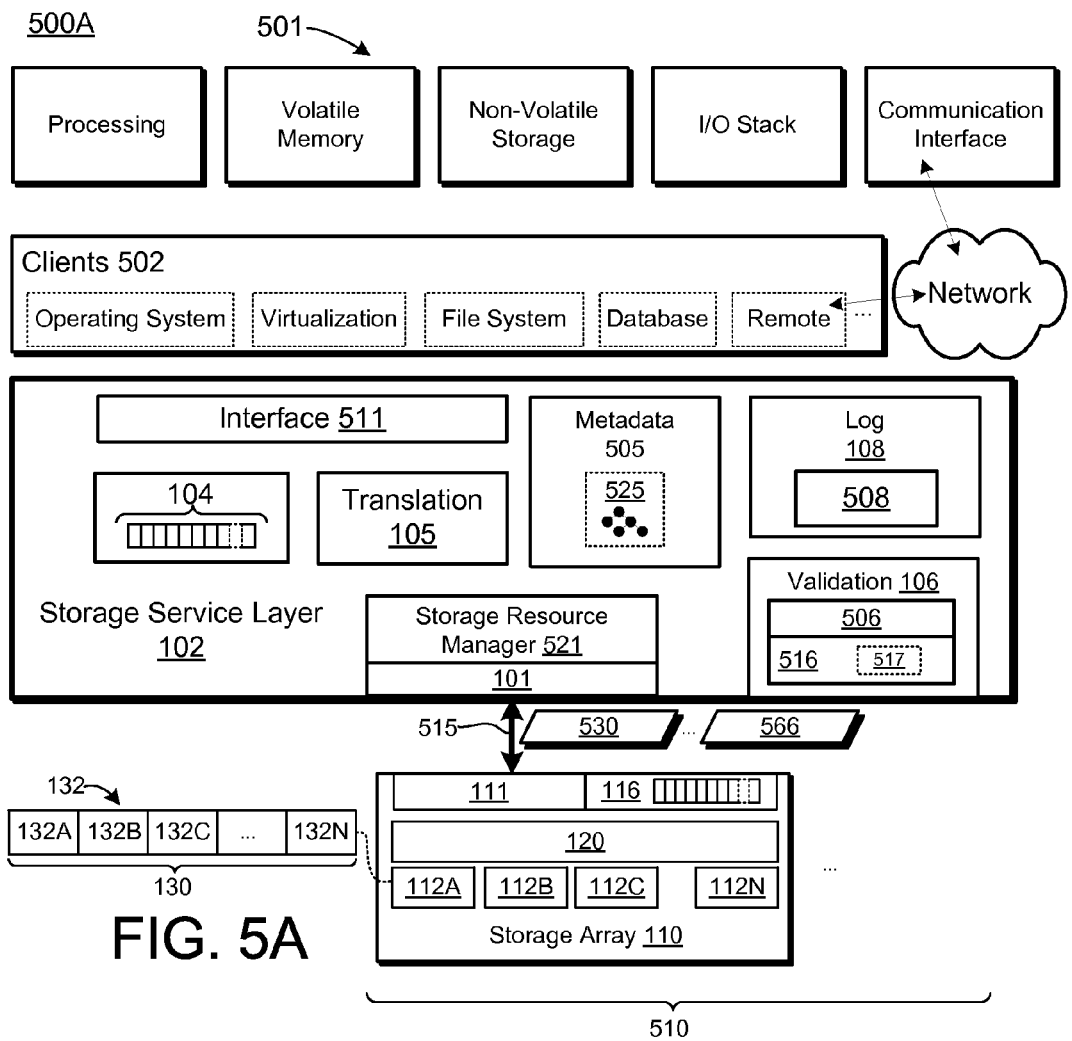
FIG. 5A is a schematic block diagram of another embodiment of a system for managing storage errors.

FIG. 5A is a block diagram of one embodiment of a system 500A comprising a storage service layer 102 configured to provide storage services to one or more clients 502. The system 500A may comprise a computing system 501. The computing system 501 may comprise any suitable computing device, including, but not limited to, a server, desktop, laptop, embedded system, mobile device, and/or the like. In some embodiments, the computing system 501 includes multiple computing devices, such as a cluster of server computing devices. The computing system 501 may comprise processing resources, volatile memory resources (e.g., random access memory (RAM)), non-volatile storage resources, a communication interface, and so on. The processing resources of the computing system 501 may include, but are not limited to, a general purpose central processing unit, such as a central processing unit (CPU), an ASIC, a programmable logic element, an FPGA, a PLA, virtual computing processing resources, and/or the like. The non-volatile storage resources of the computing system 501 may comprise a non-transitory machine-readable storage device, such as a magnetic hard disk, solid-state storage device, optical storage device, and/or the like. The communication interface of the computing system 501 may be configured to communicatively couple the computing system 501 to a network. The network may comprise any suitable communication network, including, but not limited to, a Transmission Control Protocol/Internet Protocol (TCP/IP) network, a Local Area Network (LAN), a Wide Area Network (WAN), a Virtual Private Network (VPN), a Storage Area Network (SAN), a Public Switched Telephone Network (PSTN), the Internet, and/or the like.

The storage service layer 102 may be configured to provide storage services to clients 502 by use of one or more storage resources 510, including a storage array 110, as disclosed herein. The clients 502 may include, but are not limited to, operating systems (including bare metal operating systems, guest operating systems, virtual machines, and the like), virtualization systems (virtualization kernels, hypervisors, virtual machines, and/or the like), file systems, database systems, remote I/O clients (e.g., I/O clients 502 communicatively coupled to the computing system 501 and/or storage module 130 through the network 115), and/or the like. The storage service layer 102 may comprise an interface 511 configured to expose storage services to the clients 502. The interface 511 may include one or more of a storage interface, a block storage interface, a block device interface, an object storage interface, a file storage interface, a key-value storage interface, a virtualized storage interface, a virtual storage unit (VSU), a database storage interface, and/or the like. The storage service layer 102 (and/or interface 511) may be implemented and/or presented to the clients 502 by use of various components, modules, circuits, and/or the like, including, but not limited to: a kernel-level module, a user-space module, a driver-level module, a driver, an I/O controller, an I/O manager, an I/O layer, an I/O service, a storage controller, a storage manager, a storage layer, a storage service, a SCSI module, a library, a shared library, a loadable library, a DLL, a device driver, a DDI module, an LDD module, a PDD module, an WFD module, a UMDF module, a KMDF module, an I/O Kit module, a UDI module, an SDI module, an SDK, and/or the like.

As disclosed above, the storage service layer 102 (and/or the components thereof, such as the validation manager 106, crash recovery module 516, and so on) may be embodied as hardware components, which may include, but are not limited to: circuits, integrated circuits, ASICs, programmable hardware components, PLAs, FPGAs, controller hardware, storage controller hardware. Alternatively, or in addition, portions of the storage service layer 102 (and/or the components thereof, such as the validation manager 106, crash recovery module 516, and so on) may be embodied as instructions stored on a machine-readable storage medium, such as a magnetic hard disk, solid-state storage device, optical storage device, and/or the like. In some embodiments, the instructions are configured for execution by a specific type of hardware, and may include, but are not limited to: firmware, an FPGA bitstream, PLA configuration data, and/or the like. Accordingly, in some embodiments, portions of the storage service layer 102 (and/or components thereof, such as the validation manager 106, crash recovery module 516, and so on) comprise read only data stored on a particular hardware device (e.g., stored on a ROM, EPROM, and/or the like). Alternatively, or in addition, the instructions may be configured for execution and/or interpretation by the computing system 501. Portions of the storage service layer 102 (and/or the components thereof, such as the validation manager 106, crash recovery module 516, and so on) may comprise: a kernel-level module, a user-space module, a driver-level module, a driver, an I/O controller, an I/O manager, an I/O layer, an I/O service, a storage driver, a storage manager, a storage layer, a software-defined storage layer, a SCSI module, a library, a shared library, a loadable library, a DLL library, a device driver, a DDI module, an LDD module, a PDD module, a WFD module, aUMDF module, a KMDF module, an I/O Kit module, a UDI module, an SDImodule, an SDK, and/or the like.

The storage service layer 102 may comprise a storage resource manager 521 configured to, inter alia, manage data storage and/or retrieval operations on the storage resources 510. The storage resource manager 521 may comprise a coordination module 101 configured to manage the storage array 110, as disclosed herein. The storage service layer 102 may be configured to manage data storage and retrieval operations pertaining to a logical address space 104. The storage operations may be implemented on storage resources 510, including a storage array 110. As disclosed herein, the storage array 110 may comprise a plurality of storage elements 112A-N comprising respective storage locations 115. The array controller 120 may be configured to arrange data in data groups 130 for storage within the storage array 110. As disclosed herein, a data group 130 may comprise a plurality of data units 132 configured for storage on respective storage elements 112A-N of the storage array 110. The array controller 120 may be further configured to generate and store array metadata 134 pertaining to the data groups 130. In some embodiments, the storage array 110 comprises a RAID storage system, a RAID storage engine, a RAID storage service, and/or the like.

The storage array 110 may be communicatively coupled to the storage service layer 102 through an interconnect 515, which may include, but is not limited to: a peripheral component interconnect (PCI), PCI express (PCI-e), Serial AT Attachment (serial ATA or SATA), parallel ATA (PATA), Small Computer System Interface (SCSI), IEEE 1394 (FireWire), Fiber Channel, universal serial bus (USB), and/or the like. In some embodiments, the storage array 110 may comprise one or more remote storage devices that are communicatively coupled to the storage service layer 102 through a network (and/or other communication interface, such as a Storage Area Network (SAN), a Virtual Storage Area Network (VSAN), and/or the like). The interconnect 115 may, therefore, comprise a remote bus, such as a PCI-e bus, a network connection (e.g., Infiniband), RDMA connection, a storage network, a Fibre Channel Protocol (FCP) network, a HyperSCSI, and/or the like.

The interface 511 of the storage service layer 102 may present storage services to clients 502 through, inter alia, a logical address space 104. The logical address space 104 may comprise a group, set, collection, range, and/or extent of logical identifiers (LIDs). As used herein, LIDs refer to any mechanism for referencing data and may include, but are not limited to: names (e.g., file names, distinguished names, and/or the like), data identifiers, references, links, front-end identifiers, logical addresses, logical block addresses (LBAs), storage unit addresses, virtual storage unit (VSU) addresses, logical unit number (LUN) addresses, virtual unit number (VUN) addresses, virtual logical unit number (vLUN) addresses, virtual storage addresses, unique identifiers, globally unique identifiers (GUIDs), and/or the like.

The translation layer 105 may be configured to associate LIDs with particular storage resources (e.g., data stored within a storage address space 116 of the storage array 110). The logical address space 104 may be independent of the storage address space 116, such that there are set or predetermined mappings between the logical address space 104 and the storage addresses address space 116 of the storage array 110 (and/or other storage resources 510). In some embodiments, the logical address space 104 is sparse, thinly provisioned, and/or over-provisioned, such that the size of the logical address space 104 differs from the storage address space 116 of the storage array 110 and/or other storage resources 510. In some embodiments, the logical address space 104 spans multiple storage resources 510.

The storage service layer 102 may be configured to maintain virtualization metadata 505 pertaining to the logical address space 104. The virtualization metadata 505 may include, but is not limited to, a forward map 525 comprising any-to-any mappings between LIDs of the logical address space 104 and storage addresses within the storage address space 116, a reverse map pertaining to the contents of particular storage locations 115 on the storage array 110, validity bitmaps, reliability testing and/or status metadata, status information (e.g., error rate, retirement status, and so on), cache metadata, and so on. Portions of the virtualization metadata 505 may be maintained within the volatile memory resources of the computing system 501. Alternatively, or in addition, portions of the virtualization metadata 505 may be stored on non-volatile storage resources of the computing system 501 and/or on one or more storage resources 510.

Figure 5B:
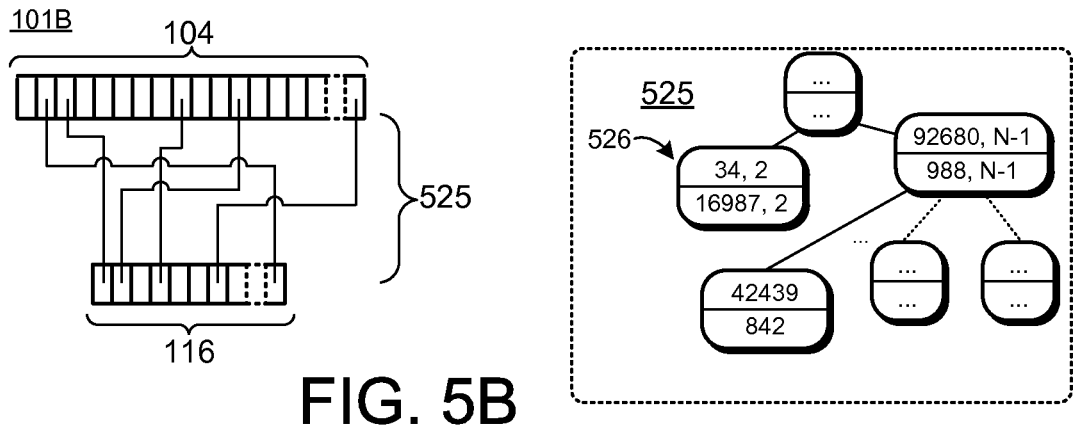
FIG. 5B depicts embodiments of virtualization metadata managed by a storage service layer.

FIG. 5B depicts embodiments of virtualization metadata 505 and, in particular, embodiments of a forward map 525 comprising any-to-any mappings between the logical address space 104 and storage addresses space 116 of the storage array 110. As illustrated in FIG. 5B, the logical address space 104 may be sized differently than the underlying storage address space 116 of the storage array 110. In the FIG. 5B embodiment, the logical address space 104 may be thinly provisioned, and, as such, may comprise a larger range of LIDs than the range of storage addresses in the storage address space 116. Alternatively, or in addition, the logical address space 104 may span multiple storage resources 510.

The translation layer 105 may be configured to associate any LID of the logical address space 104 with any storage address within the storage address space 116 by use of entries 526 of the forward map 525. Accordingly, the translation layer 105 may comprise an any-to-any and/or many-to-any translation layer between the logical address space 104 and storage resources (e.g., a logical-to-storage translation layer). The forward map 525 may comprise any suitable data structure, including, but not limited to, a map, a hash map, a tree data structure, a binary tree (B–Tree), an n-ary tree data structure (B+ Tree), a range encoded tree, a radix tree, and/or the like. The forward map 525 may comprise entries 526 representing LIDs that have been allocated for use to reference data stored on the storage array 110. The entries 526 may associate LIDs with respective storage addresses. The forward map 525 may be sparsely populated and, as such, may omit entries corresponding to LIDs that are not currently allocated to clients 502 and/or are not currently in use to reference valid data stored on the storage array 110. The forward map 525 may comprise a range-encoded data structure, wherein one or more of the entries 526 correspond to a plurality of LIDs (e.g., a range, extent, and/or set of LIDs). In some embodiments, the entries 526 may correspond to a storage granularity of one of the storage resources 510. One or more of the entries 526 may correspond to data groups 130 written by the storage array 110 (e.g., data groups comprising N−1 data units 132). In the FIG. 5B embodiment, the forward map 525 includes an entry 526 that associates LIDs 34 and 35 with storage addresses 16987 and 16988, an entry 526 that associates LID 42439 with storage address 842, and an entry 526 that associates an extent of N−1 LIDs (starting at LID 92680) with N−1 data units 132 of a data group 130 (starting at storage address 988). The entries 526 may be indexed by LID in a tree data structure. The disclosure is not limited in this regard, however, and could be adapted to use any suitable data structure and/or indexing mechanism.

Referring back to FIG. 5A, the storage service layer 102 may further comprise a log module 108 configured to store data on the storage resources 510 in a log structured storage configuration (e.g., in a storage log). As used herein, a "storage log" or "log structure" refers to an ordered arrangement of data within the storage address space of a storage resource 510 (e.g., within storage address space 116 of the storage array 110). Data in the storage log may comprise and/or be associated with persistent metadata that defines contextual information pertaining to the data, such as a log order of the data and/or the "logical interface" of the data (e.g., the LIDs associated with the data). Accordingly, the storage service layer 102 may be configured to store data in a contextual, self-describing format. As used herein, a contextual or self-describing format refers to a data format in which data is stored in association with persistent metadata. In some embodiments, the persistent metadata may be configured to identify the data and, as such, may comprise and/or reference the logical interface of the data (e.g., may comprise the LID(s) associated with the data). The persistent metadata may include other information, including, but not limited to, information pertaining to the owner of the data, access controls, data type, relative position or offset of the data, information pertaining to storage operation(s) associated with the data (e.g., atomic storage operations, transactions, and/or the like), log sequence information, data storage parameters (e.g., compression algorithm, encryption, etc.), and/or the like. The storage service layer 102 may further comprise a log manager 508 configured to manage portions of the log (log segments). The log manager 508 may be configured to reclaim and/or reinitialize log storage resources, such as log segments, media storage units, media storage divisions (e.g., erase blocks), virtual storage units, virtual storage divisions (e.g., groups of erase blocks), and/or the like.

Figure 5C:
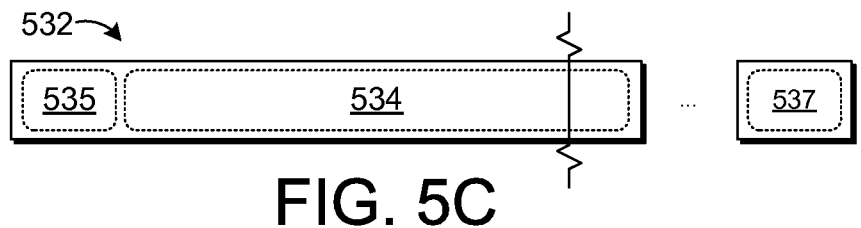
FIG. 5C depicts embodiments of a contextual data storage format.

Referring to FIG. 5C, in some embodiments, the log module 108 is configured to store data in a contextual data format (data packet 532). In some embodiments, the log module 108 is configured to write data packets 532 as data units 132 on the storage resources. The data packet 532 of FIG. 5C comprises a data segment 534 and persistent metadata 535. The data segment 534 may be of any arbitrary length and/or size. The persistent metadata 535 may be embodied as one or more header fields of the data packet 532. The persistent metadata 535 may be configured to define the logical interface of the data segment 534 and, as such, may include and/or reference the LID(s) associated with the data segment 534. The persistent metadata 535 may be further configured to associate the data segment 534 with a particular application, user, client 502, log segment, and/or the like. In some embodiments, the persistent metadata 535 defines a log order of the data packet 532 within a storage log. Alternatively, or in addition, the data packet 532 may be associated with persistent sequence metadata 537 configured to, inter alia, define a log order of the data packet 532. As disclosed in further detail herein, the persistent sequence metadata 537 may comprise a sequence identifier of a log segment comprising the data packet 532, such that the log order of the data packet 532 corresponds to a) the sequence identifier associated with the log segment comprising the data packet 532, and b) the sequential order of the data packet 532 within the log segment. Although FIG. 5C depicts one embodiment of a data packet 532, the disclosure is not limited in this regard and could associate data (e.g., data segment 534) with persistent metadata in other ways, including, but not limited to, separate metadata log entries (e.g., metadata notes), separate metadata storage, a separate metadata log, and/or the like.

Referring to FIG. 5A, the storage service layer 102 may be configured to arrange data for storage in accordance with characteristics of the respective storage resources 510. As disclosed herein, the storage array 110 may be configured to write data in respective data groups 130 that comprise N−1 data units 132. The storage service layer 102 may be configured to group data being written to the storage array 110 in accordance with the data groups 130 (e.g., coalesce data into data sets 530 comprising N−1 data units 132). The validation manager 106 may be configured to generate integrity data 144 pertaining to the data sets 530, as disclosed herein. The storage resource manager 521 may issue requests to write the data sets 530 to the storage array 110 (via the interconnect 515 and by use of the coordination module 101). In response, the storage array 110 may write the data sets 530 within respective data groups 130, as disclosed herein.

Figure 5D:
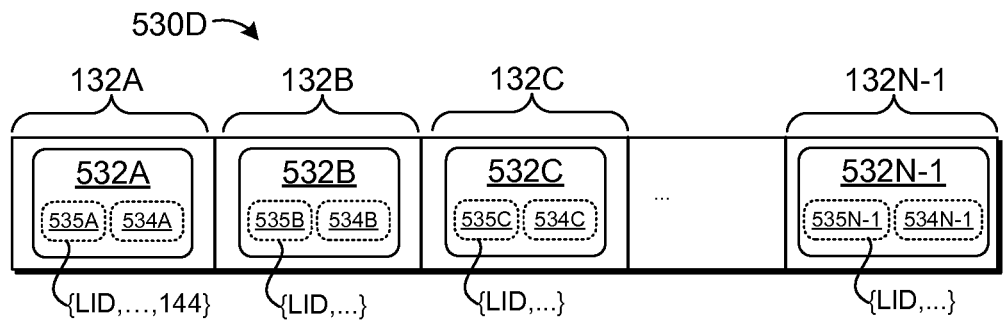
FIG. 5D depicts embodiments of a data set comprising persistent metadata configured for storage as a data group on a storage array.

FIG. 5D depicts one embodiment of a data set 530D configured to be written as a data group 130 by the storage array 110. As illustrated in FIG. 5D, the data set 530 comprises N-1 data units 132A-N-1. The data units 132A-N-1 may comprise respective data packets 532, comprising persistent metadata 535 and data segment 534. As disclosed herein, the persistent metadata 535 may be configured to define, inter alia, the LID(s) associated with the data segment 534. The persistent metadata 535 include additional information pertaining to the data segment 534, such as a log order of the data segment 534, and so on, as disclosed herein. In some embodiments, the persistent metadata 535 further includes integrity data 144 pertaining to the data set 530D. As illustrated in FIG. 5D, the persistent metadata 535A of data unit 132A may comprise integrity data 144 pertaining to the data set 530D. The integrity data 144 may comprise information to validate the contents of data units 132A-N-1 of the data set 530D. The integrity data 144 may be generated by the validation manager 106. The validation manager 106 may derive the integrity data 144 from the contents of the data units 132A-N-1 of the data set 530D (e.g., the data packets 532A-N-1). The integrity data 144 may comprise a hash value, checksum, signature, digest, and/or the like, as disclosed herein. In some embodiments, the integrity data 144 comprises a plurality of integrity datum corresponding to the respective data units 132A-N-1 (e.g., integrity datum 144A-N-1 corresponding to the respective data packets 532A-N-1). In the FIG. 5D embodiment, the integrity data 144 is included in the persistent metadata 535A of data packet 532A (data unit 132A). The integrity data 144 may be omitted from the other data units 132B-N-1. Alternatively, the integrity data 144 may be included in two or more of the data units 132A-N-1 and/or in each of the data units 132A-N-1.

Figure 5E:
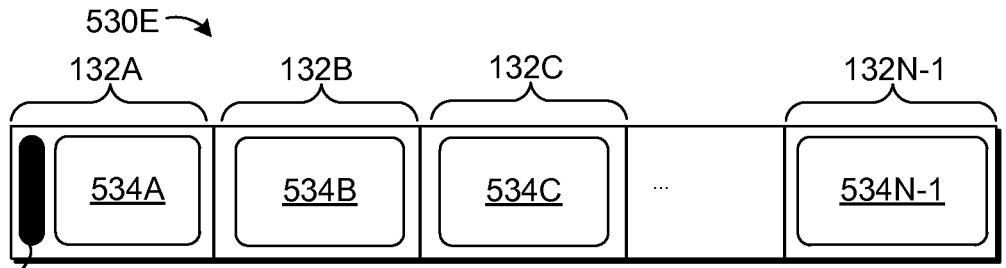
FIG. 5E depicts embodiments of a data set comprising persistent metadata configured for storage as a data group on a storage array.

Referring to FIG. 5E, in some embodiments, the log module 108 is configured to associate data with persistent metadata by use of, inter alia, persistent metadata entries 539 (e.g., without writing the data in a packet format, such as the data packets 532 disclosed herein). The log module 108 may be configured to associate the data segments 534 of a data set 530E with one or more persistent metadata entries 539, which may be written with the data set 530E to the storage array 110 and/or another storage resource 510 (e.g., appended to a separate metadata log). As illustrated in FIG. 5E, a persistent metadata entry 538 may comprise contextual metadata pertaining to the contents of data units 132A-N-1 (e.g., data segments 534A-N-1), which may include, but is not limited to: the LID(s) associated with the respective data segments 534A-N-1 of data units 132A-N-1, log sequence information pertaining to the data set 530E, and so on. The persistent metadata entry 539 may further comprise integrity data 144 pertaining to the data set 530E. The integrity data 144 may be derived from the contents of the data units 132A-N-1 (e.g., data segments 534A-N-1). In some embodiments, the integrity data 144 comprises respective integrity datum 144A-N-1 corresponding to the respective data units 132A-N-1 (e.g., data segments 534A-N-1). The integrity data 144 may be generated by the validation manager 106 and included in the data set 530E, as disclosed herein. Although FIG. 5E depicts persistent metadata entry 539 within data unit 132A (with data segment 534A) the disclosure is not limited in this regard and could be adapted to include the persistent metadata entry 539 in any of the data units 132A-N-1 of the data set 530D, in a plurality of data units 132A-N-1, and/or in a separate data unit 132A-N-1 (separately from a data segment 534A-N-1, as illustrated in FIG. 5F).

Figure 5F:
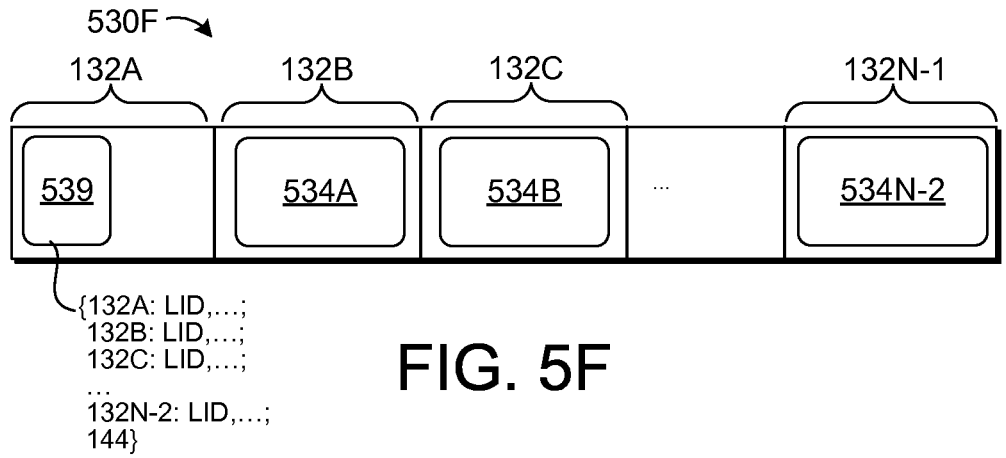
FIG. 5F depicts embodiments of a data set comprising persistent metadata configured for storage as a data group on a storage array.

FIG. 5F illustrates another embodiment of a data set 530F configured to associate data with persistent metadata, including integrity data 144. In the FIG. 5F embodiment, the data units 132A-N and/or data segments 534 may have a fixed size, such that the data unit 132A-N-1 cannot accommodate both a data segment 534A-N-1 and a persistent metadata entry 539. Accordingly, in the FIG. 5F embodiment, the storage service layer 102 is configured to arrange data into data sets 530F comprising N-2 data units 132, and to store the persistent metadata entry 539 corresponding to the data units 132A-N-2 in a separate data unit 132 within the data set 530F (e.g., data unit 132A).

Figure 5G:
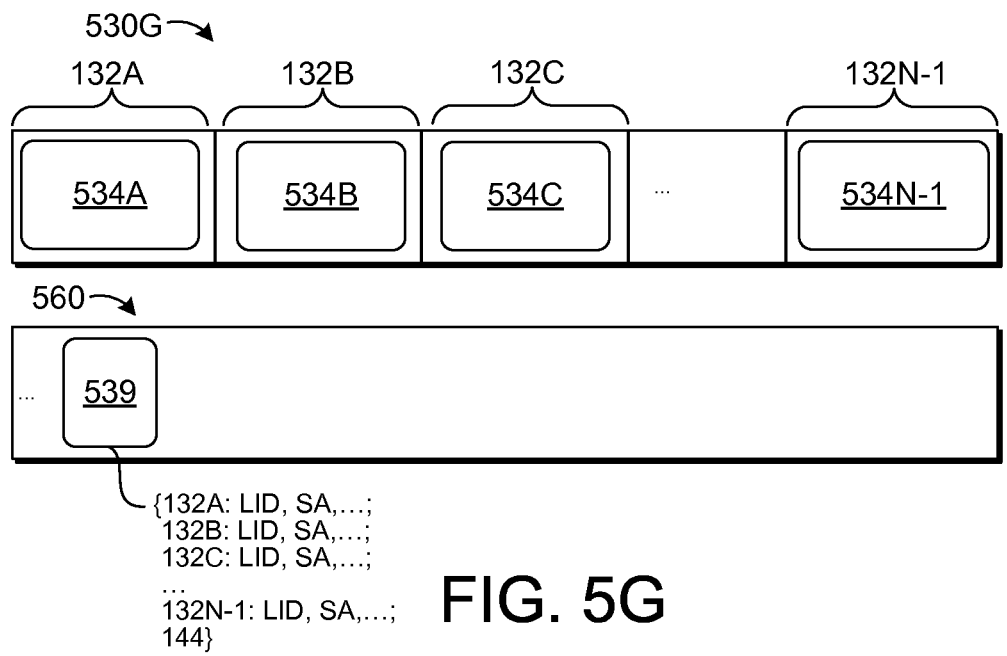
FIG. 5G depicts embodiments of a data set configured for storage on a storage array and associated with a persistent metadata entry in a metadata log.

FIG. 5G is a block diagram depicting further embodiments of a data set 530G configured to associate data with persistent metadata, including integrity metadata 144. In the FIG. 5G embodiment, the log module 108 is configured to maintain persistent metadata storage pertaining to data written to the storage array 110 and/or other storage resources 510 (e.g., a metadata log 560). The log module 108 may append persistent metadata entries 539 corresponding to data sets 530G being written to the storage array 110. In the FIG. 5G embodiment, the storage service layer 102 is configured to group data into data sets 530G comprising N-1 data segments 534A-N-1, such that each data segment 534A-N corresponds to a respective data unit 132A-N of the storage array 110. The log module 108 may be configured to maintain persistent, crash-safe metadata pertaining to the data set 530G by, inter alia, appending a persistent metadata entry 539 corresponding to the data set 530G to a metadata log 560. The persistent metadata entry 539 may comprise contextual metadata pertaining to the data segments 534A-N-1, which may include, but is not limited to: LID(s) associated with the data segments 534A-N-1, storage addresses of the data segments 534A-N-1 (on the storage array 110), integrity data 144, and so on. The integrity data 144 may be derived from the contents of the data units 132A-N-1 (data segments 534A-N-1), as disclosed herein. The log order of the data segments 534A-N-1 may be determined, inter alia, based on the log order of the persistent metadata entry 539 within the metadata log 560.

Although embodiments of the data sets 530D-G described herein comprise particular number of data units 132 comprising particular types of data (e.g., data packets 532, data segments 534, and so on), the disclosure is not limited in this regard, and could be adapted to manage storage of data in data groups 130 on the storage array 110 in any suitable configuration (e.g., any data groups 130 and/or data sets 530, comprising any number of and/or arrangement of data units 132). Similarly, although particular mechanisms for associating data with persistent metadata are described herein, the disclosure is not limited in this regard and could be adapted to associate data stored in a data group 130 on the storage array 110 with persistent metadata using any suitable mechanism. Further embodiments for managing storage of persistent metadata pertaining are disclosed in U.S. application Ser. No. 14/569,382 entitled "Generalized Storage Virtualization Interface," filed on Dec. 12, 2014, for Swaminathan Sundararaman et al., which is hereby incorporated by reference.

Referring back to FIG. 5A, the validation manager 106 may be configured to validate data groups 130 stored on the storage array 110 by use of stored integrity metadata 144 associated with the data groups 130. The validation manager 106 may be configured to validate data groups 130 in response to an invalid shutdown condition pertaining to the storage array 110. In the FIG. 5A embodiment, the validation manager 106 comprises a monitor 506 configured to identify invalid shutdown conditions. The monitor 506 may be configured to access the storage array 110 (through the interface 111) in order to, inter alia, determine the status of the storage array 110, detect invalid shutdown conditions pertaining to the storage array 110, and/or the like. The monitor 506 may be further configured to identify invalid shutdown conditions pertaining to the storage service layer 102 and/or computing system 501.

In response to detecting an invalid shutdown condition pertaining to the storage array 110, the validation manager 106 may be configured to implement one or more recovery operations (by use of a crash recovery module 516, as disclosed in further detail herein). The recovery operations of the validation manager 106 may replace array recovery operations 124 of the storage array 110. Accordingly, in some embodiments, the validation manager 106 is configured to preempt recovery operations of the storage array 110 in response to detection of an invalid shutdown condition. The validation manager 106 may be configured to instruct the storage array 110 to delegate recovery operations to the storage service layer 102 by one or more of: issuing a message, directives, commands, and/or the like to the storage array 110 though the interface 111 and/or by use of the coordination module 101. In some embodiments, the storage array 110 is configured to detect an invalid shutdown condition by use of an invalid shutdown indicator (e.g., an invalid shutdown flag set by the storage array 110 and/or other entity). Accordingly, in some embodiments, the validation manager 106 is configured to prevent the storage array 110 from implementing designated array recovery operations 124 by one or more of: clearing an invalid shutdown indicator of the storage array 110, clearing an invalid shutdown indicator of one or more of the storage elements 112A-N of the storage array 110, clearing an invalid shutdown indicator of the computing system 501, and/or the like. In some embodiments, the storage service layer 102 configures the storage array 110 to delegate recovery operations to the storage service layer 102 by, inter alia, setting a configuration parameter of the storage array 110, modifying a configuration file of the storage array 110, and/or the like. The storage service layer 102 may configure the storage array 110 to block and/or preempt particular array recovery operations 124 by transmitting a message 566 to the storage array 110 via the interconnect 515 (and/or other communication channel). The message 566 may comprise a command, directive, library call, API call, RPC call, configuration parameter, interrupt, signal, and/or other notification. The message 566 may be configured to cause the storage array 110 to delegate particular crash recovery functionality to the storage service layer 102 and/or prevent the storage array 110 from executing designated array recovery operations 124, as disclosed herein. Although particular mechanisms and/or techniques for overriding array recovery operations 124 of the storage array 110 are described herein, the disclosure is not limited in this regard, and could be adapted to identify and/or block execution of particular array recovery operations 124 using any suitable mechanism and/or technique.

The validation manager 106 may be configured to validate the contents of data groups 130 stored on the storage array 110 (e.g., validate data sets 530 comprising data packets 532, data segments 534, and/or the like). Validating a stored data group 130 may comprise a) accessing the stored data group 130 from the storage array 110 by, inter alia, issuing one or more read requests to the storage array 110, b) extracting integrity data 144 of the accessed data, and c) comparing the integrity data 144 to the accessed data. Accessing a stored data group 130 may comprise determining storage address(es) comprising valid data by use of, inter alia, the virtualization metadata 505 maintained by the storage service layer 102 (e.g., forward map 525). Accessing a stored data group 130 may comprise reading a data set 530 comprising a plurality of data units 132 from the storage array 110. Extracting the integrity data 144 may comprise extracting integrity data 144 from one or more data units 132A-N-1 of the data set 530 (based on a storage configuration of the data set 530 as illustrated above in conjunction with FIGS. 5C-5F). Alternatively, and as illustrated in FIG. 5G, extracting the integrity data 144 may comprise accessing a persistent metadata entry 539 pertaining to the data set 530G in a metadata log 560.

The validation manager 106 may determine that a write hole exists in a stored data group 130 in response to determining that the data set 530 does not correspond to the integrity data 144. The validation manager 106 may calculate a hash value corresponding to the accessed data (e.g., contents of data units 132A-N-1) and compare the calculated hash value to the corresponding integrity data 144. In response to identifying a write hole, the validation manager 106 may execute one or more recovery operations 517 by use of the crash recovery module 516, which may include, but are not limited to operations to: a) notify the storage array 110 of the identified write hole; b) invalidate the data group 130; c) invalidate portion(s) of the data group 130; d) recover corrupt data of the data group 130, e) request replacement data for the data group 130, and/or the like. Accordingly, the recovery operations 517 may be referred to as "write hole recovery operations" and/or "crash recovery operations" of the storage service layer 102.

The validation manager 106 may notify the storage array 110 of a write hole by, inter alia, transmitting a message to the storage array 110 pertaining to the detected write hole condition. The message may be transmitted to the storage array 110 through the interface 111 via the coordination module 101 (and/or via another communication channel). The message may identify portions of the stored data group 130 that comprise invalid data. Alternatively, or in addition, the message may identify valid portions of the stored data group 130 comprising a write hole. Invalidating a stored data group 130 may comprise issuing an erase, delete, and/or TRIM message corresponding to the stored data group 130. The TRIM message may be issued within the storage service layer 102 e.g., to the translation layer 105), may be issued to one or more clients 502, may be issued to the storage array 110, and/or the like. Invalidating a stored data group 130 may further comprise removing and/or invalidating logical-to-storage associations pertaining to the stored data group 130 in the virtualization metadata 505 (e.g., forward map 525). The recovery operations 517 may comprise invalidating portion(s) of a stored data group 130 and/or retaining other portions of the stored data group 130. In some embodiments, the recovery operations 517 further include recovering and/or reconstructing data of the stored data group 130 by use of, inter alia, array metadata 134 managed by the storage array 110 (e.g., by parity reconstruction). Alternatively, or in addition, the recovery operations 517 may comprise accessing replacement data pertaining to the stored data group 130 from a client 502, a mirrored storage location (e.g., another storage resource 510, and/or journal storage disclosed in further detail below), and/or the like. Requesting replacement data may comprise issuing one or more requests for replacement data to a client 502, storage array 110, storage resource(s) 510, and/or the like.

Figure 5H:
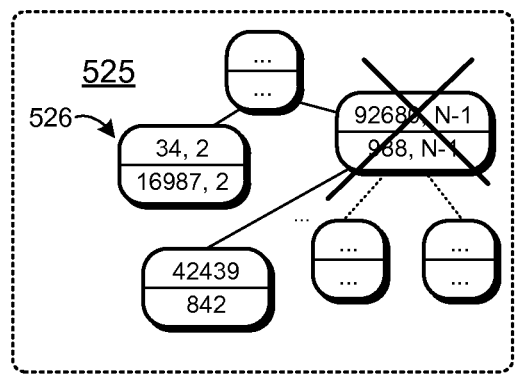
FIG. 5H depicts embodiments for invalidating a data group that comprises a write hole.

As illustrated in FIG. 5B, the forward map 525 may associate an extent of N−1 LIDs (starting at LID 92680) with a stored data group at storage address 988. In response to an invalid shutdown condition, the validation manager 106 may determine that the stored data group 130 at storage address 988 comprises a write hole. In response, and as illustrated in FIG. 5H, the validation manager 106 may remove LID associations pertaining to the invalid data group 130, which may comprise removing the entry 526 pertaining to the N−1 LIDs at 92680 from the forward map 525. Accordingly, subsequent requests for data of the N−1 LIDs at 92680 may result in an "empty" or "unallocated" response from the storage layer. The validation manager 106 may be further configured to notify the storage array 110 of the write hole and/or instruct the storage array 110 to invalidate the stored data group at storage address 988.

Figure 5I:
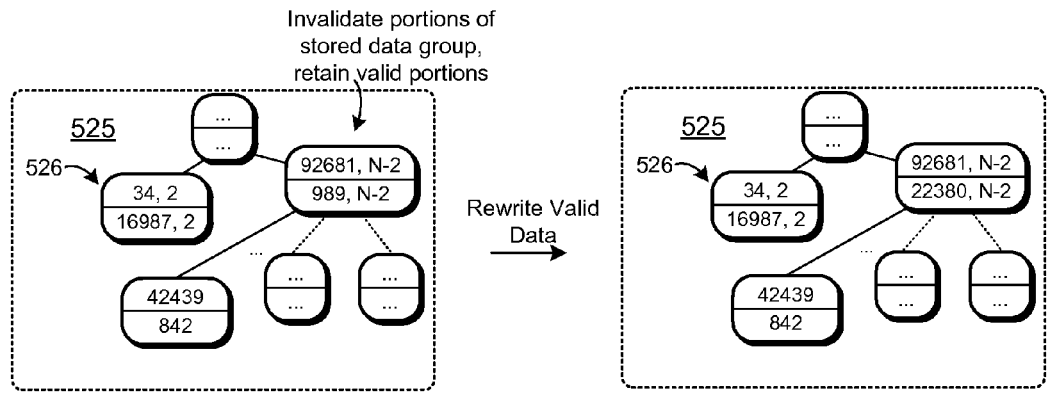
FIG. 5I depicts embodiments for managing a write hole in a stored data group.

In some embodiments, the validation manager 106 is configured to identify which data unit(s) 132 of a stored data group 130 comprises invalid data 131. The validation manager 106 may be configured to distinguish valid data units 132 from invalid data units by use of respective integrity datum 144A-N−1, as disclosed herein. In response to identifying invalid data in stored data group 130, and determining that the stored data group 130 comprises other, valid data units, the validation manager 106 may be configured to a) invalidate the invalid portions of the stored data group 130, and b) retain valid portions of the stored data group 130. Invalidating a portion of a stored data group 130 may comprise removing selected LIDs from the forward map 525. As illustrated in FIG. 5I, the validation manager 106 may determine that a data unit 132 associated with LID 92680 comprises invalid data, but that other data units 132 mapped N−2 LIDs starting at 92681 are valid. In response, the validation manager 106 may invalidate and/or remove logical-to-physical associations pertaining to LID 92680, and may retain associations pertaining to the other N−2 LIDs by, inter alia, modifying the entry 526 pertaining to the N−1 LIDs as illustrated in FIG. 5H. The validation manager 106 may be further configured to rewrite valid data of the stored data group 130 on the storage array 110, which may comprise updating the entry 526 to associate the data with different storage addresses of the storage array 110.

Alternatively, or in addition, the validation manager 106 may be configured to reconstruct the contents of one or more data units 132 by use of, inter alia, the storage array 110. As disclosed above, the validation manager 106 may be configured to identify storage unit(s) 132 comprising invalid data by use of the integrity data 144. The validation manager 106 may determine whether the data units 132 can be reconstructed by the storage array 110 based on, inter alia, the number of invalid data units 132 identified in the stored data group 130 and/or the data recovery capabilities of the storage array 110. As disclosed herein, the array metadata 134 maintained by the storage array 110 may be configured to correct errors in one or more data units 132 of a data group 130. The validation manager 106 may determine whether the storage array 110 is capable of recovering the contents of a particular number of data units 132 of a stored data group 130 based on how many data units 132 the array metadata 134 of the storage array 110 is capable of reconstructing. The storage array 110 may not be capable of correcting such errors, however, without information identifying the location of the errors within the data group 130 (e.g., without knowing which data unit(s) 132A-N comprise invalid data).

In response to determining that a stored data group 130 comprises a write hole that can be corrected by the storage array 110, the validation manager 106 may issue a request to reconstruct portions of the stored data group 130 to the storage array 110 (via the array interface 111 and/or by use of the coordination module 101). As disclosed above, the request may identify data units 132A-N of the stored data group 130 that comprise invalid data. In response, the storage array 110 may reconstruct the identified data units 132A-N by use of the array metadata 134 corresponding to the stored data group 130. The storage array 110 may be further configured to write the corrected data to the storage array 110. Alternatively, the storage array 110 may rewrite the data group 130 to other storage address(es) of the storage array 110. In response to determining that a write hole detected by the validation manager 106 has been corrected, the validation manager 106 may retain logical-to-storage associations pertaining to the stored data group 130 and/or update the logical-to-storage associations to reference the rewritten data group 130. If the write hole cannot be corrected by use of the storage array 110, the validation manager 106 may implement other recovery operations 517 as disclosed herein (e.g., invalidate the stored data group 130, invalidation portions of the stored data group 130, request replacement data, and/or the like).

As disclosed above, in some embodiments, the validation manager 106 is configured to identify particular data units 132 comprising invalid data by use of respective integrity datum 144A-N−1. In some embodiments, the integrity data 144 may comprise a single value corresponding to the data units 132A-N−1. Alternatively, or in addition, the integrity data 144 may not be available (due to a write error pertaining to the data unit 132 comprising the integrity data 144). In response, the validation manager 106 may be configured to invalidate the entire stored data group 130, as disclosed herein.

Although the particular location of the write hole is not known, the write hole may be correctable by the storage array 110. The storage array 110 may be incapable of correcting the error without additional verification information. For example, the contents of a stored data group 130 that includes a particular data unit 132 comprising invalid data 131 may be reconstructed by use of array metadata 134. The storage array 110, however, may have no way of identifying which data unit 132 comprises invalid data 131 and/or no way of validating reconstruction of the particular data unit 132

The validation manager 106, however, may be capable of identifying the location of write holes within a stored data group 130 and verifying correct reconstruction of the stored data group 130 by use of, inter alia, integrity data 144, as disclosed herein. In some embodiments, the validation manager 106 may attempt to identify and/or correct a stored data group 130 that comprises a write hole by use of, inter alia, an iterative parity substitution operation. As disclosed above, iterative parity substitution may comprise instructing the storage array 110 to reconstruct different portions of a stored data group 130 (using array metadata 134). The validation manager 106 may attempt to validate the reconstructed data, as disclosed herein.

Figure 5J:
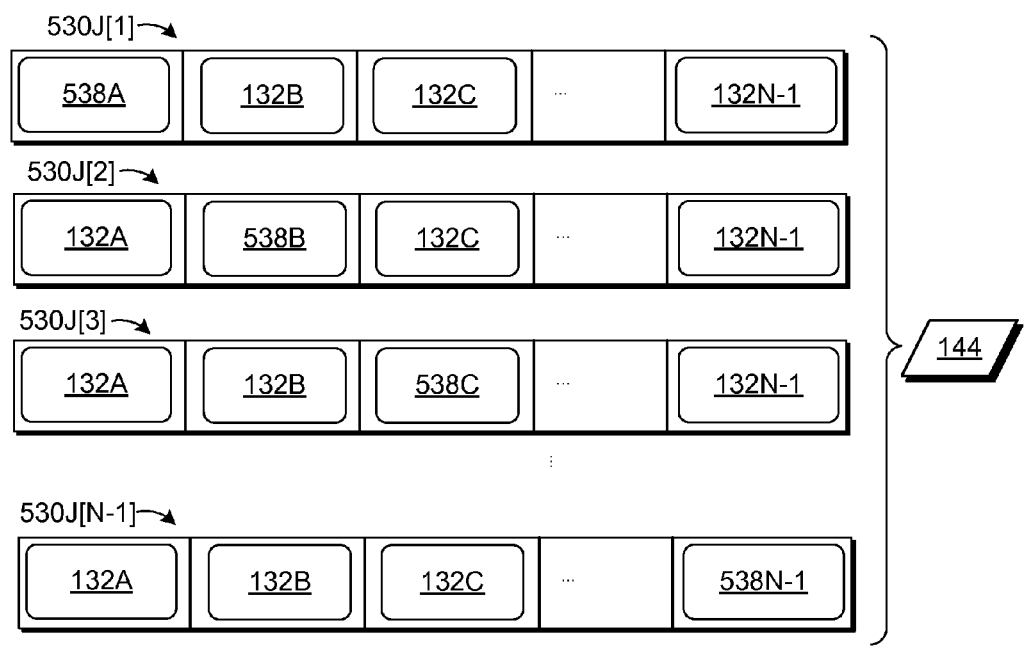
FIG. 5J depicts embodiments of iterative parity substitution operations.

FIG. 5J depicts one embodiment of an iterative parity substitution operation implemented by the validation manager 106. In the FIG. 5J embodiment, the validation manager 106 may detect a write hole in a stored data group 130, but may not be able to identify the data units 132 comprising invalid data 131 within the stored data group 130. In response, the validation manager 106 may be configured to iteratively reconstruct different portions of the stored data group 130. The validation manager 106 may be configured to iteratively designate different data units 132A-N−1 of the stored data group 130 as invalid, and request reconstruction of the designated data unit 132A-N−1 by the storage array 110 (e.g., using array metadata 134 of the corresponding stored data group 130, as disclosed herein). The validation manager 106 may attempt to validate the reconstructed data, as disclosed herein. The validation manager 106 may determine that the stored data group 130 was correctly reconstructed in response to validating reconstructed data of the stored data group 130 by use of corresponding integrity data 144. Otherwise, the validation manager 106 may determine that the stored data group 130 cannot be corrected, and may invalidate the stored data group 130 as disclosed herein.

In the FIG. 5J embodiment, the validation manager 106 iteratively requests reconstructed data sets 530J[1]-530J[N−1] from the storage array 110. The reconstructed data sets 530J[1]-530J[N−1] may be generated by the storage array 110 by, inter alia, designating a different one of the data units 132 to be reconstructed by use of other data units 132 of the stored data group 130 (and the corresponding array metadata 134). In the FIG. 5J embodiment, the reconstructed data set 530J[1] may be generated by the storage array 110 in response to a request to reconstruct the contents of data unit 132A. The reconstructed data set 530J[1] may, therefore, comprise reconstructed data 538A for data unit 132A, and data of the stored data group 130 in data units 132B-N−1. The reconstructed data set 530J[2] may comprise reconstructed data 538B corresponding to data unit 132B, the reconstructed data set 530J[3] may comprise reconstructed data 538C corresponding to data unit 132C, and so on (reconstructed data set 530J[N−1] may comprise reconstructed data 538N−1 corresponding to data unit 132N−1). The validation manager 106 may attempt to validate the reconstructed data sets 530J[1]-530J[N−1] by a) accessing integrity data 144 and b) comparing the integrity data 144 to the reconstructed data set 530J[1]-530J[N−1]. The validation manager 106 may access the integrity data 144 as disclosed herein (e.g., by extracting the integrity data 144 from the respective reconstructed data set 530J[1]-530J[N−1] and/or from a separate storage location, such as a metadata log 560). In response to identifying a reconstructed data set 530J[1]-530J[N−1] that is validated by the integrity data 144, the validation manager 106 determines that the write hole was corrected, and may instruct the storage array 110 to retain and/or rewrite the identified reconstructed data set 530J[1]-530J[N−1]. The validation manager 106 may discontinue the iterative reconstruction operation in response to validating a reconstructed data set 530J[1]-530J[N−1] (e.g., discontinue the iteration in response to validating the first reconstructed data set 530J[1]). If none of the reconstructed data sets 530J[1]-530J[N−1] are validated, the validation manager 106 may invalidate the stored data group 130, as disclosed herein.

As disclosed above, in some embodiments, the validation manager 106 is configured to validate a subset of the data groups 130 stored on the storage array 110 in response to an invalid shutdown condition. In some embodiments, the validation manager 106 is configured to select stored data groups 130 for validation in response to detection of an invalid shutdown. The validation manager 106 may select stored data groups 130 to validate based on any suitable criterion. As disclosed herein, in some embodiments, the storage service layer 102 is configured to write data to the storage array 110 with persistent metadata. In some embodiments, the validation manager 106 selects data groups 130 for validation based on, inter alia, the persistent metadata corresponding to the stored data groups 130. The persistent metadata associated with a stored data group 130 may comprise one or more of: persistent metadata 535 of a data packet 532 within the stored data group 130, persistent sequence metadata 537, a persistent metadata entry 539 and/or the like.

In some embodiments, the validation manager 106 is configured to select stored data groups 130 that were being written at the time the invalid shutdown occurred. The stored data groups 130 that were being written at the time of the invalid shutdown may be identified by use of the persistent metadata associated with the stored data groups 130. As disclosed herein, the persistent metadata associated with a stored data group 130 may comprise sequence information, which may indicate the time at which the stored data group 130 was written to the storage array 110. Alternatively, or in addition, the validation manager 106 may select stored data groups 130 for validation based metadata pertaining to the storage log, such as the storage address of a log append point 109 at the time the invalid shutdown occurred, as disclosed herein.

Figure 6A:
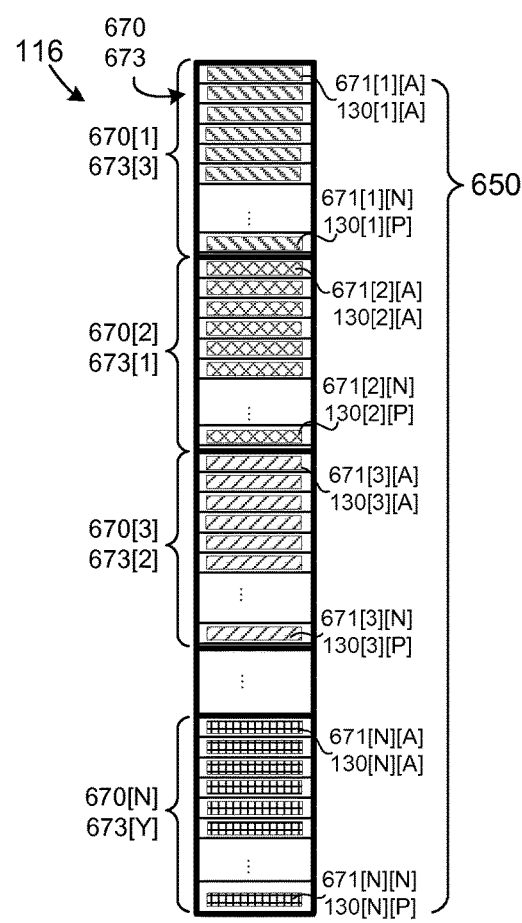
FIG. 6A depicts embodiments of a storage log of a storage service layer.
Figure 6A:
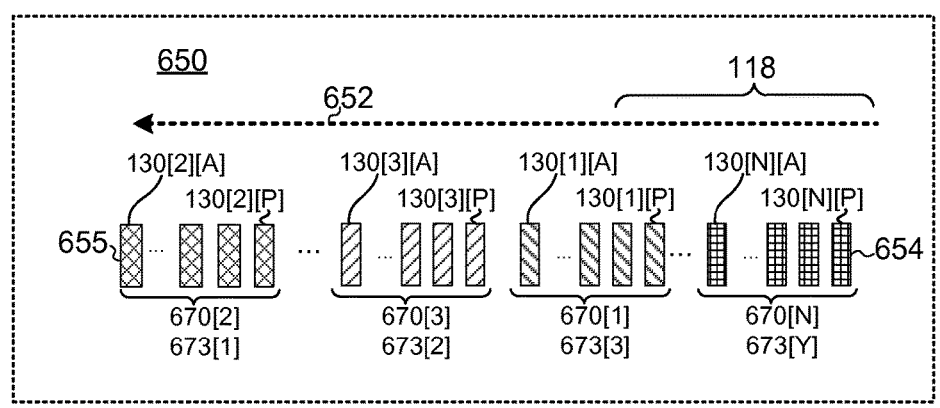

FIG. 6A depicts one embodiment 600A of a storage log 650 comprising data stored sequentially within a storage address space 116 of the storage array 110. In the FIG. 6A embodiment, log module 108 may partition the storage address space 116 into a plurality of log segments 670 (e.g., log segments 670[1]-670[N]). The log segments 670 may comprise a respective range of storage addresses. The log segments 670 may correspond to a collection of log storage units 671 that are reused as a group. The log module 108 may comprise a log manager 508 configured to initialize the respective log segments 670. Initializing a log segment 670 may comprise relocating valid data from the log segment 670 (if any), such that existing data on the log segment 670 may be reused (e.g., erased and/or overwritten). The disclosure is not limited in this regard, however, and may be adapted to treat the entire storage address space 116 of the storage array 110 as a single log segment 670 and/or manage each log storage unit 671A-N as a respective log segment 670.

In the FIG. 6A embodiment, the log segments 670 comprise a plurality of log storage units 671A-N capable of storing data (e.g., data units 132, data groups 130, and/or the like). The log storage units 671A-N may correspond to storage location(s) on a storage resource 510, such as the storage array 110. Accordingly, in the FIG. 6A embodiment, the log storage units 671A-N comprise respective data groups 130 capable of storing N−1 data units 132 on respective storage elements 112A-N of the storage array 110, as disclosed herein.

The log module 108 may be configured to append data sequentially within the log segments 670. The log module 108 may be further configured to associate data appended to the storage log 650 with persistent metadata. As disclosed herein, the persistent metadata may comprise one or more of: persistent metadata 535 of a data packet 532 (within a data unit 132 of a data group 130), persistent sequence metadata 537 associated with one or more data packets 532, and/or a persistent metadata entry 539 stored with the data (and/or a separate metadata log 560), as disclosed herein. The persistent metadata stored within the respective log storage units 671 may be used to determine the log store order of the log segments 670 and/or log storage units 671 therein. In the FIG. 6A embodiment, the log segments 670 comprise respective sequence metadata 673 configured to determine a relative log order of the log segments 670. The sequence metadata 673 may be written within a first log storage unit 671 of the respective log segments 670 (e.g., may be written to data unit 132A of the first data group 130 within each log segment 670).

The log module 108 may be configured to append data groups 130 sequentially within the storage address space 116 (e.g., within respective log segments 670[1]-670[N]). The order in which data groups 130 are written within the respective log segments 670[1]-670[N] may be determined according to the availability of log segments 670[1]-670[N]. The log module 108 may be configured to fill the respective log segments 670[1]-670[N] before appending data to other log segments 670[1]-670[N]. The log segments 670[1]-670[N] may be filled according to any suitable fill pattern.

In the FIG. 6A embodiment, the log module 108 may have written data groups 130[1][A]-130[1][P] sequentially within log segment 670[1] (by issuing requests to write respective data sets 530 to the storage array 110), such that stored data group 130[1][P] is later in the storage log 650 (stored more recently) relative to stored data group 130[1][A]. FIG. 6A further illustrates data groups 130 stored sequentially within the log storage units 671 of other log segments 670[2]-670[N]: data groups 130[2][A]-130[2][P] are stored sequentially within log storage units 671[2][A]-671[2][N] of log segment 670[2], data groups 130[3][A]-130[3][P] are stored sequentially within log storage units 671[3][A]-671[3][N] of log storage segment 670[3], data groups 130[N][A]-130[N][P] are stored sequentially within log storage units 671[N][A]-671[N][N] of log segment 670[N], and so on.

The storage module 130 may mark log segments 670[1]-670[N] with respective sequence metadata 673, as disclosed above. The sequence metadata 673 may be configured to define the order in which the log segments 670[1]-670[N] were filled. Accordingly, the order in which the data groups 130[1][A]-130[N][P] were written to the storage array 110 may be defined by, inter alia, sequence information 673[1]-673[Y] of the log segments 670[1]-670[N]. In some embodiments, the sequence information 673[1]-673[Y] is stored at predetermined locations within the log segments 670[1]-670[N] (e.g., in a first data unit 132 of a first data group 130 within a log segment 670, and/or the like).

In the FIG. 6A embodiment, the sequence information 673[Y] may correspond to the head 654 of the storage log 650 (most recently stored), and the sequence information 673[1] may correspond to the tail 655 of the storage log 650 (oldest). As illustrated in FIG. 6A, the log order 652 of the log segments 670[1]-670[N] may be 670[N] at the head 654 of the storage log 650 (most recently written), followed by 670[1], 670[3], and 670[2] at the tail 655 of the storage log 650 (oldest log segment 670). The log order 652 of the respective stored data groups 130[1][A]-130[N][P] may be determined based on the sequence information 673 of the respective log segments 670 and the relative order of the stored data groups 130[1][A]-130[N][P] within the respective log segments 670. In the FIG. 6A embodiment, the log order 652 from the head 654 of the storage log 650 (most recently stored) to the tail 655 of the storage log 650 (oldest): 130[N][P]-130[N][A], 130[1][P]-130[1][A], 130[3][P]-130[3][A], and 130[2][P]-130[2][A].

As disclosed above, the validation manager 106 may be configured to select data groups 130 to validate based on the log order 652 of the stored data groups 130. The validation manager 106 may be configured to select stored data units 132 for validation at the head 654 of the storage log 650 (e.g., most recently stored), since such data groups 130 are more likely to have been affected by the invalid shutdown condition. By contrast, data groups 130 at the tail 655 of the storage log 650 may be determined to have been written before the invalid shutdown occurred and, as such, do not require validation. In the FIG. 6A embodiment, the validation manager 106 may select the data units at the head 654 of the storage log 650 for validation (e.g., stored data group 130[N] [P]). The validation manager 106 may be configured to validate stored data groups 130 at and/or near the head 654 of the storage log 650 (e.g., within the log segment 670[N], and/or log segment 670[1]). In some embodiments, the validation manager 106 validates stored data groups 130 within a validation region 118. The validation region 118 may comprise region within the storage address space 116. In the FIG. 6A embodiment, the validation region 118 includes log segment 670[N] and a portion of log segment 670[1]. Accordingly, the validation region 118 may comprise disjointed and/or non-contiguous sets of storage addresses within the storage address space 116 of the storage array 110 (e.g., and/or within other storage resources). The validation manager 106 may select the size of the validation region 118 to include stored data groups 130 that may have been affected by the invalid shutdown condition (e.g., data groups 130 that were being written at, or near, the time of the invalid shutdown). Accordingly, the validation region 118 may be sized in accordance with a rate of write operations being executed by the storage service layer 102 at the time of the invalid shutdown. The validation manager 106 may be configured to expand the validation region 118 in response to determining that the storage service layer 102 was issuing write operations at a relatively high rate, and may contract the validation region 118 in response to determining that the storage service layer 102 was issuing write operations at a lower rate. The validation manager 106 may determine and/or estimate the rate of write operations being performed on the storage array 110 by use of virtualization metadata 505 maintained by the storage layer 102, by use of metadata maintained by the storage array 102, and/or the like. The validation manager 106 may be configured to validate stored data groups 130 within the validation region 118, as disclosed herein. The validation manager 106 may be further configured to prevent access to data stored within the validation region 118 (e.g., data stored in data groups 130 at storage addresses within the validation region 118) until the validation operations are complete. The validation manager 106 may allow access to other portions of the storage address space 116 (e.g., may allow access to data stored within stored data groups 130 on storage addresses outside of the validation region 118).

Figure 6B:
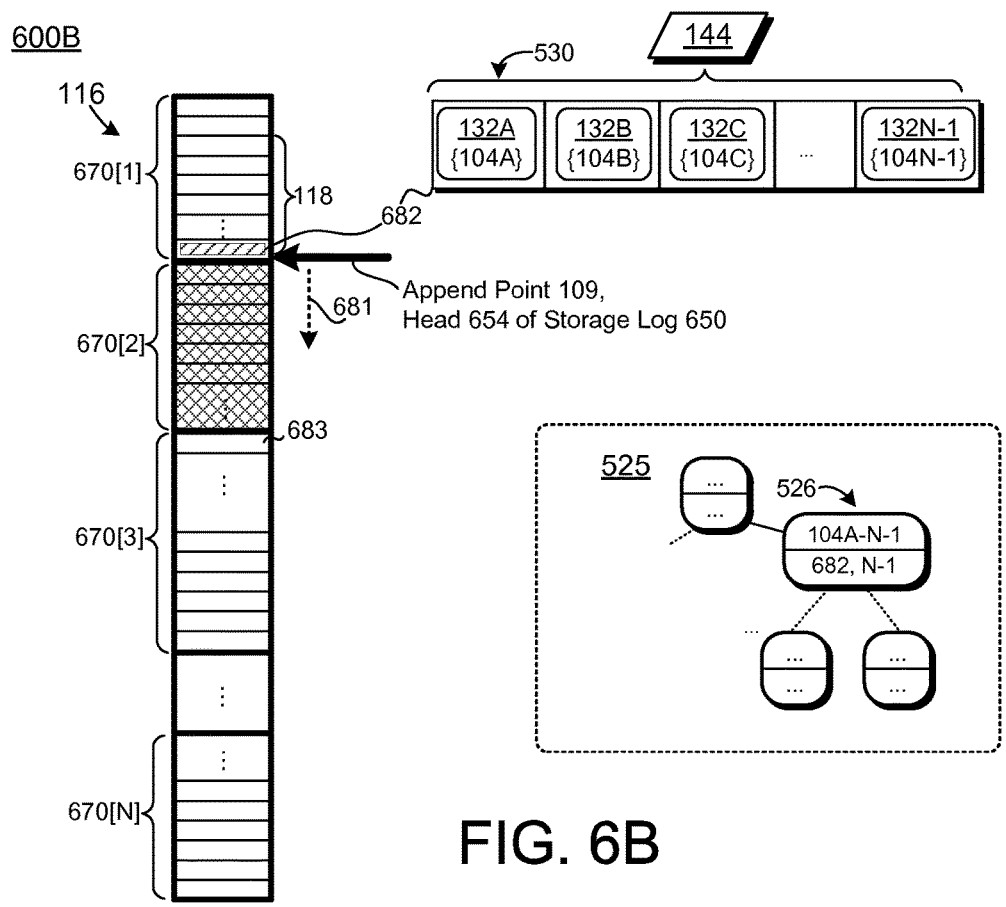
FIG. 6B depicts further embodiments of a storage log of a storage service layer.

FIG. 6B depicts embodiments of log storage operations performed by the log module 108 of the storage service layer 102. The log module 108 may be configured to append data at an append point 109 within the storage address space 116 of the storage array 110 (e.g., within respective log segments 670). Accordingly, the append point 109 may correspond to a head 654 of the storage log 650. In the FIG. 6B embodiment, the current append point 109 corresponds to storage address 682 within log segment 670[1]. In response to writing data to the data group 130 at storage address 682, the log module 108 may advance 681 the append point 109 to a next storage address within the log segment 670[1] (if any). When the log segment 670[1] is filled, the log module 108 may increment the append point 109 to a next available log segment 670. As used herein, an "available" log segment 670 refers to a log segment 670 that can be erased and/or overwritten by the log module 108 (e.g., a log segment 670 that does not comprise valid data that needs to be retained).

Log segments 671 comprising valid data may be "unavailable," "un-writeable" and/or in an "un-writeable" state. In the FIG. 6B embodiment, the log segment 670[2] may be unavailable for use by the log module 108 (e.g., the log segment 670[2] may comprise valid data associated with one or more LIDs of the logical address space 104). As disclosed above, the log module 108 may comprise a log manager 508 configured to reclaim log segments 670 for reuse. Reclaiming a log segment 670 may comprise relocating valid data stored within the log segment 670 (if any) by, inter alia, rewriting the data to another log segment 670. Reclaiming a log segment 670 may further comprise erasing the contents of the log segment 670, recording that the log segment 670 is available for use, and/or the like.

After filling the log storage segment 670[1], the log module 108 may advance 681 the append point 109 to a next available storage division 670[3] (storage address 683). The log module 108 may append data at the append point 109 by, inter alia, writing data to respective storage addresses within log segment 670[3] (e.g., writing data sets 530 as respective data groups 130 on the storage array 110). The log module 108 may be further configured to write sequence metadata 673 to the log segments 670, as disclosed herein (e.g., write sequence metadata 673 to the data group 130 at a first storage address within the respective log segments 670).

The log module 108 may be configured to append data at storage address 682, which may comprise a) coalescing data units 132A-N-1 for storage as a data group 130 as disclosed herein (e.g., grouping data units 132A-N-1 into a data set 530, and b) generating integrity data 144 corresponding to the data set 530 (by use of the validation manager 106). The validation manager 106 may be further configured to include the integrity data 144 within the data set 530 (e.g., include the integrity data 144 within one or more of the data units 132A-N). Alternatively, or in addition, the validation manager 106 may be configured to write the integrity data 544 to a separate storage resource, such as a metadata log 560. The data written to the data group 130 at storage address 682 may be associated with respective LIDs 104A-N-1. Appending the data at storage address 682 may further include recording persistent metadata to associate the data units 132A-N-1 with respective LIDs. The persistent metadata may comprise persistent metadata 535 of a data packet 532, a persistent metadata entry 539 within one or more of the data units 132A-N, a persistent metadata entry 539 appended to a separate metadata log 560, and/or the like. In some embodiments, the integrity data 144 is included with other persistent metadata, such as a persistent metadata entry 539 corresponding to the data set 530. Appending data at storage address 682 may further comprise updating the virtualization metadata 505 by, inter alia, recording an entry 526 in the forward map 525 to associate LIDs 104A-N-1 with the stored data group 130 at storage address 682.

The log module 108 may be configured to append the data set 530 to the storage log 650 by issuing a write request to the storage array 110 (by use of the coordination module 101). In response, the storage array 110 may write the data units 132A-N-1 within a data group 130 at storage address 683 (e.g., on respective storage elements 112A-N of the storage array 110). The storage array 110 may be further configured to generate and/or store array metadata 134 corresponding to the data group 130.

As disclosed above, in response to an invalid shutdown, the validation manager 106 may be configured to select stored data groups 130 for validation based on, inter alia, the storage address of the append point 109. In the FIG. 6B embodiment, an invalid shutdown may occur as the data set 530 is being written to a data group 130 at storage address 682 by the storage array 110. In response to the invalid shutdown, the validation manager 106 may implement one or more recovery operations. As disclosed herein, the recovery operations of the validation manager 106 may be executed in place of one or more array recovery operations 124 of the storage array 110.

The validation manager 106 may be configured to select stored data groups 130 for validation based on, inter alia, the storage address of the append point 109. The validation manager 106 may determine the storage address of the append point 109 by use of the log module 108 (e.g., based on sequence metadata 673 stored on the log segments 670 and/or the like). In some embodiments, the log module 108 is configured to maintain the storage address of the append point 109 in persistent storage. The log module 108 may determine the storage address of the append point 109 by, inter alia, accessing the persistent storage. In another embodiment, the log module 108 determines the storage address of the append point 109 by, inter alia, accessing the contents of the storage log 650, accessing a separate metadata log 560, and/or the like. Although particular techniques for determining a storage address of a log append point 109 are described herein, the disclosure is not limited in this regard, and could be adapted to store and/or determine the storage address of the append point 109 after an invalid shutdown using any suitable technique or mechanism.

In one embodiment, the validation manager 106 is configured to validate one or more stored data groups 130 at the head 654 of the storage log 650 (e.g., at the determined append point 109). Storage operations pertaining to data groups 130 stored at the head 654 of the storage log 650 may have been interrupted by the invalid shutdown, resulting in a write hole (and/or other write errors). The validation manager 106 may select the stored data groups 130 to validate based on the determined storage address of the append point 109. In the FIG. 6B embodiment, the validation manager 106 may select the data group 130 stored at storage address 682 for validation (based on the storage address of the append point 109). The validation manager 106 may validate the stored data group 130, as disclosed herein (e.g., by accessing the data units 132A-N-1 of the stored data group 130 and comparing the contents of the data units 132A-N-1 to integrity data 144 of the stored data group 130). The validation manager 106 may be further configured to detect a write hole in the stored data group 130 in response to determining that stored data of the data group 130 does not correspond to the integrity data 144. In response to determining that the stored data group 130 is incomplete, the validation manager 106 may a) invalidate the stored data group 130 (e.g., remove the entry associating the LIDs 104A-N-1 with the data group 130 stored at storage address 682), b) notify the storage array 110, and/or the like. The validation manager 106 may be further configured to a) repair the stored data group 130, b) identify and retain valid portions of the stored data group 130, and so on, as disclosed herein.

In some embodiments, the validation manager 106 validates stored data groups within a validation region 118. The validation region 118 may correspond to the determined storage address of the append point 109. In the FIG. 6B embodiment, the validation region 118 includes storage address 682 corresponding to the append point 109 and one or more storage addresses at the head 654 of the storage log 650. The validation region 118 may exclude data groups 130 stored at the tail 655 of the storage log 650. The size and/or configuration of the validation region 118 may be based on the log order 652 of the storage log 650 (e.g., sequence metadata 673 of the respective log segments 670), the rate of write operations being performed on the storage array 110 at the time of the invalid shutdown, and/or the like, as disclosed herein.

Figure 7:
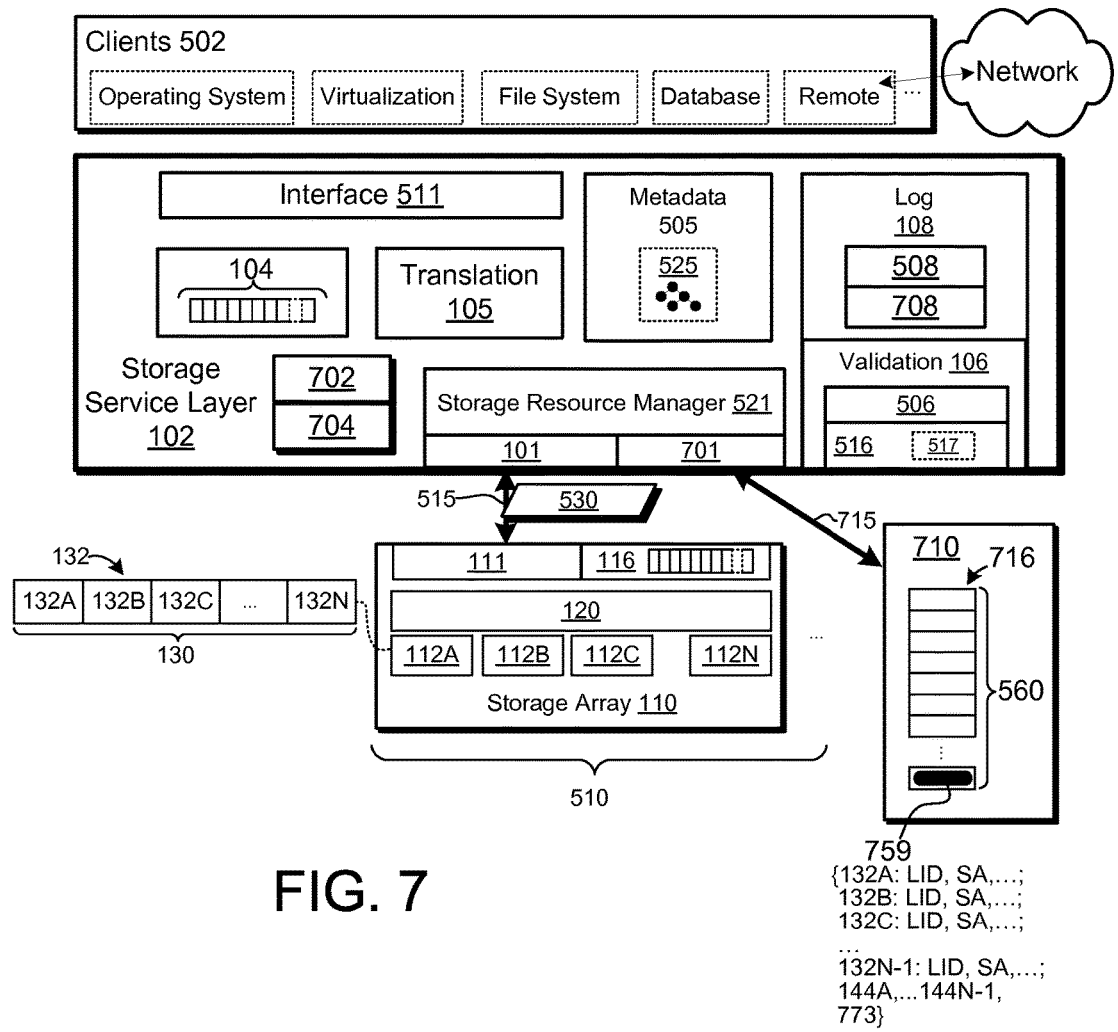
FIG. 7 is a schematic block diagram of another embodiment of a system for managing storage errors.

FIG. 7 is a schematic block diagram of another embodiment of a system 700 for managing storage errors. In the FIG. 7 embodiment, the storage service layer 102 comprises a metadata log module 708 configured to maintain a metadata log 560 on a storage device 710. The metadata log 560 may comprise an ordered sequence of metadata log entries 759 corresponding to storage operations implemented on the storage array 110 (and/or other storage resources 510). The storage device 710 may be separate from other storage resources 510 of the storage service layer 102, including the storage array 110. In some embodiments, the storage device 710 comprises a byte addressable storage device, such as a persistent memory storage device (e.g., battery backed RAM), auto-commit memory, a solid-state storage device, and/or the like. The storage device 710 may be communicatively coupled to the storage service layer 102 through, inter alia, an interconnect 715. The interconnect 715 may correspond to the interconnect 515 of the storage array 110. Alternatively, the interconnect 715 may be separate and/or independent of the interconnect 515. In some embodiments, the interconnect 715 comprises a high-performance communication bus configured to implement byte-addressable storage operations. The interconnect 715 may comprise an internal memory bus of the computing system 501.

As disclosed herein, the storage layer 102 may comprise hardware components, such as circuits, programmable logic, and/or the like. In the FIG. 7 embodiment, portions of the storage layer 102, such as the validation manager 106 and/or log module 108 comprise hardware components 702. Portions of the storage layer 102 may be embodied as machine-readable instructions stored on a non-transitory storage medium. In the FIG. 7 embodiment, the storage service layer 102 may comprise non-volatile storage 704 comprising instructions configured to cause the hardware components 702 to implement functionality of the translation layer 105, validation module 106, log module 108, and so on. The non-volatile storage 704 may comprise firmware of the hardware components 702, an FPGA, an FPGA bitstream, programmable logic configuration data, and/or the like. In some embodiments, the non-volatile storage 704 comprises a ROM, EPROM, and/or the like.

In the FIG. 7 embodiment, the log module 108 may be configured to append data to a storage log 650 on the storage array 110 at an append point 109 within a storage address space 116 of the storage array 110, as disclosed herein. The log module 108 of FIG. 7 may be configured to write the data to the storage array 110 without persistent metadata (e.g., without writing data packets 532 comprising persistent metadata 535 and/or without writing persistent metadata entries 539 to the storage array 110). The log module 108 may be configured to store persistent, crash-safe metadata pertaining to data being stored on the storage array 110 (and/or other storage resources 510) in a metadata log 560. The metadata log 560 may be maintained by a metadata log module 708 of the storage service layer 102. The metadata log module 708 may be configured to append persistent, crash-safe metadata log entries 759. The metadata log module 708 may append the metadata log entries 759 to an ordered metadata log 560 within the storage address space 716 of the storage device 710.

The metadata log entries 759 may comprise contextual metadata pertaining to data units 132A-N-1 being written to the storage array 110 within respective storage groups 130. As disclosed herein, writing data to the storage array 110 may comprise a) collecting a data set 530 comprising a plurality of data units 132A-N-1, b) generating integrity data 144 pertaining to the data units 132A-N-1, and c) issuing a write request to store the set of N-1 data units 132 as a data group 130 on the storage array 110. In response, the storage array 110 may write the data units 132A-N-1 as a data group 130 with corresponding array metadata 134 on respective storage elements 112A-N. In the FIG. 7 embodiment, writing data to the storage array 110 further comprises appending a persistent metadata log entry 759 to the metadata log 560. The persistent metadata log entry 759 may include persistent, crash-safe metadata pertaining to the data units 132A-N-1 being written to the storage array 110. As illustrated in FIG. 7, a persistent metadata log entry 759 corresponding to a stored data group 130 may comprise: LID associations pertaining to the data units 132A-N-1, storage addresses of the data units 132A-N-1, and so on. The persistent metadata log entry 759 may further comprise integrity data 144 pertaining to the data units 132A-N-1. In the FIG. 7 embodiment, the persistent metadata log entry 759 comprises a plurality of integrity datum 144A-N-1 corresponding to the respective data units 132A-N-1. In some embodiments, the persistent metadata log entry 759 further comprises sequence metadata 773 to, inter alia, define a log order of the persistent metadata log entry 759 within the metadata log 560. Alternatively, the log order of the persistent metadata log entry 759 may be defined by a storage location of the persistent metadata log entry 759 within the storage address space 716 of the storage device 710 (e.g., within a particular log segment), by separate sequence metadata, and/or the like. In some embodiments, the relative log order of stored data groups 130 are defined by the log order of the corresponding metadata log entries 759. Since the log order of the stored data groups are defined within the metadata log 560, the storage operations to write the data to the storage array 110 (and/or other storage resources 510) may be implemented out-of-order and/or may not be strictly ordered with respect to time. Accordingly, in some embodiments, the log module 108 may append data to the storage array 110 and/or other storage resources 510 in a different order from the order in which the corresponding requests were received. The log module 108 may append data out-of-order due to any number of conditions including, but not limited to: performance considerations, a Quality of Service (QoS) policy, availability of the data (e.g., data source bandwidth, direct memory access (DMA) and/or remote DMA latency, and/or the like), availability of the storage resources 510, and/or the like.

The validation manager 106 may be configured to implement recovery operations 517 for the storage service layer 102 in response to detection of an invalid shutdown (by the monitor 506). As disclosed herein, the validation manager 106 may select stored data groups 130 for validation based on a log order of the stored data groups 130. The validation manager 106 may determine the log order of the stored data groups 130 by use of the metadata log module 708, which may identify the storage address(es) of the data groups 130 that were being written to the storage array 110 at the time the invalid shutdown occurred. The metadata log module 708 may identify the storage address(es) based on the log order of the metadata log entries 759 within the metadata log 560 (e.g., the storage addresses corresponding to the metadata log entries 759 at the head of the metadata log 560).

Figure 8A:
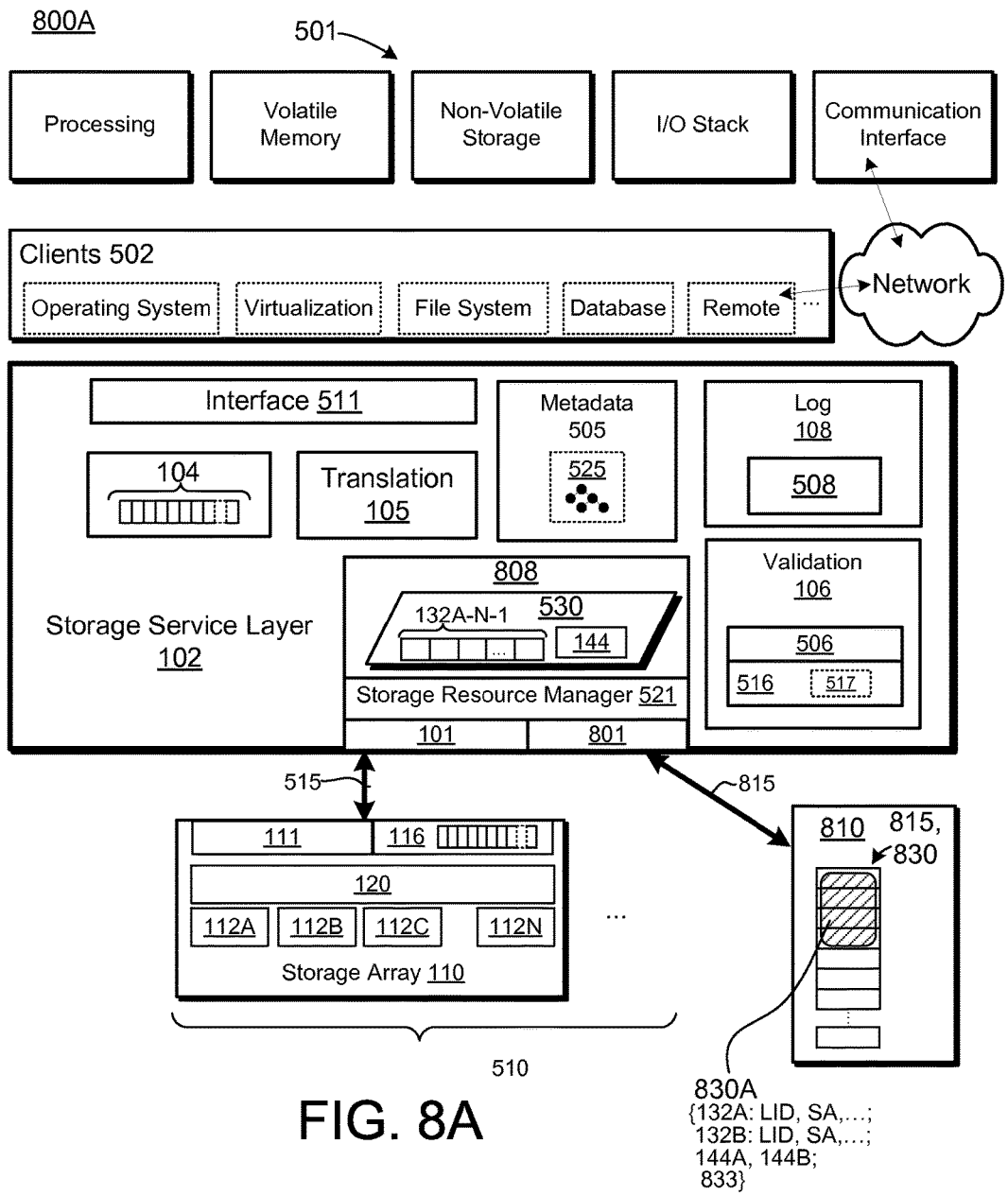
FIG. 8A is a schematic block diagram of another embodiment of a system for managing storage errors comprising journal storage.

FIG. 8A is a schematic block diagram of another embodiment of a system 800A for managing storage errors. In the FIG. 8A embodiment, the storage service layer 102 comprises a journaling module 808 configured to, inter alia, manage journal storage 810. The journal storage 810 may comprise high-performance storage resources, such as persistent RAM, battery-backed RAM, auto-commit memory, solid-state storage resources, and/or the like. The journal storage 810 may be communicatively coupled to the storage service layer 102 through an interconnect 815, which, in some embodiments, comprises an internal memory bus of the computing system 501. The journaling module 808 may be configured to coalesce data sets 530 for storage on the storage array 110 as respective data groups 130, as disclosed herein. The journaling module 808 may be configured to buffer and/or queue incoming write requests to collect N−1 data units 132 for storage as a data group 130 on the storage array 110 (e.g., collect N−1 data units 132 in a data set 530). The validation manager 106 may be configured to generate integrity data 144 for the data sets 530, as disclosed herein.

The journaling module 808 may be configured to write data sets 530 being written to the storage array 110 to the journal storage 810 as a journaling entry 830 (e.g., as a journaling entry 830A). The journaling entry 830A may comprise the contents of the data units 132A-N−1, metadata pertaining to the data units 132A-N−1 (e.g., LID(s) associated with the data units 132A-N−1), and/or integrity data 144 corresponding to the data units 132A-N−1. In some embodiments, the journaling entry 830A further includes storage addresses to which the data set 530 is being stored on the storage array 110. In some embodiments, the journaling entry 830A comprises status metadata 833 to indicate whether the data units 132A and/or 132B have been written to the storage array 110 and/or whether the journaling entry 830A is ready for storage on the storage array 110 (e.g., whether the journaling entry 830A comprises N−1 data units 132).

In some embodiments, the journaling module 808 buffers and/or queues incoming data in the journal storage 810. The journaling module 808 may be configured to collect data units 132 into respective data sets 530 within the journal storage 808 (and/or by writing the data units 132 to the journal storage 810). The journal storage 810 may comprise a persistent, crash-safe storage resource. Accordingly, the storage service layer 102 may acknowledge completion of incoming write requests pertaining to particular data units 132 as the data units 132 are written to the journal storage 810, and before the data units 132 are included in a data set 530 and/or written to a the storage array 110 as a data group 130.

The storage service layer 102 may further comprise a crash recovery module 516 configured to recover from invalid shutdown conditions pertaining to the computing system 501, storage array 110, and/or the like, as disclosed herein. The recovery module 516 may be configured to recover from an invalid shutdown of the storage service layer 102 that occurs after data of one or more write requests have been written to the journal storage 810, and before the data is written to the storage array 110 as a data group 130. In the FIG. 8A embodiment, the journaling module 808 may have received requests to write data units 132A and 132B to the storage array 110. The storage service layer 102 may acknowledge completion of the respective write requests in response to storing the data units 132A and 132B in the journal storage 810, before forming a full data set 530 of N−1 data units 132 and/or before writing the data units 132A and/or 132B to the storage array 110.

The storage layer 102 may incur an invalid shutdown, which may affect the storage service layer 102. The invalid shutdown may occur before the data units 132A and/or 132B are written to the storage array 110. Since the journal storage 810 comprises persistent, crash-safe storage resources, the journaling entry 830A comprising the data units 132A and 132B may be accessible after the invalid shutdown of the storage service layer 102 and/or storage resources 510 (including the journal storage 810). The recovery module 516 may detect the invalid shutdown and, in response, may configure the journaling module 808 to resume buffering and/or queuing a data set 530 comprising the data units 132A and/or 132B for storage as a data group 130 on the storage array 110.

Figure 8B:
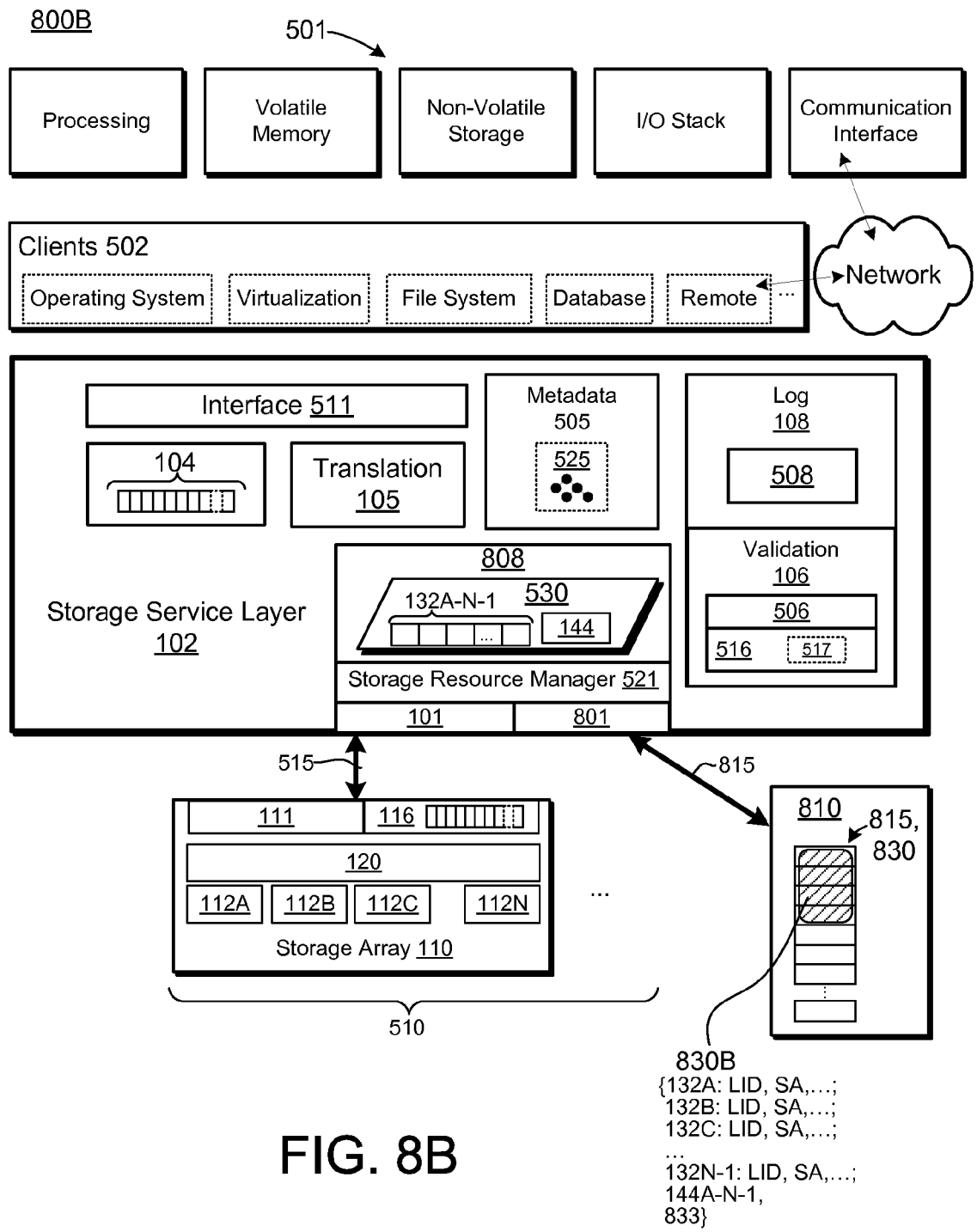
FIG. 8B is a schematic block diagram of another embodiment of a system for managing storage errors by use of journal storage.

FIG. 8B is a schematic block diagram of a system 800B for managing storage errors, including embodiments of recovery operations 517 pertaining to the journal storage 810. In the FIG. 8B embodiment, the recovery module 516 may detect an invalid shutdown of the storage service layer 102 and, in response, access the journal storage 810 to determine that the journal storage 810 comprises one or more unwritten data units 132 (as recorded in a journaling entry 830A). The recovery module 516 may configure the journal module 808 to resume buffering and/or queuing incoming data in the journaling entry 830A. The journal module 808 may modify the journaling entry 830B (e.g., append data to the journal storage 810), resulting in a full data set 530 of journaling entry 830B. As illustrated in FIG. 8B, the journaling entry 830B comprises N−1 data units 132A-N−1 with corresponding metadata, and/or integrity datum 144A-N−1. In response, the journaling module 808 may update the status metadata 833 of the journaling entry 830B to indicate that the data set 530 is ready for storage as a data group 130 on the storage array 110. The journaling module 808 may be further configured to issue a request to write the data set 530 by use of the coordination module 101, as disclosed herein. In response to issuing the write request and/or receiving a response from the storage array 110, the journaling module 808 may update the status metadata 833 of the journaling entry 830B to indicate that the journaling entry 830B has been written to the storage array 110.

The journaling module 808 may be further configured to remove journaling entries 830 that have been written to the storage array 110 and/or validated by the validation manager 106. In some embodiments, the journaling module 808 retains journaling entries 830 in accordance with an available capacity of the journal storage 810. The journaling module 808 may retain journaling entries 830 for use in, inter alia, recovering from invalid shutdown conditions as disclosed above, and/or invalid shutdown conditions pertaining to the storage array 110. In the FIG. 8B embodiment, the write request pertaining to journaling entry 830B may fail due to an invalid shutdown of the storage array 110.

In response to the invalid shutdown, the validation manager 106 may be configured to implement one or more recovery operations 517, which may preempt array recovery operations 124 of the storage array 110, as disclosed herein. In the FIG. 8B embodiment, the validation manager 106 may determine that the stored data group 130 comprising the data of journal entry 830B comprises a write hole. In response, the validation manager 106 may be configured to rewrite the data segments 132A-N−1 using the contents of the journaling entry 830B rather than invalidating the stored data group 130 and/or attempting to recover portions of the stored data group 130.

Figure 9:
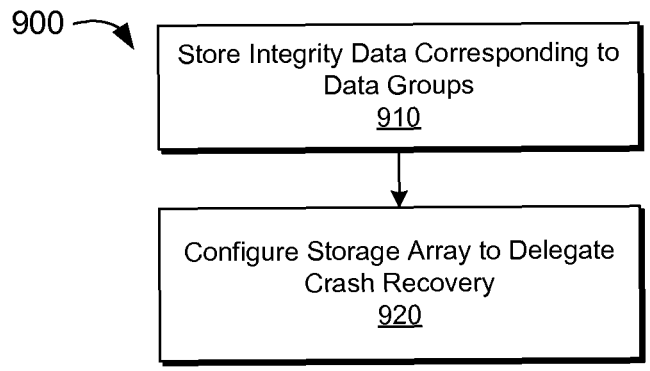
FIG. 9 is a flow diagram of another embodiment of a method for managing storage errors.

FIG. 9 is a flow diagram of one embodiment of a method 900 for managing storage errors. Step 910 may comprise storing integrity data 144 corresponding to data groups 130 being written to a storage array 110. Step 910 may comprise buffering and/or queuing data sets 530 configured to storage within respective data groups by the storage array 110 and generating integrity data 144 corresponding to the data sets 530. Step 910 may further comprise including the integrity data 144 in one or more data units 132A-N-1 of the data set 530. The integrity data 144 may be included as persistent metadata 535 of a data packet 532 of one or more of the data units 132A-N-1, may be included as a persistent metadata entry 539 within one or more of the data units 132A-N-1, within a persistent metadata log entry 759 appended to a separate metadata log 560, and/or the like, as disclosed herein. In some embodiments, the integrity data of step 910 comprises a plurality of integrity datum 144A-N-1 corresponding to respective data units 132A-N-1 of the data group 130. Step 910 may further comprise detecting invalid shutdown conditions pertaining to the storage array 110 and/or implementing recovery operations 517 to identify and/or mitigate write hole conditions by use of the stored integrity data 144, as disclosed herein.

Step 920 may comprise configuring the storage array 110 to delegate crash recovery operations, as disclosed herein. In some embodiments, 920 comprises setting a configuration parameter of the storage array 110, modifying a configuration file of the storage array 110, signaling the storage array 110, and/or the like. Step 920 may comprise transmitting a message 566 to the storage array 110 configured to prevent the storage array 110 from performing one or more array recovery operations 124. The message 566 may be transmitted through an interface 111 of the storage array 110 (via an interconnect 515) by use of a coordination module 101. The coordination module 101 may be configured to manage the storage array 110. In some embodiments, the coordination module 101 is configured to issue messages and/or directives to the storage array 110 through a custom interface of the storage array 110. In some embodiments, the message 566 may comprise a command, a library call, a function call, an API call, an RPC call, a signal, an interrupt, and/or the like. Step 920 may comprise sending the message 566 to the storage array 110 in response to detection of an invalid shutdown pertaining to the storage array 110. The message 566 may be configured to block the storage array 110 from attempting to validate stored data units 130, block the storage array 110 from resynchronizing stored data units 130, block the storage array 110 from attempting to reconstruct one or more stored data units 130, and/or the like. Accordingly, the message(s) of step 920 may correspond to a particular invalid shutdown condition. Alternatively, step 920 may comprise transmitting message(s) 566 to the storage array 110 configured to prevent the storage array 110 from implementing certain array reconstruction operations 124 in response to all invalid shutdown conditions.

In some embodiments, step 920 further comprises notifying the storage array 110 of incomplete stored data groups 130, invalidating stored data groups 130 in the storage array 130, requesting reconstruction of portions of particular stored data groups 130 (e.g., by use of array metadata 134 maintained by the storage array 110), and so on, as disclosed herein. Step 920 may comprise configuring the storage array 110 to delegate a subset of a plurality of array recovery operations 124 to the storage service layer 102, such a first set of array recovery operations 124 are preempted by the storage service layer 102, and other array recovery operations 124 of a second set are performed in response to an invalid shutdown. The storage array 110 may be configured to continue performing array recovery operations 124 to a) validate functionality of particular storage elements 112A-N (e.g., verify that the storage elements 112A-N are usable); b) validate communication interconnects of the storage array 110 (e.g., interconnect 515); c) verify internal firmware and/or metadata maintained by the storage array 110, and so on. The array reconstruction operations 124 blocked in step 920 may include operations to validate data groups 130 stored on the storage array 110, as disclosed herein, such as operations to validate stored data groups 130 (using array metadata 134), operations to resynchronize stored data groups 130, operations to reconstruct stored data groups 130, and so on.

Figure 10:
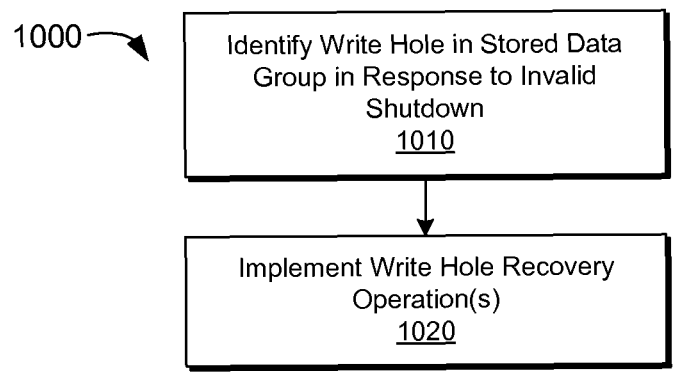
FIG. 10 is a flow diagram of another embodiment of a method for managing storage errors.

FIG. 10 is a flow diagram of another embodiment for managing storage errors. Step 1010 comprises identifying write hole in a stored data group 130 by use of stored integrity data 144 corresponding to data units 132A-N-1 of the stored data group 130. Step 1010 may comprise a) generating integrity data 144 corresponding to data sets 530 being written to the storage array 110 within respective data groups 130, b) storing the integrity data within the respective data groups 130 (and/or other storage location, such as a metadata log 560), and c) implementing recovery operations 517 to validate stored data groups 130 in place of one or more array recovery operations 124 of the storage array 110, as disclosed herein. Step 1010 may comprise identifying the write hole in response to determining that data of a stored data group 130 does not correspond to integrity data 144 of the stored data group 130.

Step 1010 may further comprise identifying invalid portion(s) of the stored data group 130 (e.g., identifying data unit(s) 132A-N-1 comprising invalid data 131). Step 1010 may comprise comparing respective integrity datum 144A-N to data of corresponding data units 132A-N-1 of the stored data group 130, as disclosed herein. Step 1010 may further comprise determining that one or more of the data units 132A-N-1 of the stored data group 130 comprise valid data, as disclosed herein.

Step 1020 comprises implementing one or more recovery operations 517, which may include, but are not limited to: a) notifying one or more of the translation layer 105, the storage array 110, a client 502, and/or the like, of the write hole; b) invalidating the stored data group 130; c) invalidating a portion of the stored data group 130; d) reconstructing portion(s) of the stored data group 130; e) requesting replacement data pertaining to the stored data group 130; and/or the like, as disclosed herein. In some embodiments, step 1020 comprises invalidating data units 132A-N-1 determined to comprise invalid data 131 at step 1010. Step 1020 may comprise invalidating and/or TRIMing LIDs associated with the invalid data units 132A-N-1. Step 1020 may include removing logical-to-storage mappings pertaining to LIDs associated with the invalid data units 132A-N-1 (e.g., removing and/or modifying one or more entries 526 of a forward map 525). Step 1020 may further comprise notifying the storage array 110 that the stored data group 130 comprises a write hole and/or identifying the invalid portion(s) of the stored data group 130.

In some embodiments, step 1020 comprises retaining valid portion(s) of the stored data group 130 by, inter alia, retaining logical-to-storage mappings pertaining to valid data units 132A-N-1 of the stored data group 130, rewriting valid data of the stored data group 130, and so on, as disclosed herein. Alternatively, or in addition, step 1020 may comprise reconstructing the contents of data units 132A-N-1 determined to comprise invalid data by use of the storage array 110 (e.g., through parity reconstruction), may comprise accessing replacement data for one or more data units 132A-N-1, and/or the like.

Figure 11:
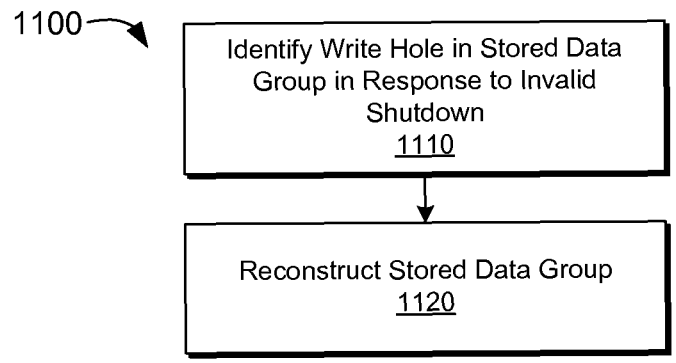
FIG. 11 is a flow diagram of one embodiment of a method for recovering from a storage error.

FIG. 11 is a flow diagram of another embodiment 1100 of a method for managing storage errors. Step 1110 may comprise identifying a write hole in a stored data group in response to an invalid shutdown, as disclosed herein.

Step 1120 may comprise reconstructing portions of the stored data group 130. Step 1120 may comprise identifying invalid portions of the stored data group 130 by use of respective integrity datum 144A-N-1. Step 1120 may further comprise issuing a request to the storage array 110 to reconstruct the invalid portion(s) of the stored data group 130 by use of array metadata 134 corresponding to the stored data group 130. Alternatively, or in addition, step 1120 may comprise an iterative parity operation to iteratively reconstruct portions of a stored data array 130, attempt to validate the reconstructed data, and identify a valid reconstruction by use of the integrity data 144 corresponding to the stored data group 130, as disclosed herein.

Figure 12:
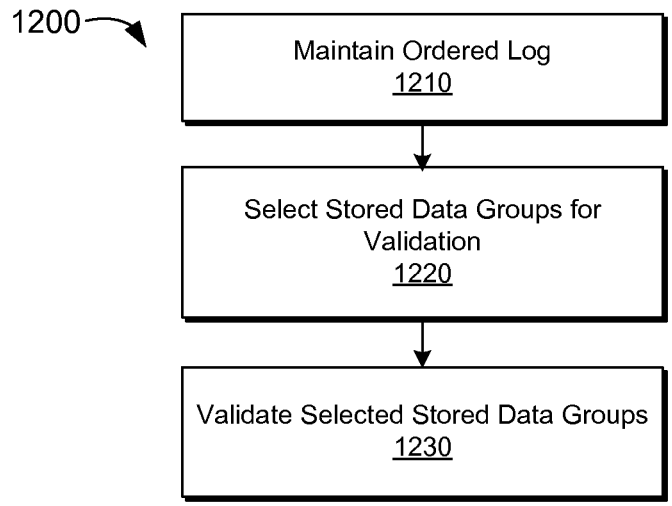
FIG. 12 is a flow diagram of one embodiment of a method for managing storage errors by use of an order log.

FIG. 12 is a flow diagram of another embodiment of a method 1200 for managing storage errors. Step 1210 may comprise maintaining a storage log pertaining to a logical address space 104. Alternatively, or in addition, step 1210 may comprise a storage log corresponding to storage operations performed on a storage array 110 (e.g., operations to store data groups 130 comprising data associated with LIDs of the logical address space 1040). Step 1210 may comprise appending data to an ordered storage log 650 on the storage array 110. Alternatively, or in addition, step 1210 may comprise maintaining a metadata log 560 on a separate storage device 710, as disclosed herein. Step 1210 may comprise appending data groups 130 sequentially within a storage address space 116 of the storage array 110 (e.g., at an append point 109), as disclosed herein.

Step 1220 may comprise selecting stored data groups 130 to validate in a crash recovery operation. Step 1220 may be performed in response to an invalid shutdown. Step 1220 may further comprise configuring the storage array 110 to delegate and/or defer crash recovery operations to the storage service layer 102.

Step 1220 may comprise selecting stored data groups 130 for validation based on the ordered log of step 1210. Step 1220 may comprise selecting stored data groups 130 at the head 654 of the storage log 650. Accordingly, in some embodiments step 1220 comprises identifying a storage address corresponding to the head 654 of the storage log 650 and selecting stored data groups 130 for validation corresponding to the identified storage address. Alternatively, or in addition, step 1220 may comprise determining a storage address of the append point 109 at the time of the invalid shutdown (by use of the log module 108 and/or metadata log module 708). Step 1220 may comprise selecting stored data groups 130 at the determined append point 109.

In some embodiments, step 1220 further comprises validating stored data groups 130 stored within a validation region 118 within the storage address space 116 of the storage array 110. The validation region 118 may comprise storage addresses at the head 654 of the storage log 650. The size and/or configuration of the validation region 118 may be based on the log order 652 of the storage log 650 (e.g., relative log order of segments 670 of the storage log 650), the rate of write operations performed on the storage array 110 at the time of the invalid shutdown, and/or the like, as disclosed herein. In some embodiments, step 1220 further includes blocking access to stored data groups 130 within the validation region 118 while the stored data groups 130 therein are validated by the validation manager 106. Step 1220 may further include providing access to other region(s) of the storage address space 116 outside of the validation region 118.

Step 1230 may comprise validating the selected stored data groups 130 by use of integrity data 144 stored in association with the stored data groups 130, as disclosed herein. Step 1230 may comprise identifying incomplete stored data groups 130, invalidating the incomplete stored data groups 130, notifying the storage array 110 of the incomplete stored data groups 130, rebuilding the incomplete stored data groups 130, and so on, as disclosed herein.

Figure 13:
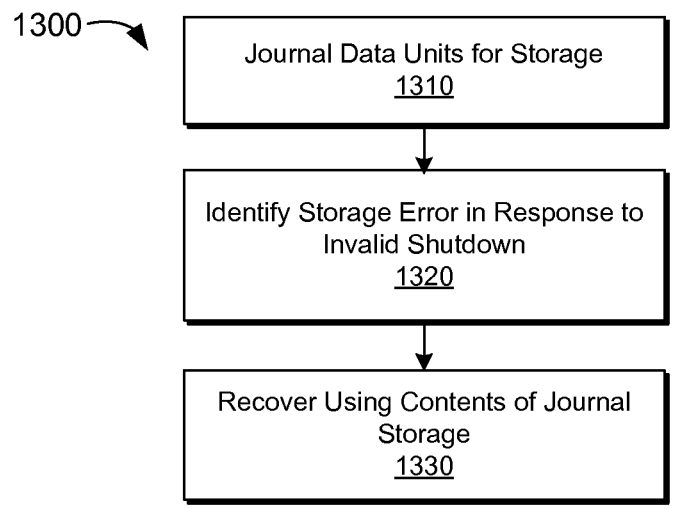
FIG. 13 is a flow diagram of one embodiment of a method for managing storage errors by use of journal storage.

FIG. 13 is a flow diagram of another embodiment of a method 1300 for managing storage errors. Step 1310 may comprise journaling data units 132 for storage on a storage array 110. Step 1310 may comprise writing journaling entries 830 to journal storage 810, as disclosed herein. Step 1310 may further comprise buffering and/or queuing data sets 530 configured to storage within respective data groups 130 on the storage array 130, generating integrity data 144 corresponding to the contents of the data sets 530, inserting the integrity data 144 into the data sets 530 (and/or storing the integrity data 544 in a separate storage location), and issuing requests to write the data sets 530 as respective data groups 130 on the storage array 130. Step 1310 may comprise journaling the data units 132 in response to write requests from clients 502. Step 1310 may further comprise acknowledging completion of the write requests in response to journaling the data units 132 in the journal storage 810. The wrote requests may be acknowledged before the data units 132 are written to the storage array 110 (and/or before the data units 132 are included in a complete data set 530 comprising N-1 data units 132).

Step 1320 comprises identifying a storage error in response to an invalid shutdown. Step 1320 may comprise identifying data units 132 in the journal storage 810 that have not been written to the storage array 110. Step 1320 may comprise accessing the journal storage 810 to identify one or more journaling entries 830 comprising data units 132 that have not been written to the storage array 110. Alternatively, or addition, step 1320 may comprise identifying a stored data group 130 that comprises a write hole by use of the integrity data 144 stored for the data group 130 in step 1310.

Step 1320 may comprise recovering from the invalid shutdown by use of the contents of the journal storage 810. Step 1330 may comprise writing unwritten data units 132 in the journal storage 810 as a stored data group 130 on the storage array 110. Alternatively, or in addition, step 1330 may comprise rewriting a stored data group 130 that comprises a write hole by use of a data set 530 stored in the journal storage 810 (e.g., in one or more journal entries 830), as disclosed herein.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

We claim:

1. An apparatus, comprising:
a storage service layer configured to:
generate integrity metadata corresponding to data being stored within respective data groups by a storage engine, wherein the storage engine is configured to store the data groups with reconstruction metadata on a storage array comprising a plurality of non-volatile storage devices; and
recover from an invalid shutdown of the storage array by use of the integrity metadata, wherein recovering from the invalid shutdown comprises preventing implementation of a recovery operation of the storage engine pertaining to the invalid shutdown.

2. The apparatus of claim 1, wherein the storage service layer is further configured to determine, by use of the integrity metadata, whether the invalid shutdown resulted in storage of an incomplete data group on the storage array.

3. The apparatus of claim 2, wherein the storage service layer is further configured to identify an incomplete data group stored on the storage array in response to a mismatch between integrity metadata generated for the data group and integrity metadata derived from data read from the storage array.

4. The apparatus of claim 2, wherein the storage service layer is further configured to invalidate at least a portion of a particular data group stored on the storage array in response to determining that the particular data group is incomplete.

5. The apparatus of claim 1, wherein:
the recovery operation of the storage engine comprises validating a set of stored data groups by use of the reconstruction metadata stored with the respective data groups on the storage array; and
the storage service layer is further configured to validate a subset of the set of stored data groups in response to the invalid shutdown.

6. The apparatus of claim 1, wherein the storage service layer is further configured to:
write data at an append point of a storage log on the storage array by use of the storage engine; and
validate a data group corresponding to the append point of the storage log in response to the invalid shutdown of the storage array.

7. The apparatus of claim 1, further comprising a coordination module configured to direct the storage engine to delegate recovery from the invalid shutdown to the storage service layer.

8. The apparatus of claim 1, further comprising a storage array coordinator configured to prevent implementation of a resynchronization operation by the storage engine in response to the invalid shutdown, the resynchronization operation to validate data groups stored on the storage array by use of the reconstruction metadata stored with the data groups by the storage engine.

9. A system, comprising:
a storage layer configured to store integrity data corresponding to data being stored within respective data stripes of a storage system, wherein the data stripes stored within the storage system correspond to respective parity reconstruction data generated for the data stripes by the storage system;
a crash recovery module configured to validate one or more data stripes of the storage system by use of the stored integrity data in response to an invalid shutdown of the storage system; and
a storage coordination module configured to block performance of a recovery operation by the storage system in response to the invalid shutdown.

10. The system of claim 9, wherein the crash recovery module is further configured to detect the invalid shutdown of the storage system.

11. The system of claim 9, wherein:
the storage system comprises a Redundant Array of Inexpensive Disks (RAID) storage system; and
the storage coordination module is further configured to cause the RAID storage system to delegate recovery operations pertaining to invalid shutdowns of the storage system to the storage layer.

12. The system of claim 9, wherein:
the crash recovery module is configured to validate a particular data stripe in response to the invalid shutdown; and validating the particular data stripe comprises determining whether the particular data stripe comprises a write error by comparing stored integrity data of the particular data stripe to integrity data generated from the particular data stripe stored within the storage system.

13. The system of claim 9, wherein:
the storage coordination module is further configured to transmit a message to the RAID storage system in response to the invalid shutdown, the message configured to block performance of the recovery operation by the storage system, the recovery operation comprising a Redundant Array of Inexpensive Disks (RAID) resynchronization operation.

14. The system of claim 9, wherein:
a particular data stripe stored within the storage system comprises a plurality of data units;
the integrity data stored for the particular data stripe comprises a plurality of integrity datum, each integrity datum corresponding to a respective data unit of the plurality of data units; and
the crash recovery module is further configured to validate respective data units of the particular data stripe stored within the storage system in response to the invalid shutdown, by comparing the integrity datum stored for the particular data stripe with integrity datum derived from the respective data units of the particular data stripe stored within the storage system.

15. A non-transitory computer-readable storage medium storing program code configured to cause a computing device to perform operations, the operations comprising:
appending data groups to a storage log maintained on a storage array by use of a storage array controller, the storage array controller configured to store the data groups within respective data stripes on the storage array, wherein appending the data groups further comprises storing checksum values corresponding to the data groups; and
in response to an invalid shutdown of the storage array, the operations further comprise:
validating an identified data stripe stored at a head of the storage log on the storage array by use of the stored checksum values corresponding to the data groups; and
preventing execution of a crash recovery operation by the storage array controller.

16. The non-transitory computer-readable storage medium of claim 15, the operations further comprising:
identifying the data stripe at the head of the storage log in response to the invalid shutdown; and
comparing a checksum value derived from the identified data stripe to a stored checksum value corresponding to the identified data stripe.

17. The non-transitory computer-readable storage medium of claim 16, the operations further comprising:
invalidating the identified data stripe in response to a mismatch between the checksum value derived from the identified data stripe and the stored checksum value corresponding to the identified data stripe.

18. The non-transitory computer-readable storage medium of claim 16, wherein:
the data stripe at the head of the storage log comprises a plurality of data blocks mapped to respective addresses of a logical address space; and
the operations further comprise invalidating associations between the data stripe and the respective addresses in response to a mismatch between the checksum value derived from the identified data stripe and the stored checksum value corresponding to the identified data stripe.

19. The non-transitory computer-readable storage medium of claim 15, wherein:
storing the checksum values comprises appending mapping entries comprising the checksum values to a metadata log maintained on a storage device that is independent of the storage array, and
the mapping entries associate data blocks within the respective data stripes with respective logical addresses of a logical address space.

20. The non-transitory computer-readable storage medium of claim 15, wherein storing a checksum value of a data stripe comprises including the checksum value in the data group stored within the data stripe on the storage array.

21. The non-transitory computer-readable storage medium of claim 15, wherein:
the stored checksum values for a data group stored within the identified data stripe comprise a plurality of segment checksum values, each segment checksum value corresponding to a respective data segment of the data group; and
validating the identified data stripe further comprises:
comparing respective checksum values stored for each of a plurality of data segments of a data group to checksum values derived from corresponding data segments stored within the identified data stripe;
invalidating a first data segment stored within the identified data stripe in response to a checksum mismatch pertaining to the first data segment; and
rewriting a second data segment stored within the identified data stripe to a different data stripe on the storage array in response to a checksum match pertaining to the second data segment.

* * * * *